United States Patent [19]

Towers

[11] 4,334,270

[45] Jun. 8, 1982

[54] SECURITIES VALUATION SYSTEM

[76] Inventor: Frederic C. Towers, 8033 Herb Farm Dr., Bethesda, Md. 20034

[21] Appl. No.: 279,781

[22] Filed: Aug. 11, 1972

[51] Int. Cl.³ .............................................. G06F 15/21
[52] U.S. Cl. ..................................................... 364/300
[58] Field of Search .................. 235/451.1; 340/172.5; 444/1; 364/300

[56] References Cited

PUBLICATIONS

File Organization and Data Mangement; Annual Review of Information Science and Technology, vol. 2, 1967, pp. 123-160, Jack Minker and Jerome Sable.

Primary Examiner—Edward J. Wise
Attorney, Agent, or Firm—Roberts and Stout

[57] ABSTRACT

This discloses a method of operating a general purpose digital computer to produce securities portfolio valuation schedules for multiple simultaneous users. The computer maintains securities information in system-wide files which are updated, both electronically and manually, on a daily basis. The system permits each user to store information about his portfolios, as well as information about supplemental securities not contained in the system-wide files.

5 Claims, No Drawings

SECURITIES VALUATION SYSTEM

INDEX

Abstract of the disclosure
Index
Background of the invention
The prior art
Summary of the invention
The Call/370 specific embodiment
Call/360 Portfolio Valuation (65-2467)
Summary of the VALPORT programs
Index of VALPORT schedules
VALPORT schedules
Index of VALPORT files
Description of VALPORT files
Index to program descriptions and routines
Program descriptions
Index to program listings
Program listings
Basic statements
Claims
Declaration, Power of Attorney and Petition

BACKGROUND OF THE INVENTION

There are today approximately 9,000 different corporate securities which are actively traded on the New York Stock Exchange, the New York Bond Exchange, the American Stock and Bond Exchanges, the Midwest and Pacific Coast Regional Exchanges, and the N.A.S.-D.A.Q. Over-the-Counter Market. There are at least that many additional securities of smaller corporations which are publicly held but less actively traded. A securities broker might well expect to find any of these securities in a customer's portfolio and will, in the regular course of business, have to periodically value these securities and the portfolio as a whole.

The Bunker-Ramo Corporation, among others, currently produces a daily computerized tape listing of the volume, high, low, and last price, as well as earnings, dividends, and other data for the securities on the following exchanges:

| | |
|---|---|
| New York Stock Exchange | Approximately 2000 Securities |
| New York Bond Exchange | Approximately 2100 Securities |
| American Stock Exchange | Approximately 1300 Securities |
| American Bond Exchange | Approximately 250 Securities |
| NASDAQ (over-the-counter) | Approximately 3200 Securities |
| Pacific Coast Stock Exchange | Approximately 60 Securities |
| Midwest Stock Exchange | Approximately 50 Securities |
| TOTAL | Approximately 9,000 Securities |

There are about 450 mutual funds, and about 2300 government bonds, corporate bonds, and other types of securities which are widely traded but are not currently on the Bunker-Ramo daily listing.

Of the 11,700 securities described above, there are about 30 changes of significance each day. These changes include stock splits, stock dividends, mergers, name changes, ticker symbol changes, new securities listings, transfers of securities from one exchange to another, or delistings.

Bunker-Ramo has assigned to each security in its listing a discrete 7-digit number. This number is known as the Bunker-Ramo security number.

There is today a second numbering system which will probably become the dominant numbering system for securities. This is the Committee on Uniform Securities Industry Practices or CUSIP number. The CUSIP number is a 9-digit alphanumeric number where digits 1 through 6 represent the issuing company, characters 7 and 8 the issue, and digit 9 the check digit.

In addition, each security is assigned a unique "ticker-symbol" comprising one to six characters, usually mnemonically related to the name of the security. This system of abbreviation is more commonly used than the other two by investors, registered representatives, traders, advisers, and "front-office" personnel because it is shorter and easier to remember.

Although both the Bunker-Ramo number and CUSIP number may be used internally, the "ticker symbol" is the customary external method of accessing securities pricing information in any quotation system, and in the printing quotation system making up the invention.

The invention was created to organize the massive data described above, to add additional data as necessary, and to make the information readily available to investment dealers, stockbrokers, banks, investment advisers, mutual funds, pension fund managers, individual investors, and any others having a need to value one or more securities portfolios from time to time.

Using the new technique of computer "time-sharing," the invention makes use of the Service Bureau Corporation's National Time-Sharing System to centralize the securities data described above and the computer programs comprising the invention. Thus the system is made available as necessary to multiple simultaneous users across the nation.

Several ingredients were necessary to create a viable system:
1. Ease of user operation and error correction.
2. A comprehensive, reliable and accurate data base, carefully cross-indexed and cross-referenced.
3. User ability to add readily any security not contained in the data base.
4. A wide variety of report options and formats.
5. Extremely high system reliability to make up for user errors and telephone line problems.
6. Economy of operation.

THE PRIOR ART

The applicant is aware of no prior art system for producing individual portfolio valuation schedules from a computerized data base on a time-sharing system.

The application, broadly, would appear deceptively simple in view of the readily accessible computerized listings, which would form the data base against which the customer portfolio transactions are processed.

Systems for portfolio valuations may have been developed by large companies with major computer installations, but these systems suffer from several disadvantages:

(1) They are centralized so that branch offices receive slower service.
(2) Although their calculating and printing speeds may be rapid, the turnaround time for a specific task is almost invariably far slower than on a time-sharing system.
(3) They require the repetitive entry of securities price information and other data which can be used on only the single system.
(4) They require highly skilled operators, and the entry of rigidly coded data, often on punch-cards.
(5) Modifications to the system are expensive, difficult, and time-consuming, with the result that the system becomes relatively inflexible.

(6) The quality of printing is markedly inferior to that available from typewriter-like time-sharing terminals.

This invention, on the other hand, overcomes all of these disadvantages.

(1) Inexpensive terminals can be installed in remote branch offices to communicate by telephone with the VALPORT processing computer.
(2) Turnaround time is extremely rapid - virtually instantaneous in some instances.
(3) A centralized securities data base is available to all users at minimal cost.
(4) The system can be operated readily by any competent secretary, and data entry is uncoded, straightforward, and processed directly on the typewriter terminal without punch-cards.
(5) Modifications to the system can be implemented quickly and inexpensively whenever necessary, making the system extremely flexible.
(6) Since valuation reports are produced on a terminal which is essentially an electric typewriter, the quality is extremely high and virtually identical to hand-typing.

SUMMARY OF THE INVENTION

The invention in the presently described system for which I claim VALPORT as a service mark, contains the following features:

1. It allows a complete portfolio valuation to be produced of securities of any description.
2. It allows a typographically accurate schedule to be produced with a minimum of error - far more accurately than can be produced by hand.
3. It allows a user with moderate secretarial or clerical experience in the securities business, but without experience in computer operations, to operate the system with a minimum of training.
4. It contains a high degree of reliability and redundancy to protect data files from technical problems, and can easily be restarted in the event of inevitable line breaks which occur on a time-sharing system.

VALUING THE PORTFOLIO

A principal object of this invention is to allow the user, e.g., a stockbroker, investment banker, bank trust department, investment manager, pension fund manager, individual investor, etc., to produce valuation schedules of his customers', or his own, securities portfolios, even though those portfolios may contain securities in seldom traded, as well as widely traded securities. To achieve this, 3 classes of security files are utilized.

All of the securities on the daily Bunker-Ramo tape listing are included in the Group 1 master security files. The closing price, dividends, earnings, and other data for these securities are updated on a daily basis.

A second class of securities herein referred to as Group 2 securities are those less-widely traded securities which might be expected to appear in a number of portfolios of one or more users, but do not at a given time appear on the daily Bunker-Ramo listings. These securities ae stored in the master security files, but they contain no price information. The user must manually supply a price for each such security at the time the portfolio is priced.

A third group of securities, herein referred to as Group 3 supplemental securities, are those infrequently traded securities which may appear in one or more portfolios of a particular user, or a small number of users. All data on these securities is entered into the system once by the user, the first time the security appears in any portfolio.

In producing a portfolio valuation schedule, the operator need only enter the ticker symbol for the Group 1 securities, the ticker symbol and the latest price for the Group 2 securities and the Group 3 supplemental securities in order to produce a valuation schedule of the portfolio.

Accuracy of the Reports

The accuracy of the valuation reports is insured by a number of features. The full name of the security, up to 36 characters, is retrieved from a master file and not manually typed each time the security appears in a portfolio.

The accuracy of the reports is obviously greatly enhanced by the fact that all calculations are made automatically by a digital computer. Similarly, all formatting, sorting, alphabetizing and typing is machine-controlled. Accuracy is further insured by an extensive system of cross-reference files, which automatically adjust the valuation schedule to reflect mergers, stock dividends, name changes, ticker symbol changes and the like which may have occurred since the publication of the latest VALPORT Securities Index (for which I claim a copyright), or since the previous portfolio valuation.

A third feature insuring the accuracy of the reports is the capability of updating or correcting the files in real time during the day while they are being accessed by multiple users, rather than waiting for the end of the business day. Any known errors can thus be corrected immediately if they occur.

Ease of Operation

The entire VALPORT system has been designed for ease of operation by a user neither trained in nor desiring to become broadly experienced in computer operations. For example, all of the more than 50 user programs in the VALPORT system can be operated by typing one of two commands, "RUN VALPORT" or "RUN VALSEC". All further operation is conversationally prompted by the system.

To avoid teaching a great many commands and program names, all of the VALPORT programs are accessed by a source language linking program. The user need only know and enter the command "RUN **VALPORT" and the short linking program is compiled into object language. It in turn asks the user to specify a particular option and then executes the desired object language program or programs.

Insuring File and Report Integrity

A principal limitation on any time-sharing system is the telephone line over which the system operates.

It is common knowledge that such lines are periodically disconnected and subject to static. These problems often cause termination of transmission of data and interrupt the operation of the user's terminal. To avoid unnecessary duplication in long reports, any VALPORT report may be started at the beginning of any page, thus eliminating the relatively slow retyping of report pages at the user's terminal.

A second feature of the system relates to the integrity of the data files and has an application for all data files going beyond the presently disclosed securities valuation system.

Essentially, all of the principal data files are updated daily as well as periodically during the day. Computer breakdowns, caused by power failures or other hardware and software problems, can lead to partially updated files and the subsequent accessing of incorrect or incomplete data. There is here disclosed a system which insures that the original file is continually accessed until the system has passed all required data to update the file. Only after this happens does control pass to the new data location.

The Call/370 Specific Embodiment

The present invention broadly deals with a securities valuation system which may be used on any digital computer or computerized time-sharing system, on any of a variety of specific computers. The various programs could also be translated into any one of a number of the constantly growing and changing computer languages.

As of the date of filing, the VALPORT system is operating on an IBM Model 370/155 computer at the Service Bureau Corporation installation in Cleveland, Ohio. The system can be accessed by a local telephone call in any of the cities comprising the SBC National Time-Sharing System, or by a long-distance call to the nearest such city.

All of the prgrams are written for use with the SBC Call/370 BASIC language. The BASIC language, like most computer languages, is being constantly enhanced by new features. At any moment, therefore, the actual language is in advance of the explanatory manuals. The source listings hereinafter printed, were actually printed from the computer in June, 1972, and reflect the source language programs in the computer at that time.

There are numerous texts on the BASIC language, which will help explain the following program listings to those unfamiliar with the language. For ease of understanding the listing, applicant refers to and incorporates as part of the disclosure, although not part of the invention, a publication of the Service Bureau Corporation, entitled Call/370, Basic Reference Handbook No. 65-2211-3, copy-righted in 1971.

SUMMARY OF THE VALPORT PROGRAMS

The various programs used by the VALPORT system are briefly summarized in this section and are classified by the various functions of the systems.

Installation of the VALPORT System

A new user, typically a brokerage firm, first creates 19 required files in his time-sharing library, then runs the **VALSETUP program. It would be desirable to have the program create the required files, but the SBC version of the BASIC language does not currently permit a program to create a file. This program allows the user to gain access to the VALPORT data base and to supply information about himself to the system.

Creating and Entering a Securities Portfolio

The VALPORT 'FORM' option is used to generate an optional portfolio input form, which may be completed by the user and is used as the input document to the VALPORT 'NEW' option which puts a new portfolio into the user's library.

Valuing the Portfolio

The programs in this section produce the output of the VALPORT system, the various portfolio valuation reports. The 'COV' option produces a cover sheet for the various reports.

The master program for portfolio valuations is VALPORT. The various report options of VALPORT selected by the user during the execution of the program are:

| Option | Type |
|--------|------|
| VAL | Detailed valuation schedule |
| VALX | Extended valuation schedule showing gain and loss information |
| VALD | Detailed valuation schedule without price/earnings ratio |
| PUR | Purchase recommendation schedule |
| SEL | Sell recommendation schedule |
| SUM | Summary valuation schedule |
| SUMX | Extended summary schedule showing cost information and optional income and yield information |
| TAX | Schedule of unrealized gains and losses (sorted by gain amount or gain percent) |
| GAIN | Alphabetical schedule of gains and losses |
| SIZE | Sorted by total value of holding |
| XS | Access option for user-customized reports |
| EST | Formal estate valuation schedule |

Maintaining the Portfolio

All of the customer portfolios of a VALPORT user are stored alphabetically in the user's portfolio masterfiles in alphabetical order according to their assigned portfolio shortnames.

The 'EDIT' option is used to modify or edit a portfolio that has previously been created via the 'NEW' option. The program permits the recording of purchases and sales and the updating of prices and other data. The 'DEL' option is used to purge unwanted portfolios from the user's portfolio masterfiles. The 'MOVE' option transfers the portfolio from the temporary file to the permanent portfolio masterfile or changes the shortname assigned to the portfolio.

Cataloging the Portfolio Files

The 'CAT' option produces 3 different reports about the user's portfolio masterfiles. The 'COUNT' option produces a summary report of the number of portfolios by assigned representatives, together with the number of issues in each; the 'CATREP' option produces a catalog of portfolios by representative; and the 'CATALL' option produces a catalog of all portfolios. The 'HOLDS' option produces a report showing all portfolios which hold a particular security, or prints the cash balance in each portfolio.

Creating and Maintaining the Supplemental Securities Files

The supplemental securities files contain the supplemental securities of a user that are not included in the VALPORT master securities data base available to all users. The programs described in this section are used to create and maintain these supplemental securities files.

'SEC' option of the 'FORM' program may be used to produce a blank supplementary securities input form to be completed by the user as a worksheet. The completed worksheet is then used as input to the **VALSEC 'NEW' option to enter a new security into the user's supplementary securities file.

The VALSEC 'EDIT,' 'DEL' and 'MOVE' options each perform the functions for the supplementary securities files that the VALPORT 'EDIT,' 'DEL' and 'MOVE' options perform for the user portfolio files.

In addition, the 'MOVE' option creates a cross-reference trail of any security moved in the files. The Master System Operator can also use this program to shift a security within the Group 1 securities files, within the Group 2 securities files, or to move a security from Group 1 to 2, or from Group 2 to 1. Moreover, the Master System Operator can 'merge' securities, making an entry in the ticker symbol cross-reference file SYMX1 and the security number cross-reference file OLDNEW#1. He can also change a ticker symbol and/or security number, making the appropriate cross-reference entries to the ticker symbol and security number cross-reference files, if necessary. An ordinary user can use the program in a more limited fashion to move securities within his supplemental securities file, or to cross-reference them to the Group 2 or Group 1 files.

The 'CARD' option produces a 3×5 securities index card designed to help the user keep track of the securities in his supplementary security files. The 'FIND' option is a search routine used to retrieve and verify any security contained in either the user's supplemental security files or the VALPORT master securities data base.

Backup Copies of Portfolio Files

The **BACKPORT program permits the user to transfer a copy of the contents of the portfolio masterfile into a separate reserve data file in his library.

The RECOPORT program is the counterpart of BACKPORT. It allows the user to copy the backed-up version of his portfolio files into his portfolio masterfile.

Management Reports and User Editing

The **VALPORT 'USE' option produces a detailed management report of all VALPORT usage from the prior to the current reporting date. The 'MGT' option program produces a summary VALPORT usage report and allows the user to establish reporting periods.

'EDITCAT' option allows the list of registered representatives to be changed or updated and allows the user to change the forms control used during printing VALPORT reports.

INDEX OF VALPORT SCHEDULES

NAME

VALX
VAL
VALD
SUM
SUMX(WITH INCOME)
SUMX(WITHOUT INCOME)
GAIN
TAX(GAIN$)
TAX(GAIN%)
PUR
VALX(REPRICED)
EST(STD)
EST(WKEND)

PORTFOLIO VALUATION
FOR: MR. FREDERIC C. TOWERS
AS OF: MARCH 16, 1972

| AMOUNT | SECURITY | ORIGINAL COST | CURRENT PRICE | CURRENT VALUE | % OF TOTAL | GAIN OR (-LOSS) | % GAIN (-LOSS) | ANNUAL INCOME | CURRENT YIELD | P/E RATIO |
|---|---|---|---|---|---|---|---|---|---|---|
| | CASH BALANCE $1290.00 (0.6%) | | | | | | | | | |
| | U.S. GOVERNMENT OBLIGATIONS (3.9%) | | | | | | | | | |
| $ 10000 | U.S. TREASURY BOND 4% 2-15-80 | $ 9400 | 86 15/16 | $ 8694 | 3.9% | $ -706 | -7.5% | $ 400.00 | 4.6% | xxxx |
| | COMMON STOCKS (95.5%) | | | | | | | | | |
| | CONSUMER SERVICES (17.1%) | | | | | | | | | |
| 100 | HOWARD JOHNSON COMPANY | $ 2000 | 51¾ | $ 5175 | 2.3% | $ 3175 | 158.7% | $ 24.00 | 0.5% | 35.9 |
| 328 | MARRIOTT CORPORATION | 7500 | 67¾ | 22222 | 10.0 | 14722 | 196.3 | 0.00 | 0.0 | 60.5 |
| 300 | SOUTHLAND CORPORATION | 7500 | 35¼ | 10575 | 4.8 | 3075 | 41.0 | 60.00 | 0.6 | 27.1 |
| | SUBTOTAL | $ 17000 | | $ 37972 | 17.1% | $ 20972 | 123.4% | $ 84.00 | 0.2% | |
| | CONSUMER DURABLE GOODS (11.4%) | | | | | | | | | |
| 200 | AMPEX CORPORATION | $ 4000 | 8½ | $ 1700 | 0.8% | $ -2300 | -57.5% | $ 0.00 | 0.0% | xxxx |
| 250 | CHRYSLER CORPORATION | 6225 | 32⅜ | 8094 | 3.6 | 1869 | 30.0 | 150.00 | 1.9 | 19.4 |
| 100 | GENERAL MOTORS CORPORATION | 7500 | 82½ | 8250 | 3.7 | 750 | 10.0 | 340.00 | 4.1 | 12.3 |
| 150 | ZENITH RADIO CORPORATION | 6375 | 47⅞ | 7181 | 3.2 | 806 | 12.6 | 210.00 | 2.9 | 29.0 |
| | SUBTOTAL | $ 24100 | | $ 25225 | 11.4% | $ 1125 | 4.7% | $ 700.00 | 2.8% | |
| | MATERIALS (11.6%) | | | | | | | | | |
| 100 | DU PONT DE NEMOURS & COMPANY, E.I. | $ 13000 | 167¼ | $ 16725 | 7.5% | $ 3725 | 28.7% | $ 500.00 | 3.0% | 23.3 |
| 200 | UNION CARBIDE CORPORATION | 7000 | 44¾ | 8950 | 4.0 | 1950 | 27.9 | 400.00 | 4.5 | 17.7 |
| | SUBTOTAL | $ 20000 | | $ 25675 | 11.6% | $ 5675 | 28.4% | $ 900.00 | 3.5% | |
| | ENERGY: UTILITIES (2.2%) | | | | | | | | | |
| 221 | SOUTHERN COMPANY (THE) | $ 6150 | 21¾ | $ 4807 | 2.2% | $ -1343 | -21.8% | $ 287.30 | 6.0% | 12.7 |
| | COMMUNICATIONS & INFORMATION (18.3%) | | | | | | | | | |
| 300 | AMERICAN TELEPHONE & TELEGRAPH CO. | $ 12500 | 43⅞ | $ 13163 | 5.9% | $ 663 | 5.3% | $ 780.00 | 5.9% | 11.0 |
| 53 | INTERNATIONAL BUSINESS MACHINES | 15423 | 373 | 19769 | 8.9 | 4346 | 28.2 | 286.20 | 1.4 | 39.8 |
| 300 | TELEDYNE, INCORPORATED | 9000 | 26 | 7800 | 3.5 | -1200 | -13.3 | 0.00 | 0.0 | 16.4 |
| | SUBTOTAL | $ 36923 | | $ 40732 | 18.3% | $ 3809 | 10.3% | $1066.20 | 2.6% | |
| | FINANCIAL (18.4%) | | | | | | | | | |
| 150 | AMERICAN SECURITY & TRUST CO. (UTS) | $ 4100 | 49¼ | $ 7369 | 3.3% | $ 3269 | 79.7% | $ 270.00 | 3.7% | 10.3 |
| 200 | BANKAMERICA CORPORATION | 6000 | 71⅛ | 14225 | 6.4 | 8225 | 137.1 | 440.00 | 3.1 | 13.7 |
| 100 | BANKERS TRUST NEW YORK CORPORATION | 4000 | 60¼ | 6025 | 2.7 | 2025 | 50.6 | 284.00 | 4.7 | 11.3 |
| 200 | RIGGS NATIONAL BANK OF WASHINGTON | 3500 | 66½ | 13300 | 6.0 | 9800 | 280.0 | 664.00 | 5.0 | 8.2 |
| | SUBTOTAL | $ 17600 | | $ 40919 | 18.4% | $ 23319 | 132.5% | $1658.00 | 4.1% | |
| | INSURANCE (10.2%) | | | | | | | | | |
| 228 | GOVERNMENT EMPLOYEES INSURANCE CO. | $ 8012 | 99¾ | $ 22743 | 10.2% | $ 14731 | 183.9% | $ 296.40 | 1.3% | 39.0 |
| | MULTI-INDUSTRY COMPANIES (6.3%) | | | | | | | | | |
| 325 | RAYTHEON COMPANY | $ 9000 | 42⅞ | $ 13934 | 6.3% | $ 4934 | 54.8% | $ 195.00 | 1.4% | 17.6 |
| | TOTAL COMMON STOCKS | $138785 | | $212007 | 95.5% | $ 73222 | 52.8% | $5186.89 | 2.4% | |
| | GRAND TOTALS | $149475 | | $221991 | 100.0% | $ 72516 | 48.5% | $5586.89 | 2.5% | |

PORTFOLIO VALUATION
FOR: MR. FREDERIC C. TOWERS
AS OF: MARCH 16, 1972

| AMOUNT | SECURITY | ORIGINAL COST | CURRENT PRICE | CURRENT VALUE | ANNUAL INCOME | CURRENT YIELD | P/E RATIO |
|---|---|---|---|---|---|---|---|
| | CASH BALANCE $1290.00 (0.6%) | | | | | | |
| | U.S. GOVERNMENT OBLIGATIONS (3.9%) | | | | | | |
| $ 10000 | U.S. TREASURY BOND 4% 2-15-80 | $ 9400 | 86 15/16 | $ 8694 | $ 400.00 | 4.6% | xxxx |
| | COMMON STOCKS (95.5%) | | | | | | |
| | CONSUMER SERVICES (17.1%) | | | | | | |
| 100 | HOWARD JOHNSON COMPANY | $ 2000 | 51 3/4 | $ 5175 | $ 24.00 | 0.5% | 35.9 |
| 328 | MARRIOTT CORPORATION | 7500 | 67 3/4 | 22222 | 0.00 | 0.0 | 60.5 |
| 300 | SOUTHLAND CORPORATION | 7500 | 35 1/4 | 10575 | 60.00 | 0.6 | 27.1 |
| | SUBTOTAL | $ 17000 | | $ 37972 | $ 84.00 | 0.2% | |
| | CONSUMER DURABLE GOODS (11.4%) | | | | | | |
| 200 | AMPEX CORPORATION | $ 4000 | 8 1/2 | $ 1700 | $ 0.00 | 0.0% | xxxx |
| 250 | CHRYSLER CORPORATION | 6225 | 32 3/8 | 8094 | 150.00 | 1.9 | 19.4 |
| 100 | GENERAL MOTORS CORPORATION | 7500 | 82 1/2 | 8250 | 340.00 | 4.1 | 12.3 |
| 150 | ZENITH RADIO CORPORATION | 6375 | 47 7/8 | 7181 | 210.00 | 2.9 | 29.0 |
| | SUBTOTAL | $ 24100 | | $ 25225 | $ 700.00 | 2.8% | |
| | MATERIALS (11.6%) | | | | | | |
| 100 | DU PONT DE NEMOURS & COMPANY, E.I. | $ 13000 | 167 1/4 | $ 16725 | $ 500.00 | 3.0% | 23.3 |
| 200 | UNION CARBIDE CORPORATION | 7000 | 44 3/4 | 8950 | 400.00 | 4.5 | 17.7 |
| | SUBTOTAL | $ 20000 | | $ 25675 | $ 900.00 | 3.5% | |
| | ENERGY: UTILITIES (2.2%) | | | | | | |
| 221 | SOUTHERN COMPANY (THE) | $ 6150 | 21 3/4 | $ 4807 | $ 287.30 | 6.0% | 12.7 |
| | COMMUNICATIONS & INFORMATION (18.3%) | | | | | | |
| 300 | AMERICAN TELEPHONE & TELEGRAPH CO. | $ 12500 | 43 7/8 | $ 13163 | $ 780.00 | 5.9% | 11.0 |
| 53 | INTERNATIONAL BUSINESS MACHINES | 15423 | 373 | 19769 | 286.20 | 1.4 | 39.8 |
| 300 | TELEDYNE, INCORPORATED | 9000 | 26 | 7800 | 0.00 | 0.0 | 16.4 |
| | SUBTOTAL | $ 36923 | | $ 40732 | $1066.20 | 2.6% | |
| | FINANCIAL (18.4%) | | | | | | |
| 150 | AMERICAN SECURITY & TRUST CO. (UTS) | $ 4100 | 49 1/8 | $ 7369 | $ 270.00 | 3.7% | 10.3 |
| 200 | BANKAMERICA CORPORATION | 6000 | 71 1/8 | 14225 | 440.00 | 3.1 | 13.7 |
| 100 | BANKERS TRUST NEW YORK CORPORATION | 4000 | 60 1/4 | 6025 | 284.00 | 4.7 | 11.3 |
| 200 | RIGGS NATIONAL BANK OF WASHINGTON | 3500 | 66 1/2 | 13300 | 664.00 | 5.0 | 8.2 |
| | SUBTOTAL | $ 17600 | | $ 40919 | $1658.00 | 4.1% | |
| | INSURANCE (10.2%) | | | | | | |
| 228 | GOVERNMENT EMPLOYEES INSURANCE CO. | $ 8012 | 99 3/4 | $ 22743 | $ 296.40 | 1.3% | 39.0 |
| | MULTI-INDUSTRY COMPANIES (6.3%) | | | | | | |
| 325 | RAYTHEON COMPANY | $ 9000 | 42 7/8 | $ 13934 | $ 195.00 | 1.4% | 17.6 |
| | TOTAL COMMON STOCKS | $138785 | | $212007 | $5186.89 | 2.4% | |
| | GRAND TOTALS | $149475 | | $221991 | $5586.89 | 2.5% | |

PORTFOLIO VALUATION
FOR: MR. FREDERIC C. TOWERS
AS OF: MARCH 16, 1972

| AMOUNT | SECURITY | ORIGINAL COST | COST PRICE | CURRENT PRICE | CURRENT VALUE | ANNUAL INCOME | CURRENT YIELD |
|---|---|---|---|---|---|---|---|
| | CASH BALANCE $1290.00 (0.6%) | | | | | | |
| | U.S. GOVERNMENT OBLIGATIONS (3.9%) | | | | | | |
| $ 10000 | U.S. TREASURY BOND 4% 2-15-80 | $ 9400 | 94.00 | 86 15/16 | $ 8694 | $ 400.00 | 4.6% |
| | COMMON STOCKS (95.5%) | | | | | | |
| | CONSUMER SERVICES (17.1%) | | | | | | |
| 100 | HOWARD JOHNSON COMPANY | $ 2000 | 20.00 | 51¾ | $ 5175 | $ 24.00 | 0.5% |
| 328 | MARRIOTT CORPORATION | 7500 | 22.87 | 67¾ | 22222 | 0.00 | 0.0 |
| 300 | SOUTHLAND CORPORATION | 7500 | 25.00 | 35¼ | 10575 | 60.00 | 0.6 |
| | SUBTOTAL | $ 17000 | | | $ 37972 | $ 84.00 | 0.2% |
| | CONSUMER DURABLE GOODS (11.4%) | | | | | | |
| 200 | AMPEX CORPORATION | $ 4000 | 20.00 | 8½ | $ 1700 | $ 0.00 | 0.0% |
| 250 | CHRYSLER CORPORATION | 6225 | 24.90 | 32⅜ | 8094 | 150.00 | 1.9 |
| 100 | GENERAL MOTORS CORPORATION | 7500 | 75.00 | 82½ | 8250 | 340.00 | 4.1 |
| 150 | ZENITH RADIO CORPORATION | 6375 | 42.50 | 47⅞ | 7181 | 210.00 | 2.9 |
| | SUBTOTAL | $ 24100 | | | $ 25225 | $ 700.00 | 2.8% |
| | MATERIALS (11.6%) | | | | | | |
| 100 | DU PONT DE NEMOURS & COMPANY, E.I. | $ 13000 | 130.00 | 167¼ | $ 16725 | $ 500.00 | 3.0% |
| 200 | UNION CARBIDE CORPORATION | 7000 | 35.00 | 44¾ | 8950 | 400.00 | 4.5 |
| | SUBTOTAL | $ 20000 | | | $ 25675 | $ 900.00 | 3.5% |
| | ENERGY: UTILITIES (2.2%) | | | | | | |
| 221 | SOUTHERN COMPANY (THE) | $ 6150 | 27.83 | 21¾ | $ 4807 | $ 287.30 | 6.0% |
| | COMMUNICATIONS & INFORMATION (18.3%) | | | | | | |
| 300 | AMERICAN TELEPHONE & TELEGRAPH CO. | $ 12500 | 41.67 | 43⅞ | $ 13163 | $ 780.00 | 5.9% |
| 53 | INTERNATIONAL BUSINESS MACHINES | 15423 | 291.00 | 373 | 19769 | 286.20 | 1.4 |
| 300 | TELEDYNE, INCORPORATED | 9000 | 30.00 | 26 | 7800 | 0.00 | 0.0 |
| | SUBTOTAL | $ 36923 | | | $ 40732 | $1066.20 | 2.6% |
| | FINANCIAL (18.4%) | | | | | | |
| 150 | AMERICAN SECURITY & TRUST CO. (UTS) | $ 4100 | 27.33 | 49⅛ | $ 7369 | $ 270.00 | 3.7% |
| 200 | BANKAMERICA CORPORATION | 6000 | 30.00 | 71⅛ | 14225 | 440.00 | 3.1 |
| 100 | BANKERS TRUST NEW YORK CORPORATION | 4000 | 40.00 | 60¼ | 6025 | 284.00 | 4.7 |
| 200 | RIGGS NATIONAL BANK OF WASHINGTON | 3500 | 17.50 | 66½ | 13300 | 664.00 | 5.0 |
| | SUBTOTAL | $ 17600 | | | $ 40919 | $1658.00 | 4.1% |
| | INSURANCE (10.2%) | | | | | | |
| 228 | GOVERNMENT EMPLOYEES INSURANCE CO. | $ 8012 | 35.14 | 99¾ | $ 22743 | $ 296.40 | 1.3% |
| | MULTI-INDUSTRY COMPANIES (6.3%) | | | | | | |
| 325 | RAYTHEON COMPANY | $ 9000 | 27.69 | 42⅞ | $ 13934 | $ 195.00 | 1.4% |
| | TOTAL COMMON STOCKS | $138785 | | | $212007 | $5186.89 | 2.4% |
| | GRAND TOTALS | $149475 | | | $221991 | $5586.89 | 2.5% |

PORTFOLIO VALUATION
PREPARED FOR: MR. FREDERIC C. TOWERS
AS OF: MARCH 16, 1972

| AMOUNT | SECURITY | PRICE | VALUE |
|---|---|---|---|
| $10000 | U.S. TREASURY BOND 4% 2-15-80 | 86 15/16 | $ 8694 |
| 150 | AMERICAN SECURITY & TRUST CO. (UTS) | 49 1/8 | 7369 |
| 300 | AMERICAN TELEPHONE & TELEGRAPH CO. | 43 7/8 | 13163 |
| 200 | AMPEX CORPORATION | 8 1/2 | 1700 |
| 200 | BANKAMERICA CORPORATION | 71 1/8 | 14225 |
| 100 | BANKERS TRUST NEW YORK CORPORATION | 60 1/4 | 6025 |
| 250 | CHRYSLER CORPORATION | 32 3/8 | 8094 |
| 100 | DU PONT DE NEMOURS & COMPANY, E.I. | 167 1/4 | 16725 |
| 100 | GENERAL MOTORS CORPORATION | 82 1/2 | 8250 |
| 228 | GOVERNMENT EMPLOYEES INSURANCE CO. | 99 3/4 | 22743 |
| 100 | HOWARD JOHNSON COMPANY | 51 3/4 | 5175 |
| 53 | INTERNATIONAL BUSINESS MACHINES | 373 | 19769 |
| 328 | MARRIOTT CORPORATION | 67 3/4 | 22222 |
| 325 | RAYTHEON COMPANY | 42 7/8 | 13934 |
| 200 | RIGGS NATIONAL BANK OF WASHINGTON | 66 1/2 | 13300 |
| 221 | SOUTHERN COMPANY (THE) | 21 3/4 | 4807 |
| 300 | SOUTHLAND CORPORATION | 35 1/4 | 10575 |
| 300 | TELEDYNE, INCORPORATED | 26 | 7800 |
| 200 | UNION CARBIDE CORPORATION | 44 3/4 | 8950 |
| 150 | ZENITH RADIO CORPORATION | 47 7/8 | 7181 |
| $ 1290 | CASH BALANCE | | $ 1290 |
| | | TOTAL | $221991 |

PORTFOLIO VALUATION
PREPARED FOR: MR. FREDERIC C. TOWERS
AS OF: MARCH 16, 1972

| Amount | Security | Original Cost | Cost Price | Current Price | Current Value | Annual Income | Current Yield |
|---|---|---|---|---|---|---|---|
| $10000 | U.S. TREASURY BOND 4% 2-15-80 | $ 9400 | 94.00 | 86 15/16 | $ 8694 | $ 400 | 4.6% |
| 150 | AMERICAN SECURITY & TRUST CO. (UTS) | 4100 | 27.33 | 49 1/8 | 7369 | 270 | 3.7 |
| 300 | AMERICAN TELEPHONE & TELEGRAPH CO. | 12500 | 41.67 | 43 7/8 | 13163 | 780 | 5.9 |
| 200 | AMPEX CORPORATION | 4000 | 20.00 | 8 1/2 | 1700 | 0 | 0.0 |
| 200 | BANKAMERICA CORPORATION | 6000 | 30.00 | 71 1/8 | 14225 | 440 | 3.1 |
| 100 | BANKERS TRUST NEW YORK CORPORATION | 4000 | 40.00 | 60 1/4 | 6025 | 284 | 4.7 |
| 250 | CHRYSLER CORPORATION | 6225 | 24.90 | 32 3/8 | 8094 | 150 | 1.9 |
| 100 | DU PONT DE NEMOURS & COMPANY, E.I. | 13000 | 130.00 | 167 1/4 | 16725 | 500 | 3.0 |
| 100 | GENERAL MOTORS CORPORATION | 7500 | 75.00 | 82 1/2 | 8250 | 340 | 4.1 |
| 228 | GOVERNMENT EMPLOYEES INSURANCE CO. | 8012 | 35.14 | 99 3/4 | 22743 | 296 | 1.3 |
| 100 | HOWARD JOHNSON COMPANY | 2000 | 20.00 | 51 3/4 | 5175 | 24 | 0.5 |
| 53 | INTERNATIONAL BUSINESS MACHINES | 15423 | 291.00 | 373 | 19769 | 286 | 1.4 |
| 328 | MARRIOTT CORPORATION | 7500 | 22.87 | 67 3/4 | 22222 | 0 | 0.0 |
| 325 | RAYTHEON COMPANY | 9000 | 27.69 | 42 7/8 | 13934 | 195 | 1.4 |
| 200 | RIGGS NATIONAL BANK OF WASHINGTON | 3500 | 17.50 | 66 1/2 | 13300 | 664 | 5.0 |
| 221 | SOUTHERN COMPANY (THE) | 6150 | 27.83 | 21 3/4 | 4807 | 287 | 6.0 |
| 300 | SOUTHLAND CORPORATION | 7500 | 25.00 | 35 1/4 | 10575 | 60 | 0.6 |
| 300 | TELEDYNE, INCORPORATED | 9000 | 30.00 | 26 | 7800 | 0 | 0.0 |
| 200 | UNION CARBIDE CORPORATION | 7000 | 35.00 | 44 3/4 | 8950 | 400 | 4.5 |
| 150 | ZENITH RADIO CORPORATION | 6375 | 42.50 | 47 7/8 | 7181 | 210 | 2.9 |
| | CASH BALANCE | 1290 | | | 1290 | | |
| | TOTALS | $149475 | | | $221991 | $5586 | 2.5% |

PORTFOLIO VALUATION
PREPARED FOR: MR. FREDERIC C. TOWERS
AS OF: MARCH 16, 1972

| AMOUNT | SECURITY | ORIGINAL COST | COST PRICE | CURRENT PRICE | CURRENT VALUE |
|---|---|---|---|---|---|
| $10000 | U.S. TREASURY BOND 4% 2-15-80 | $ 9400 | 94.00 | 86 15/16 | $ 8694 |
| 150 | AMERICAN SECURITY & TRUST CO. (UTS) | 4100 | 27.33 | 49 1/8 | 7369 |
| 300 | AMERICAN TELEPHONE & TELEGRAPH CO. | 12500 | 41.67 | 43 7/8 | 13163 |
| 200 | AMPEX CORPORATION | 4000 | 20.00 | 8 1/2 | 1700 |
| 200 | BANKAMERICA CORPORATION | 6000 | 30.00 | 71 1/8 | 14225 |
| 100 | BANKERS TRUST NEW YORK CORPORATION | 4000 | 40.00 | 60 1/4 | 6025 |
| 250 | CHRYSLER CORPORATION | 6225 | 24.90 | 32 3/8 | 8094 |
| 100 | DU PONT DE NEMOURS & COMPANY, E.I. | 13000 | 130.00 | 167 1/4 | 16725 |
| 100 | GENERAL MOTORS CORPORATION | 7500 | 75.00 | 82 1/2 | 8250 |
| 228 | GOVERNMENT EMPLOYEES INSURANCE CO. | 8012 | 35.14 | 99 3/4 | 22743 |
| 100 | HOWARD JOHNSON COMPANY | 2000 | 20.00 | 51 3/4 | 5175 |
| 53 | INTERNATIONAL BUSINESS MACHINES | 15423 | 291.00 | 373 | 19769 |
| 328 | MARRIOTT CORPORATION | 7500 | 22.87 | 67 3/4 | 22222 |
| 325 | RAYTHEON COMPANY | 9000 | 27.69 | 42 7/8 | 13934 |

-continued

PORTFOLIO VALUATION
PREPARED FOR: MR. FREDERIC C. TOWERS
AS OF: MARCH 16, 1972

| AMOUNT | SECURITY | ORIGINAL COST | COST PRICE | CURRENT PRICE | CURRENT VALUE |
|---|---|---|---|---|---|
| 200 | RIGGS NATIONAL BANK OF WASHINGTON | 3500 | 17.50 | 66 1/2 | 13300 |
| 221 | SOUTHERN COMPANY (THE) | 6150 | 27.83 | 21 3/4 | 4807 |
| 300 | SOUTHLAND CORPORATION | 7500 | 25.00 | 35 1/4 | 10575 |
| 300 | TELEDYNE, INCORPORATED | 9000 | 30.00 | 26 | 7800 |
| 200 | UNION CARBIDE CORPORATION | 7000 | 35.00 | 44 3/4 | 8950 |
| 150 | ZENITH RADIO CORPORATION | 6375 | 42.50 | 47 7/8 | 7181 |
|  | CASH BALANCE | 1290 |  |  | 1290 |
|  | TOTALS | $149475 |  |  | $221991 |

PROFIT SCHEDULE
PREPARED FOR: MR. FREDERIC C. TOWERS
AS OF: MARCH 16, 1972

| Amount | Security | Original Cost | Cost Price | Current Price | Current Value | Gain Or (−Loss) | % Gain (−Loss) |
|---|---|---|---|---|---|---|---|
| $10000 | U.S. TREASURY BOND 4% 2-15-80 | $ 9400 | 94.00 | 86 15/16 | $ 8694 | $ −706 | −7.5% |
| 150 | AMERICAN SECURITY & TRUST CO. (UTS) | 4100 | 27.33 | 49 1/8 | 7369 | 3269 | 79.7 |
| 300 | AMERICAN TELEPHONE & TELEGRAPH CO. | 12500 | 41.67 | 43 7/8 | 13163 | 663 | 5.3 |
| 200 | AMPEX CORPORATION | 4000 | 20.00 | 8 1/2 | 1700 | −2300 | −57.5 |
| 200 | BANKAMERICA CORPORATION | 6000 | 30.00 | 71 1/8 | 14225 | 8225 | 137.1 |
| 100 | BANKERS TRUST NEW YORK CORPORATION | 4000 | 40.00 | 60 1/4 | 6025 | 2025 | 50.6 |
| 250 | CHRYSLER CORPORATION | 6225 | 24.90 | 32 3/8 | 8094 | 1869 | 30.0 |
| 100 | DU PONT DE NEMOURS & COMPANY, E.I. | 13000 | 130.00 | 167 1/4 | 16725 | 3725 | 28.7 |
| 100 | GENERAL MOTORS CORPORATION | 7500 | 75.00 | 82 1/2 | 8250 | 750 | 10.0 |
| 228 | GOVERNMENT EMPLOYEES INSURANCE CO. | 8012 | 35.14 | 99 3/4 | 22743 | 14731 | 183.9 |
| 100 | HOWARD JOHNSON COMPANY | 2000 | 20.00 | 51 3/4 | 5175 | 3175 | 158.7 |
| 53 | INTERNATIONAL BUSINESS MACHINES | 15423 | 291.00 | 373 | 19769 | 4346 | 28.2 |
| 328 | MARRIOTT CORPORATION | 7500 | 22.87 | 67 3/4 | 22222 | 14722 | 196.3 |
| 325 | RAYTHEON COMPANY | 9000 | 27.69 | 42 7/8 | 13934 | 4934 | 54.8 |
| 200 | RIGGS NATIONAL BANK OF WASHINGTON | 3500 | 17.50 | 66 1/2 | 13300 | 9800 | 280.0 |
| 221 | SOUTHERN COMPANY (THE) | 6150 | 27.83 | 21 3/4 | 4807 | −1343 | −21.8 |
| 300 | SOUTHLAND CORPORATION | 7500 | 25.00 | 35 1/4 | 10575 | 3075 | 41.0 |
| 300 | TELEDYNE, INCORPORATED | 9000 | 30.00 | 26 | 7800 | −1200 | −13.3 |
| 200 | UNION CARBIDE CORPORATION | 7000 | 35.00 | 44 3/4 | 8950 | 1950 | 27.9 |
| 150 | ZENITH RADIO CORPORATION | 6375 | 42.50 | 47 7/8 | 7181 | 806 | 12.6 |
|  | CASH BALANCE | 1290 |  |  | 1290 |  |  |
|  | TOTALS | $149475 |  |  | $221991 | $ 72516 | 48.9% |

SCHEDULE OF UNREALIZED GAINS & LOSSES
PREPARED FOR: MR. FREDERIC C. TOWERS
AS OF: MARCH 16, 1972

| AMOUNT | SECURITY | PRICE | VALUE | COST | GAIN (−LOSS) | PERCENT |
|---|---|---|---|---|---|---|
| 228 | GOVERNMENT EMPLOYEES INSURANCE CO. | 99 3/4 | $ 22743 | $ 8012 | $ 14731 | 183.9 |
| 328 | MARRIOTT CORPORATION | 67 3/4 | 22222 | 7500 | 14722 | 196.3 |
| 200 | RIGGS NATIONAL BANK OF WASHINGTON | 66 1/2 | 13300 | 3500 | 9800 | 280.0 |
| 200 | BANKAMERICA CORPORATION | 71 1/8 | 14225 | 6000 | 8225 | 137.1 |
| 325 | RAYTHEON COMPANY | 42 7/8 | 13934 | 9000 | 4934 | 54.8 |
| 53 | INTERNATIONAL BUSINESS MACHINES | 373 | 19769 | 15423 | 4346 | 28.2 |
| 100 | DU PONT DE NEMOURS & COMPANY, E.I. | 167 1/4 | 16725 | 13000 | 3725 | 28.7 |
| 150 | AMERICAN SECURITY & TRUST CO. (UTS) | 49 1/8 | 7369 | 4100 | 3269 | 79.7 |
| 100 | HOWARD JOHNSON COMPANY | 51 3/4 | 5175 | 2000 | 3175 | 158.7 |
| 300 | SOUTHLAND CORPORATION | 35 1/4 | 10575 | 7500 | 3075 | 41.0 |
| 100 | BANKERS TRUST NEW YORK CORPORATION | 60 1/4 | 6025 | 4000 | 2025 | 50.6 |
| 200 | UNION CARBIDE CORPORATION | 44 3/4 | 8950 | 7000 | 1950 | 27.9 |
| 250 | CHRYSLER CORPORATION | 32 3/8 | 8094 | 6225 | 1869 | 30.0 |
| 150 | ZENITH RADIO CORPORATION | 47 7/8 | 7181 | 6375 | 806 | 12.6 |
| 100 | GENERAL MOTORS CORPORATION | 82 1/2 | 8250 | 7500 | 750 | 10.0 |
| 300 | AMERICAN TELEPHONE & TELEGRAPH CO. | 43 7/8 | 13163 | 12500 | 663 | 5.3 |
| $10000 | U.S. TREASURY BOND 4% 2-15-80 | 86 15/16 | 8694 | 9400 | −706 | −7.5 |
| 300 | TELEDYNE, INCORPORATED | 26 | 7800 | 9000 | −1200 | −13.3 |
| 221 | SOUTHERN COMPANY (THE) | 21 3/4 | 4807 | 6150 | −1343 | −21.8 |
| 200 | AMPEX CORPORATION | 8 1/2 | 1700 | 4000 | −2300 | −57.5 |
|  | CASH BALANCE |  | 1290 | 1290 |  |  |
|  | TOTALS |  | $221991 | $149475 | $ 72516 | 48.9% |

SCHEDULE OF UNREALIZED GAINS & LOSSES
PREPARED FOR: MR. FREDERIC C. TOWERS
AS OF: MARCH 16, 1972

| AMOUNT | SECURITY | PRICE | VALUE | COST | GAIN (−LOSS) | PERCENT |
|---|---|---|---|---|---|---|
| 200 | RIGGS NATIONAL BANK OF WASHINGTON | 66½ | $ 7 13300 | $ 3500 | $ 9800 | 280.0% |
| 328 | MARRIOTT CORPORATION | 67¾ | 22222 | 7500 | 14722 | 196.3 |
| 228 | GOVERNMENT EMPLOYEES INSURANCE CO. | 99¾ | 22743 | 8012 | 14731 | 183.9 |
| 100 | HOWARD JOHNSON COMPANY | 51¾ | 5175 | 2000 | 3175 | 158.7 |
| 200 | BANKAMERICA CORPORATION | 71⅛ | 14225 | 6000 | 8225 | 137.1 |
| 150 | AMERICAN SECURITY & TRUST CO. (UTS) | 49⅛ | 7369 | 4100 | 3269 | 79.7 |
| 325 | RAYTHEON COMPANY | 42⅞ | 13934 | 9000 | 4934 | 54.8 |
| 100 | BANKERS TRUST NEW YORK CORPORATION | 60¼ | 6025 | 4000 | 2025 | 50.6 |
| 300 | SOUTHLAND CORPORATION | 35¼ | 10575 | 7500 | 3075 | 41.0 |
| 250 | CHRYSLER CORPORATION | 32⅜ | 8094 | 6225 | 1869 | 30.0 |
| 100 | DU PONT DE NEMOURS & COMPANY, E.I. | 167¼ | 16725 | 13000 | 3725 | 28.7 |
| 53 | INTERNATIONAL BUSINESS MACHINES | 373 | 19769 | 15423 | 4346 | 28.2 |
| 200 | UNION CARBIDE CORPORATION | 44¾ | 8950 | 7000 | 1950 | 27.9 |
| 150 | ZENITH RADIO CORPORATION | 47⅞ | 7181 | 6375 | 806 | 12.6 |
| 100 | GENERAL MOTORS CORPORATION | 82½ | 8250 | 7500 | 750 | 10.0 |
| 300 | AMERICAN TELEPHONE & TELEGRAPH CO. | 43⅞ | 13163 | 12500 | 663 | 5.3 |
| $10000 | U.S. TREASURY BOND 4% 2-15-80 | 86 15/16 | 8694 | 9400 | −706 | −7.5 |
| 300 | TELEDYNE, INCORPORATED | 26 | 7800 | 9000 | −1200 | −13.3 |
| 221 | SOUTHERN COMPANY (THE) | 21¾ | 4807 | 6150 | −1343 | −21.8 |
| 200 | AMPEX CORPORATION | 8½ | 1700 | 4000 | −2300 | −57.5 |
|  | CASH BALANCE |  | 1290 | 1290 |  |  |
|  |  | TOTALS | $221991 | $149475 | $ 72516 | 48.9% |

PURCHASE RECOMMENDATION
FOR: FREDERIC C. TOWERS
AS OF: FEBRUARY 4, 1972

| AMOUNT | SECURITY | CURRENT PRICE | APPROXIMATE COST | INDICATED DIV/INT | ANNUAL INCOME | CURRENT YIELD | P/E RATIO |
|---|---|---|---|---|---|---|---|
|  | COMMON STOCKS (100.0%) |  |  |  |  |  |  |
|  | CONSUMER SERVICES (43.1%) |  |  |  |  |  |  |
| 100 | MARRIOTT CORPORATION | 69 | $ 6900 | $0.00 | $ 0.00 | 0.0% | 64.5 |
| 300 | SOUTHLAND CORPORATION | 37¾ | 11325 | 0.20 | 60.00 | 0.5 | 29.0 |
|  | SUBTOTAL |  | $18225 |  | $ 60.00 | 0.3% |  |
|  | CONSUMER DURABLE GOODS (21.8%) |  |  |  |  |  |  |
| 300 | CHRYSLER CORPORATION | 30¾ | $ 9225 | $0.60 | $180.00 | 2.0% | 27.7 |
|  | COMMUNICATIONS & INFORMATION (35.0%) |  |  |  |  |  |  |
| 40 | INTERNATIONAL BUSINESS MACHINES | 369¾ | $14790 | $5.40 | $216.00 | 1.5% | 39.4 |
|  | TOTAL COMMON STOCKS |  | $42240 |  | $456.00 | 1.1% |  |
|  | GRAND TOTALS |  | $42240 |  | $456.00 | 1.1% |  |

FOR: FREDERIC C. TOWERS
AS OF: FEBRUARY 4, 1972

| AMOUNT | SECURITY | ORIGINAL COST | PREVIOUS PRICE* | CURRENT PRICE | CURRENT VALUE | % OF TOTAL | % GAIN (−LOSS) | ANNUAL INCOME | CURRENT YIELD | P/E RATIO |
|---|---|---|---|---|---|---|---|---|---|---|
| | CASH BALANCE $825.00 (0.4%) | | | | | | | | | |
| | U.S. GOVERNMENT OBLIGATIONS (3.9%) | | | | | | | | | |
| $10000 | U.S. TREASURY BOND 4% 2-15-80 | $ 9400 | 86 11/16 | 86¼ | $ 8675 | 3.9% | −7.7% | $ 400.00 | 4.6% | **** |
| | COMMON STOCKS (95.8%) | | | | | | | | | |
| | CONSUMER SERVICES (25.5%) | | | | | | | | | |
| 100 | HOWARD JOHNSON COMPANY | $ 2000 | 44⅞ | 49¼ | $ 4925 | 2.2% | 146.2% | $ 24.00 | 0.5% | 34.2 |
| 428 | MARRIOTT CORPORATION | 14450 | 62¼ | 69 | 29532 | 13.2 | 104.4 | 0.00 | 0.0 | 64.5 |
| 600 | SOUTHLAND CORPORATION | 18900 | 36¼ | 37¾ | 22650 | 10.1 | 19.8 | 120.00 | 0.5 | 29.0 |
| | SUBTOTAL | $ 35350 | | | $ 57107 | 25.5% | 61.5% | $ 144.00 | 0.3% | |
| | CONSUMER DURABLE GOODS (14.0%) | | | | | | | | | |
| 550 | CHRYSLER CORPORATION | $ 15525 | 31⅛ | 30¾ | $ 16913 | 7.6% | 8.9% | $ 330.00 | 2.0% | 27.7 |
| 100 | GENERAL MOTORS CORPORATION | 7500 | 81 | 80¼ | 8025 | 3.6 | 7.0 | 340.00 | 4.2 | 18.4 |
| 150 | ZENITH RADIO CORPORATION | 6375 | 43¼ | 42 | 6300 | 2.8 | −1.2 | 210.00 | 3.3 | 26.1 |
| | SUBTOTAL | $ 29400 | | | $ 31238 | 14.0% | 6.3% | $ 880.00 | 2.8% | |
| | MATERIALS (11.1%) | | | | | | | | | |
| 100 | DU PONT DE NEMOURS & COMPANY, E.I. | $ 13000 | 153⅝ | 161 | $ 16100 | 7.2% | 23.8% | $ 500.00 | 3.1% | 22.4 |
| 200 | UNION CARBIDE CORPORATION | 7000 | 44⅞ | 43⅞ | 8775 | 3.9 | 25.4 | 400.00 | 4.6 | 16.9 |
| | SUBTOTAL | $ 20000 | | | $ 24875 | 11.1% | 24.4% | $ 900.00 | 3.6% | |
| | ENERGY: UTILITIES (2.1%) | | | | | | | | | |
| 221 | SOUTHERN COMPANY (THE) | $ 6150 | 21¼ | 21⅜ | $ 4724 | 2.1% | −23.2% | $ 287.30 | 6.1% | 12.5 |
| | COMMUNICATIONS & INFORMATION (19.4%) | | | | | | | | | |
| 200 | AMERICAN TELEPHONE & TELEGRAPH CO. | $ 8150 | 44¼ | 45⅜ | $ 9075 | 4.1% | 11.3% | $ 520.00 | 5.7% | 11.3 |
| 93 | INTERNATIONAL BUSINESS MACHINES | 30243 | 368 | 369¼ | 34387 | 15.4 | 13.7 | 502.20 | 1.5 | 39.4 |
| | SUBTOTAL | $ 38393 | | | $ 43462 | 19.4% | 13.2% | $1022.20 | 2.4% | |
| | FINANCIAL (14.7%) | | | | | | | | | |
| 200 | BANKAMERICA CORPORATION | $ 6000 | 71⅝ | 70¼ | $ 14050 | 6.3% | 134.2% | $ 440.00 | 3.1% | 13.6 |
| 100 | BANKERS TRUST NEW YORK CORPORATION | 4000 | 59⅜ | 58⅝ | 5863 | 2.6 | 46.6 | 284.00 | 4.8 | 11.0 |
| 200 | RIGGS NATIONAL BANK OF WASHINGTON | 3500 | 63¼ | 65¼ | 13050 | 5.8 | 272.9 | 640.00 | 4.9 | 8.1 |
| | SUBTOTAL | $ 13500 | | | $ 32963 | 14.7% | 144.2% | $ 1364.00 | 4.1% | |
| | INSURANCE (8.8%) | | | | | | | | | |
| 228 | GOVERNMENT EMPLOYEES INSURANCE CO. | $ 8012.86 | | 86¼ | $ 19665 | 8.8% | 145.4% | $ 296.40 | 1.5% | 39.7 |
| | TOTAL COMMON STOCKS | $150805 | | | $214034 | 95.8% | 41.9% | $4893.89 | 2.3% | |
| | GRAND TOTALS | $161030 | | | $223534 | 100.0% | 38.8% | $5293.90 | 2.4% | |

*PREVIOUS PRICES AS OF JANUARY 31, 1972

VALPORT
ESTATE VALUATION
FOR ESTATE OF: FREDERIC C. TOWERS
AS OF: SEPTEMBER 28, 1971

| AMOUNT | SECURITY | LOW/BID PRICE | HIGH/ASKED PRICE | MEAN PRICE | VALUE |
|---|---|---|---|---|---|
| $ 10000 | U.S. TREASURY BOND 4% 2-15-72 | 91 | 92 | 91.5000 | $ 9150.00 |
| 300 | AMERICAN TELEPHONE & TELEGRAPH CO. | 42½ | 43 | 42.7500 | 12825.00 |
| 200 | DU PONT DE NEMOURS & COMPANY, E.I. | 123 | 123⅞ | 123.4375 | 24687.50 |
| 100 | GENERAL MOTORS CORPORATION | 78 | 78½ | 78.2500 | 7825.00 |
| 1000 | INTERNATIONAL BANK OF WASH. D.C. | 6½ | *** | 6.5000 | 6500.00 |
| 63 | INTERNATIONAL BUSINESS MACHINES | 300 | 302 | 301.0000 | 18963.00 |
| 253.166 | INVESTMENT COMPANY OF AMERICA | 13.55 | 14.70 | 14.7000 | 3721.54 |
| 500 | MARRIOT CORPORATION | 45 | 45⅛ | 45.0625 | 22531.25 |
| 300 | SOUTHLAND CORPORATION | 29 | 29⅜ | 29.1875 | 8756.25 |
| 8100.344 | WASHINGTON MUTUAL INVESTORS FUND | 12.97 | 14.03 | 13.4400* | 108868.50 |
|  |  |  |  | TOTAL | $223828.00 |

*MUTUAL FUND OFFERING PRICE ADJUSTED FOR VOLUME DISCOUNT

VALPORT
ESTATE VALUATION
FOR ESTATE OF: FREDERIC N. TOWERS
AS OF: OCTOBER 2, 1971

| AMOUNT | SECURITY | PRECEDING MARKET LO/BID PRICE | PRECEDING MARKET HI/ASK PRICE | PRECEDING MARKET MEAN PRICE | FOLLOWING MARKET LO/BID PRICE | FOLLOWING MARKET HI/ASK PRICE | FOLLOWING MARKET MEAN PRICE | MEAN MEAN PRICE | VALUE |
|---|---|---|---|---|---|---|---|---|---|
| $10000 | AMERICAN TEL & TEL 7.75% 12-1-77 | 103 | 104¼ | 103.7500 | 103 | 104¾ | 103.8750 | 103.8125 | $10381.25 |
| $25000 | GENERAL MOTORS ACCPT. 3.5% 3-15-72 | 98 | 98½ | 98.2500 | 98¼ | 99 | 98.7500 | 98.5000 | 24625.00 |
| $10000 | GEORGIA-PACIFIC CORP 5.25% CV 4-1-96 | 103 | 103 | 103.0000 | 103 | 104 | 103.5000 | 103.2500 | 10325.00 |
| $10000 | TRANS WORLD AIRLINES 10% CTF 5-15-85 | 100 | 101 | 100.5000 | 100 | 100½ | 100.2500 | 100.3750 | 10037.50 |
| $25000 | U.S. PLYWOOD-CHAMPION 4.625% 7-1-90 | 64 | 65 | 64.5000 | 64 | 65 | 64.5000 | 64.5000 | 16125.00 |
| $20000 | U.S. TREASURY BOND 4% 2-15-72 | 91 | 92 | 91.5000 | 91 | 92 | 91.5000 | 91.5000 | 18300.00 |
| $10000 | U.S. TREASURY BOND 4% 2-15-80 | 87 | 88 | 87.5000 | 87 | 89 | 88.0000 | 87.7500 | 8775.00 |
| $20000 | UNION OIL CO OF CAL 4.25% CV 6-1-91 | 151 | 152 | 151.5000 | 151 | 153 | 152.0000 | 151.7500 | 30350.00 |
| 300 | AMERICAN AIRLINES, INCORPORATED | 33 | 33½ | 33.1250 | 33½ | 33½ | 33.3750 | 33.2500 | 9975.00 |
| 300 | AMERICAN SECURITY & TRUST CO. (UTS) | 50 | 51 | 50.5000 | 50 | 51 | 50.5000 | 50.5000 | 15150.00 |
| 400 | AMERICAN TELEPHONE & TELEGRAPH CO. | 41¼ | 41½ | 41.3750 | 41¼ | 41¼ | 41.2500 | 41.3125 | 16525.00 |
| 300 | AMPEX CORPORATION | 22 | 22½ | 22.2500 | 23 | 23½ | 23.2500 | 22.6875 | 6806.25 |
| 250 | AVCO CORPORATION | 13 | 13⅜ | 13.1875 | 13½ | 14 | 13.6250 | 13.4062 | 3351.56 |
| 300 | AVCO CORPORATION $3.20 CV PFD | 45 | 46 | 45.5000 | 45 | 45½ | 45.1250 | 45.3125 | 13593.75 |
| 300 | AVON PRODUCTS, INCORPORATED | 93 | 94 | 93.5000 | 93 | 94 | 93.5000 | 93.5000 | 28050.00 |
| 300 | BULOVA WATCH COMPANY, INCORPORATED | 20 | 21 | 20.5000 | 20½ | 21 | 20.7500 | 20.6250 | 6187.50 |
| 300 | CHRYSLER CORPORATION | 30 | 31 | 30.5000 | 30¼ | 30½ | 30.3750 | 30.4375 | 9131.25 |
| 200 | COLUMBIA BROADCASTING SYSTEM, INC. | 45 | 45 | 45.0000 | 45 | 45½ | 45.2500 | 45.1250 | 9025.00 |
| 80 | DU PONT DE NEMOURS & COMPANY, E.I. | 123 | 123¼ | 123.1250 | 123½ | 124⅝ | 124.0625 | 123.5937 | 9887.50 |
| 100 | EASTMAN KODAK COMPANY | 81 | 81¼ | 81.1250 | 82 | 82⅝ | 82.2500 | 81.6675 | 6166.75 |
| 500 | GARFINCKEL, BROOKS BROS, M & R | 20 | 21 | 20.5000 | 20 | 20½ | 20.2500 | 20.3750 | 10187.50 |
| 100 | GENERAL ELECTRIC COMPANY | 78 | 78½ | 78.2500 | 78 | 78½ | 78.1250 | 78.1875 | 7618.75 |
| 600 | GENERAL MILLS, INCORPORATED | 36¼ | 36½ | 36.3750 | 36 | 36½ | 36.2500 | 36.3125 | 21787.50 |
| 200 | GENERAL MOTORS CORPORATION | 81 | 81¼ | 81.1250 | 81¼ | 81⅝ | 81.4375 | 81.2812 | 16256.25 |
| 200 | GOODYEAR TIRE & RUBBER COMPANY (THE) | 34 | 35 | 34.5000 | 34⅝ | 35 | 34.5625 | 34.5312 | 6906.25 |
| 600 | GOVERNMENT EMPLOYEES INSURANCE CO. | 81 | *** ***** | 81.0000 | 81 | *** ****** | 81.0000 | 81.0000 | 48600.00 |
| 550 | GREATER WASHINGTON INVESTORS, INC. | 6 | 6¼ | 6.1250 | 6¼ | 6¼ | 6.1875 | 6.2107 | 3420.31 |
| 1100 | INTERNATIONAL BANK OF WASH. D.C. | 6 | 6¼ | 6.1250 | 6 | 6¼ | 6.2500 | 6.1875 | 6806.25 |
| 100 | INTERNATIONAL BUSINESS MACHINES | 301 | 304 | 302.5000 | 304 | 310 | 307.0000 | 304.7500 | 30475.00 |
| 100 | INTERNATIONAL TELEPHONE & TELEGRAPH | 56 | 57 | 56.5000 | 57 | 57½ | 57.2500 | 56.8750 | 5687.50 |
| 123.456 | INVESTMENT COMPANY OF AMERICA | 13.83 | 15.12 | 15.1200 | 13.87 | 15.16 | 15.1600 | 15.1400 | 1869.12 |
| 800 | MARRIOTT CORPORATION | 44 | 44½ | 44.2500 | 45 | 45½ | 45.1250 | 44.6875 | 35750.00 |
| 500 | MERRILL LYNCH, PIERCE F & S, INC. | 36 | 36½ | 36.2500 | 36 | 36¼ | 36.1250 | 36.1875 | 18093.75 |
| 1000 | MORTGAGE INVESTORS OF WASHINGTON (THE) | 13 | 13½ | 13.2500 | 13 | 13¾ | 13.3750 | 13.3125 | 13312.50 |
| 100 | NATIONAL CASH REGISTER COMPANY (THE) | 41 | 42 | 41.5000 | 41 | 41¾ | 41.4375 | 41.4687 | 4146.86 |
| 200 | OWENS-CORNING FIBERGLAS CORPORATION | 46 | 47 | 46.5000 | 46⅜ | 47½ | 47.0625 | 46.7812 | 9356.25 |
| 300 | PAN AMERICAN WORLD AIRWAYS, INC. | 11 | 12 | 11.5000 | 11⅛ | 11⅜ | 11.2500 | 11.3750 | 3412.50 |
| 300 | POTOMAC ELECTRIC POWER $2.44 CV PFD | 43 | 44 | 43.5000 | 43 | 44 | 43.5000 | 43.5000 | 13050.00 |
| 300 | POTOMAC ELECTRIC POWER COMPANY | 14 | 14¼ | 14.1250 | 14 | 14¼ | 14.1250 | 14.1875 | 4256.25 |
| 400 | PROCTER & GAMBLE COMPANY (THE) | 72 | 72⅝ | 72.0625 | 72 | 72⅝ | 72.3125 | 72.1875 | 28875.00 |
| 500 | R C A CORPORATION | 33⅝ | 34⅛ | 33.8750 | 33⅜ | 34 | 33.8125 | 33.8437 | 16921.87 |
| 200 | ROBERTSHAW CONTROLS COMPANY | 40¼ | 40⅞ | 40.5625 | 40¾ | 41 | 40.9375 | 40.7500 | 8150.00 |
| 500 | SONY CORPORATION (ADR) | 17⅞ | 17½ | 17.6875 | 17¾ | 18 | 17.8750 | 17.7812 | 8890.63 |
| 400 | SOUTHLAND CORPORATION | 32¼ | 33 | 32.8750 | 32¼ | 33½ | 32.9375 | 32.9062 | 13162.50 |
| 400 | STANDARD OIL COMPANY (INDIANA) | 66 | 67 | 66.5000 | 66 | 66½ | 66.2500 | 66.3750 | 26550.00 |

-continued

**\*\*\*VALPORT\*\***
ESTATE VALUATION
FOR ESTATE OF: FREDERIC N. TOWERS
AS OF: OCTOBER 2, 1971

| AMOUNT | SECURITY | PRECEDING MARKET | | | FOLLOWING MARKET | | | MEAN | |
|---|---|---|---|---|---|---|---|---|---|
| | | LO/BID PRICE | HI/ASK PRICE | MEAN PRICE | LO/BID PRICE | HI/ASK PRICE | MEAN PRICE | MEAN PRICE | VALUE |
| 200 | STANDARD OIL COMPANY (NEW JERSEY) | 53 | 54 | 53.5000 | 53 | 54 | 53.5000 | 53.5000 | 10700.00 |
| 300 | TENNECO, INCORPORATED | 25¾ | 25⅞ | 25.7500 | 25¾ | 26 | 25.8750 | 25.8125 | 7743.75 |
| 500 | TEXTRON, INCORPORATED | 30 | 30¼ | 30.1250 | 30½ | 31 | 30.7500 | 30.4375 | 15218.75 |
| 500 | TRAVELERS CORPORATION (THE) | 38⅝ | 38¾ | 38.6875 | 38⅝ | 39 | 38.8125 | 38.7500 | 19375.00 |
| 200 | U A L, INCORPORATED | 37 | 38 | 37.5000 | 38 | 39 | 38.5000 | 38.0000 | 7600.00 |
| 100 | UNITED STATES STEEL CORPORATION | 29 | 30 | 29.5000 | 29 | 29½ | 29.2500 | 29.3750 | 2937.50 |
| 200 | UNIVERSAL OIL PRODUCTS COMPANY | 17⅞ | 18 | 17.9375 | 18 | 18⅛ | 18.0625 | 18.0000 | 3600.00 |
| 500 | WASHINGTON GAS LIGHT COMPANY | 33 | 34 | 33.5000 | 33 | 33½ | 33.2500 | 33.3750 | 16687.50 |
| 8743.277 | WASHINGTON MUTUAL INVESTORS FUND | 12.85 | 14.04 | 13.3200* | 12.87 | 14.07 | 13.3400* | 13.3300 | 116547.70 |
| 300 | WETTERAU FOODS, INCORPORATED | 27¼ | 27½ | 27.3750 | 27¼ | 27⅝ | 27.4375 | 27.4062 | 8221.88 |
| 200 | XEROX CORPORATION | 116 | 116½ | 116.2500 | 115 | 116 | 115.5000 | 115.8750 | 23175.00 |
| | | | | | | | | TOTAL | $860319.70 |

*MUTUAL FUND OFFERING PRICE ADJUSTED FOR VOLUME DISCOUNT

| FILE DESCRIPTIONS | |
|---|---|
| Name | Description |
| SYSTEM-WIDE FILES | |
| **VALPUSER | User validation codes |
| **CONTPORT | VALPORT master control |
| M$(1-50) | Master security |
| **YO1-YO6 | Ticker symbol to security number cross-reference |
| **SYMX1-2 | OLD to NEW ticker symbol cross-reference |
| **OLDNEW#1-#2 | OLD to NEW security number cross-reference |
| **GFIFILE | Master control of Bunker-Ramo source files |
| **ANYSE01-04 | Bunker-Ramo source files (accessed once daily to update VALPORT files) |
| **BASE001-3 | |
| **COTC001-3 | |
| **DNYBE01-04 | |
| **EPCSE01-02 | |
| **FMWSE01 | |
| CATFILE | |
| SUPFILE | |
| EXCPLIST | Daily exception list |
| **SYM#A-Z | |
| USER FILES | |
| CATALOG1 | User control variables; representatives initials |
| CONTROL1 | Control file for user files |
| METERA | Monthly usage report |
| TEMPO | Temporary portfolio storage |
| X01,X02 | User supplemental security ticker symbol/security number cross-reference |
| S01,02,03 04,05 | User supplementary securities |
| P01,02,03 04,05 | User permanent portfolio storage |
| OLDNEW#1-#2 | Old to NEW security number cross-reference |

SYSTEM-WIDE FILES

**VALPUSER

A file of VALPORT user validation keys.

| Field No. | Field Code | Field Description |
|---|---|---|
| 1 | A$ | Validation key |

(End-of-file designated by END***')

**CONTPORT

This file is a system-wide master control file which is accessed in various programs by all users. It is accessed, for example, as an input file at line 3800 of the VALPORT 'NEW' option. CONTPOR1 is the backup.

| Field No. | Field Code | Field Description |
|---|---|---|
| 1 | X$ (1) | Hexadecimal buffer dump |
| 2 | X$ (2) | Hexadecimal end of transmission |
| 3 | X$ (3) | Hexadecimal upper case shift |
| 4 | X$ (4) | Hexadecimal lower case shift |
| 5-34 | M (30, 1) | Securities control number (lowest security in each of securities masterfiles) |
| 35 | D0 | Daily price date (YYMMDD) |
| 36 | B0 | Monthly price date (YYMMDD) |
| 37 | N0 | Last Group 2 (+suppl) security number assigned |
| 38 | A$ (1) | ABCDEFGHIJKLM |
| 39 | A$ (2) | NOPQRSTUVWXYZ |
| 40 | A$ (3) | 0123456789 |
| 41 | A$ (4) | +G+O A G 099 (control variable switch for finding proper ticker symbol file) |
| 42-53 | D$ (1-12) | Names of all months |
| 54-95 | E$ (1-32) | Names of all 1/32 fractions |
| 96-145 | I$, J$ (1-25) | Names of securities classification codes |
| 146-151 | Y$ (1-6) | Ticker symbol file names |
| 152-176 | M$ (1-25) | Securities file names |
| 177-188 | Y$ (7-12) | Ticker rewind file name |
| 189-213 | M$ (26-50) | Securities rewind file name |

M01—M50—Master Securities Files

There are 50 of these files. 25 may be active at any given moment. The files are accessible by the users of the VALPORT system only on a controlled basis, and the files may not be individually accessed outside the VALPORT system. The active protected names appear in **CONTPORT and are accessed as M$(1) through M$(25).

The sequence of records is by security number (N3) in ascending sequence with the Group 2 securites (having numbers from 100 through 999990) in files M$(1) through M$(10), and the Group 1 securities (1,000,000 through 7,999,999) in files M$(11) through M$(25). M$(26) through M$(50) are used as mirror-images of M$(1) through M$(25) for file update purposes.

| Field No. | Field Code | Field Description |
|---|---|---|
| 1 | N1 | Number of records in file |
| --- RECORD FIELDS (N1) --- | | |
| 2,13... | S$ | Security name (first 18 characters) |
| 3,14... | T$ | Security name (last 18 characters) |
| 4,15... | U$ | Ticker symbol |
| 5,16... | N3 | Security number |
| 6,17... | C3 | Classification code |
| 7,18... | D3 | Dividend/interest |
| 8,19... | E3 | Earnings/maturity |
| 9,20... | V3 | Daily price |
| 10,21... | W3 | Month-end price |
| 11,22... | Y3 | Stock dividend date |
| 12,23... | Z3 | Stock dividend amount |

Y01—Y12—Master Ticker Symbol to Security Number Cross-reference File

There are 12 of these files. Six are active at any given time and six are mirror-image copy files. The files are controlled and the active protected names appear in **CONTPORT and are accessed as Y$(1) through Y$(6). The sequence of Records if alphabetical by ticker symbol (characters 1-7) in ascending alphabetical sequence.

| File | Contains Symbols | |
|---|---|---|
| **Y01 | +AAA-+FZZ (Group 2) | |
| **Y02 | +GAA-+NZZ (Group 2) | |
| **Y03 | +OAA-+ZZZ (Group 2) | |
| **Y04 | AAA | FZZ |
| **Y05 | GAA | NZZ |
| **Y06 | OAA | ZZZ |

| Field No. | Field Code | Field Description |
|---|---|---|
| 1 | N1 | Number of items in file |
| --- RECORD FIELDS (N1) --- | | |
| 2,3... | X$ | Ticker symbol/security number |

Example of a Typical Record

| I B M | | | 1 0 3 6 1 1 7 |
|---|---|---|---|
| 1 | 7 | 8    11 | 12              18 |
| Symbol | | Blank | Security number |

**SYMX1—Ticker Symbol Cross-reference Files

This is a symbol cross-reference file, **SYMX1, which is updated to SYMX2 and copied back. The Records are in ascending alphabetical order by old ticker symbol.

| Field No. | Field Code | Field Description |
|---|---|---|
| 1,2... | Q$ | Old and new ticker symbols |
| (End-of-file is marked by Q$ = "END**") | | |
| Example of a typical Record | | |

| 1 | 7 | 8 | 11 | 12 | 18 |
|---|---|---|---|---|---|
| Old ticker | | Blank | | New ticker | |

**OLDNEW#1-Master Security Number Cross-reference Files

This is a master cross-reference file, **OLDNEW#1, which is stored in the master library. It is updated to OLDNEW#2, and copied back.

| Field No. | Field Code | Field Description |
|---|---|---|
| 1 | #1 | Number of records |
| -------- RECORD FIELDS (N1) -------- | | |
| 2,5... | #2 | Old security number |
| 3,6... | #3 | New security number |
| 4,7... | #4 | Exchange rate |

The file contains the old and new security numbers of securities in the master security files, Group 1 and Group 2 (+). (The cross-reference for securitis in the Group 3 users supplemental securities files (S01–S05) is OLDNEW#1, which file is searched first in the VALPORT program.)

These cross-reference files assume that the old security is exchanged for a certain number of shares of a single new security. At times, of course, an old security is exchanged for a package of new security, common stock, preferred stock, and perhaps debentures and cash. This file could, of course, be expanded to handle that type of exchange with suitable additional fields.

**GFINFILE

An index file, containing the names of the seventeen files which hold the Bunker-Ramo price data, together with the beginning and ending security number in each such file, and the pricing data in various formats.

| Field No. | Field Code | Field Description |
|---|---|---|
| 1,4... | A(1-17) | Starting security number |
| 2,5... | B(1-17) | Ending security number |
| 3,6... | A$(1-17) | File name |
| ---------------------------------- | | |
| 52 | D1 | Year (YY) |
| 53 | D2 | Julian Day (Day of Year) |
| 54 | D3 | YYMMDD |
| 55 | M$ | Month name |
| 56 | D$ | Day name |
| 57 | D4 | Day (DD) |

A1 dates are the date of the Bunker-Ramo tape, i.e., the prior business date.

The seventeen files containing the Bunker-Ramo price data, accessed by retrieving the file names from **GFINFILE as A$(1)-A$(17)

| | |
|---|---|
| **ANYSE01-04 | New York Stock Exchange |
| **BASE001-003 | American Stock Exchange |
| **COTC001-003 | Over-the-Counter (NASDAQ) |
| **DNYBE01-04 | New York Bond Exchange |
| **EPCSE01-02 | Pacific Coast Stock Exchange |
| **FMWSE01 | Midwest Stock Exchange & American Bond Exchange |

| Field No. | Field Code | Field Description |
|---|---|---|
| 1 | A | Security number |
| 2 | A$ | Security name (begin) |
| 3 | B$ | Security name (end) |
| 4 | C$ | Ticker symbol (1-7) CUSIP (10-18) |
| 5 | B | Clearinghouse number |
| 6 | C | Open price |
| 7 | D | High price |
| 8 | E | Low price |
| 9 | F | Last price |
| 10 | G | Close price |
| 11 | H | Adjusted close price |
| 12 | I | Yearly high price |
| 13 | J | Yearly low price |
| 14 | K | Bid price |
| 15 | L | Offer price |
| 16 | M | Previous bid price |
| 17 | N | Earnings indicator |
| 18 | O | Quarterly earnings |
| 19 | P | Annual earnings |
| 20 | Q | Ex-dividend indicator |
| 21 | R | Dividend payment indicator |
| 22 | S | Stock dividend of indicator |
| 23 | T | Quarterly dividend |
| 24 | U | Annual dividend |
| 25 | V | Stock dividend percent |
| 26 | W | Cash dividend date |
| 27 | X | Stock dividend date |
| 28 | Y | Volume |
| 29 | Z | Round lot indicator |
| (End-of-file marked by A=0) | | |

CATFILES-SUPPFILES

These files are used for printing the VALPORT securities index and index supplements.

| | |
|---|---|
| CATFILE1 | A reference file in security number sequence of next Securities Index. |
| CATFILE | Same as CATFILE1 but in alphabetical sequence. |
| SECBOOK1 | Printfile which controls high speed printer. |
| CATFILE2 | A reference file in Security Number Sequence of current published Securities Index. |
| SUPPFIL1 | Cumulative supplement file to CATFILE2 in numeric sequence. |
| SUPPFILE | SUPPFIL1 in alphabetical sequence. |
| CATREF | Contains date of CATFILE1 and Security Numbers contained in CATFILE1. |

| Field No. | Field Code | Field Description |
|---|---|---|
| CATFILE1 (and CATFILE) | | |
| 1,6... | S$ | Name (begin) |
| 2,7... | T$ | Name (end) |
| 3,8... | U$ | Ticker symbol |
| 4,9... | N3 | Security number |
| 5,10... | C3 | Economic code |
| CATFILE2 | | |
| 1 | D5 | Date YYMMDD |
| 2-6,7-11... | S$,T$,U$,N3,C3 | See CATFILE1 |
| SUPPFIL1 (and SUPPFILE) | | |
| 1-5,13-17... | S$,T$,U$,N3,C3 | See CATFILE1 |
| 6,18... | T3 | Record type* |
| 7-11,19-24... | V$,W$,X$,W4,C4 | Same fields for new record |
| 12,24... | T4 | Record type* |

*Types: 1. Addition 2. Deletion 3. Old Record 4. New Record

EXCPLIST

| Field No. | Field Code | Field Description |
|---|---|---|
| 1,6... | S$ | Name (begin) |
| 2,7... | T$ | Name (end). |
| 3,8... | U$ | Ticker Symbol |
| 4,9... | N | Security Number |

-continued

| | | |
|---|---|---|
| 5,10... | C$ | Blank for addition |
| | | *** for deletion |
| | | Ticker symbol if Ticker symbol change |
| | END** | End of File |

SYM#A—SYM#Z

| Field No. | Field Code | Field Description |
|---|---|---|
| 1,3... | A$ | Ticker symbol |
| 2,4... | N | Security number |

Alphabetically sorted ticker symbol files for every letter of alphabet. The purpose is to allow lookup of new security number rather than manually enter number. It is accessed in the PRICESEC and VALSEC (MOVE) programs.

USER FILES

CATALOG1

User master catalog file.

| Field No. | Field Code | Field Description |
|---|---|---|
| 1 | X$(5) | User validation key |
| 2 | X$(6) | Forms control characters : |
| | | Character 1 |
| | | Blank  Non-continuous forms |
| | | C  Continuous forms |
| | | ?  Ask from keyboard cont/non-cont |
| | | Character 2 |
| | | Blank  66 lines/page |
| | | S  51 lines/page |
| | | ?  Ask from keyboard long/short |
| 3 | X$(7) | Reserved |
| 4 | X$(8) | Reserved |
| 5 | A$(5) | "D J Q 99" portfolio file control |
| 6 | U(1) | No. of representatives |
| 7 | U(2) | Reserved |
| 8 | U(3) | Reserved |
| 9 | U(4) | Reserved |
| ------------- RECORD FILE (U(1)) ------------- | | |
| 10,11... | R$ | Initials of representatives |

CONTROL1 (Control2 is the backup)

User master control file.

| Field No. | Field Code | Field Description |
|---|---|---|
| 1 | C0 | Last Group 3 (= supplemental security) assigned |
| 2-6 | P$(1-5) | Names of user portfolio files P$(5) is backup |
| 7-8 | Y$(7-8) | Names of user supplemental securities ticker files Y$(8) is backup |
| 9-13 | M$(26-30) | Names of user supplementary securities files M$(30) is backup |

METERA

File containing information regarding usage of the VALPORT system.

| Field No. | Field Code | Field Description |
|---|---|---|
| 1 | $1 | The last date the meter was reset |
| 2 | $2 | Portfolios deleted |
| 3 | $4 | New securities added |
| 4 | $4 | Securities deleted |
| 5 | $5 | Securities edited |
| 6 | $6 | Securities moved |
| 7-9 | $7-9 | Reserved |
| 10 | $0 | No. of representatives |
| ------------- RECORD FIELDS (0$) ------------- | | |
| 11,17,,, | X(,1) | (No. new portfolios) × 1000 plus aggregate issues |
| 12,18... | X(,2) | (No. detailed portfolio schedules × 1000 plus no. summary portfolio schedules |
| 13,19... | X(,3) | (No. of issues in all schedules) × 1000 plus aggregate no. of page |
| 14,20... | X(,4) | Aggregate value of all schedules |
| 15,21... | X(,5) | No. portfolios edited × 1000 plus issues |
| 16,22... | X(,6) | No. tax schedules × 1000 plus aggregate no. of issues in schedules |

TEMPO

A temporary file used for working storage of a portfolio. Contains all necessary data so data need not be retrieved from master securities and portfolio files when two or more reports are produced.

| Field No. | Field Code | Field Description |
|---|---|---|
| 1 | X$ | Portfolio shortname |
| 2,3 | N$,O$ | Full account name |
| 4 | R8 | Representative number |
| 5 | D8 | Latest valuation date (YYMMDD) |
| 6 | D9 | Previous valuation date (YYMMDD) |
| 7 | N2 | Number of issues in portfolio |
| 8 | T2 | Portfolio type |
| 9 | C2 | Cash balance |
| ------------- RECORD FIELDS (N2) ------------- | | |
| 10,16... | P(,1) | Security number |
| 11,17... | P(,2) | Classification code |
| 12,18... | P(,3) | Amount (shares or $ bonds) |
| 13,19... | P(,4) | Current price |
| 14,20... | P(,5) | Total customer cost |
| 15,21 | P(,6) | Previous price |
| (N2*6)+10,+19 | S$( ) | Security name (1st 18 characters) |
| +11,+20 | T$( ) | Security name (last 18 characters) |
| +12,+21 | U$( ) | Ticker symbol |
| +13,+22 | D ( ) | Dividend/interest |
| +14,+23 | E ( ) | Earnings/maturity |
| +15,+24 | V ( ) | Daily price |
| +16,+25 | W ( ) | Month-end price |
| +17,+26 | Y ( ) | Stock dividend date |
| +18,+27 | Z ( ) | Stock dividend amount |

X01–User Supplemental Security Ticker Symbol Files

The sequence of records is alphabetical by ticker symbol (characters 1-7) in ascending sequence.

| File | Contains Symbols |
|---|---|
| X01-02 | =AAA − =ZZZ (Group 3) |

| Field No. | Field Code | Field Description |
|---|---|---|
| 1 | N1 | Number of items in file |
| ------------- RECORD FIELDS (N1) ------------- | | |
| 2,3... | X$ | Ticker symbol/security number |

Example of a Typical Record

-continued

```
= A B C D              9 9 0 1 2 3 0
1           7    8   11  12         18
Ticker symbol    Blank    Security number
```

S01–S05–User Supplemental Security Files

There are four active files for storage of securities in ascending security number sequence (assigned at the time of entry). S01 contains securities 9,900,010–9,907,000; S02—9,907,010–9,914,000; S03—9,914,010–9,921,000; S04—9,921,010–End. S05 is the backup file. (The files are used in a round-robin fashion, such that the contents of any one particular file will vary from time to time.)

| Field No. | Field Code | Field Description |
|---|---|---|
| 1 | N1 | No. of records in file |
| ---------- | RECORD FIELDS (N1) | ---------- |
| 2,13... | S$ | Security name (first 18 characters) |
| 3,14... | T$ | Security name (last 18 characters) |
| 4,15... | U$ | Ticker symbol |
| 5,16... | N3 | Security number |
| 6,17... | C3 | Classification code |
| 7,18... | D3 | Dividend/interest |
| 8,19... | E3 | Earnings/maturity |
| 9,20... | V3 | Daily price |
| 10,21... | W3 | Month-end price |
| 11,22... | Y3 | Stock dividend date |
| 12,23... | Z3 | Stock dividend amount |

P01–05—User Portfolio Files

There are four active portfolio files which store portfolios by shortname: P01 (A–C); P02 (D–I); P03 (J–P); P04 (Q–Z), and one rewind file P05. (The files are used in a round-robin fashion, such that the contents of any one particular file will vary from time to time.)

The portfolio records are listed in ascending alphabetic order by shortname (X$). The securities records in a portfolio are in ascending numeric order by security number P(,1).

| Field No. | Field Code | Field Description |
|---|---|---|
| 1 | N1 | Number of different portfolios |
| ---------- | RECORD FIELDS (N1) | ---------- |
| 2 | X$ | Portfolio shortname |
| 3-4 | N$,O$ | Account name |
| 5 | R8 | Representative number |
| 6 | D8 | Latest valuation date |
| 7 | D9 | Previous valuation date |
| 8 | N2 | No. of issues in portfolio |
| 9 | T2 | Portfolio type* |
| 10 | C2 | Cash balance |
| ---------- | RECORD FIELDS (N2) | ---------- |
| 11,17... | P( ,1) | Security number |
| 12,18... | P( ,2) | Classification code |
| 13,19... | P( ,3) | Amount (shares or $ bonds) |
| 14,20... | P( ,4) | Current price (latest valuation) |
| 15,21... | P( ,5) | Total customer cost |
| 16,22... | P( ,6) | Previous price |

*Type codes:
1. Contains cost data and previous prices
2. Contains cost data
3. Contains cost data and previous prices
4. Contains cost data
5. Contains previous prices
6. No cost data, no previous prices
7. Contains previous prices
8. No cost data, no previous prices

OLDNEW#1—User Security Number Cross-reference Files

This is a user cross-reference file stored in the user's library. It is updated to OLDNEW#2 and copied back.

| Field No. | Field Code | Field Description |
|---|---|---|
| 1 | #1 | Number of records |
| ---------- | RECORD FIELDS (N1) | ---------- |
| 2,5... | #2 | Old security number |
| 3,6... | #3 | New security number |
| 4,7... | #4 | Exchange rate |

INDEX TO PROGRAM DESCRIPTIONS AND ROUTINES

Introduction

All of the following VALPORT programs are described in terms of the **NAME and (OPTION) which the user actually runs. Where the program is stored in object language, the user will run a short source-language linking program as described. The program descriptions in this section are:

Program Name

**VALSETUP
**VALPORT (NEW)
**COVPORT
**VALPORT (VAL)
**DELPORT
**VALPORT (EDIT)
**VALPORT (LIST)
**VALPORT (MOVE)
**VALPORT (EST)
PRICESEC
N72SUPGN
SUPPSORT
LISTCONT
EDITCONT
**VALSEC (NEW)
**VALSEC (FIND)
**VALSEC (CARD)
**VALSEC (DEL)
**VALSEC (EDIT)
**VALSEC (EDITPRI)
**VALSEC (MOVE)
**VALSEC (CAT)
BACKSEC
RECOSEC
**SECDATES
CATGEN
SORTSEC
PRINTFCT
CHEKSECS
**VALSEC
**SUPPSEC
**VALPORT
**VALPORT (XS)
**VALPORT (XSDEMO)
**VALPORT (CHEK)
**VALPORT (USE)
**VALPORT (MGT)
**VALPORT (EDICAT)
ENHANCEMENTS

Common Routines

The following routines occur throughout the programs. They are described on the following pages and referenced elsewhere:

File Section

Ticker Symbol File Selection Routine
Master Security File Selection Routine
Portfolio File Selection Routine

Data Retrieval

Ticker Symbol Data Retrieval Routine
Master Security Data Retrieval Routine
Control File Variable Retrieval Routine
Portfolio Data Retrieval Routine

Sorts

Alpha tag sort routine
Numeric tag sort routine

Lookup

OLD/NEW Ticker Symbol Lookup Routine
OLD/NEW Security Number Lookup Routine
Alpha to Numeric Conversion Routine
Numeric to Alpha Conversion Routine
Pause Routine
Untangle Basic Date Routine
Yes-No Routine
File Name Flip-Flop Routine

PROGRAM DESCRIPTIONS

**VALSETUP-N72SETUP—SETUPOBJ

A 100-unit alphabetic array is reserved for representatives' initials. The terminal types: "Have you created proper VALPORT files?" Valid answers are "yes", "no" or "trouble". Otherwise, terminal types "Please answer yes or no," and returns to "Have you created . . .".

If a prior execution of **VALSETUP terminated with an error message indicating a file did not exist at a given line number, the user may respond here with "trouble," and receive a messsge together with an indication of each file and at which line the program attempted to access that file.

If the answer is "no", the terminal types detailed instructions about how to create the files and terminates.

If answer is "yes," the program accesses the **VALPUSER file and prompts the user to enter a validation key. The key, which is an alphameric variable, is compared with each key in the file. If the key is not found, the X1 counter is increased from 0 to 1, the terminal prints "improper validation," and the user is asked for the key again. After the third incorrect key, the program terminates.

If the key is found, the program then asks for the number of registered representatives to be validated.

The user is then prompted to supply the initials of each representative next to the assigned number.

The file CATALOG1 is opened. The user validation key, three reserved alphameric fields, the portfolio file control variable, the number of representatives, three numeric fields, and each representative's initials are put in the file. The file is then closed.

The file CONTROL1 is then opened. In it is put an initial number (9,900,000) for the initial user supplemental security number, the names of each of the five portfolio files (P01 through P05), the names of the two user symbol ticker files (X01 and X02) and the names of the five user supplemental security files (S01 through S05). The file is then closed.

Output file METERA is then opened. In it is put the current date (YYMMDD), eight reserved numeric zero fields, the number of representatives and, for each representative, six numeric zero fields reserved for recording usage. The file is then closed.

Each portfolio file (P01-P05), ticker symbol file (X01-X02), and supplemental security file (S01-S05) is opened and initialized by placing a numeric zero in the first field. Each file is then closed. Files CONTROL2 and TEMPO are opened as input files to test for their existence, and files OLDNEW#1 and OLDNEW#2 are opened as output files, initialized with numeric 0 in the first field, and closed. This procedure initializes all files and ensures that the user has made no error in establishing them.

The program then prints a final message and terminates.

**VALPORT (NEW)—N70NEWP—NEWPOBJ

This program values a new portfolio and optionally puts it into the user's portfolio files.

The following arrays are reserved:

| Name | Type | Size | Content |
|---|---|---|---|
| M | Numeric | 30×1 | Securities file control variables |
| F$ | Alpha | 20 | Ticker symbol lookup array |
| J | Numeric | 100×6 | Representative usage table |
| X$ | Alpha | 8 | Control variables |
| A$ | Alpha | 5 | Control constants |
| X | Numeric | 165 | Tag sort secondary array |
| I | Numeric | 165 | Tag sort primary array |
| S$ | Alpha | 165 | Security name 1st 18 characters |
| T$ | Alpha | 165 | Security name last 18 characters |
| U$ | Alpha | 165 | Ticker symbol |
| N | Numeric | 165 | Security number |
| C | Numeric | 165 | Classification code |
| D | Numeric | 165 | Dividend rate |
| E | Numeric | 165 | Earnings |
| Z | Numeric | 165 | Stock Dividend variables |
| Y | Numeric | 165 | Stock dividend date variables |
| V | Numeric | 165 | Current price |
| W | Numeric | 165 | Month-end price |
| P | Numeric | 165×6 | Portfolio data array |

Control File Variable Retrieval Routine

The **CONTPORT file is opened and the four hexadecimal characters are read into the first four positions of the X$ array. The 30 security file control variables are then read into array M. The current date, monthly date, the highest supplemental security number, the alphabet, the numerals, the ticker symbol control file variable, the months of the year, the fractions, economic codes, and symbol and security file names are read and stored in the appropriate arrays and variables.

CATALOG1 is next opened and the user validation key and forms control characters are stored in the X$ array. The portfolio file control variable is read, the number of representatives is read, and the initials of each representative are read and stored in the R$ array. CATALOG1 is then closed. CONTROL1 is opened, the last supplemental security number is read, the names of the portfolio files, symbol files and supplemental security files are read and stored. CONTROL1 is then closed. (Note that not all variables are required for all programs. Certain variables may be bypassed or, in some cases, omitted.)

Untangle Basic Date Routine

The pricing dates retrieved in the above routine must be untangled. The date to be untangled is set to a reserved variable D5. The basic form of the date, e.g., 720715 for July 15, 1972, is then translated by creating Y5, M5 and D5 corresponding to 72, 7 and 15. The integer function is used to successively strip the month and day off the year, the year and day off the month, and the year and month off the day.

The system untangles the latest daily and monthly pricing dates and prints them. The user is prompted to state whether he intends to enter the portfolio from the keyboard or from a previously created source file. If from the keyboard, he is asked whether he is supplying costs and the number of issues in the portfolio. If from a file, he is initially asked for the file name, then whether he is supplying costs and the number of issues.

Yes-No Routine

In any circumstances calling for a yes/no answer, the terminal calls for an alpha variable. If yes, variable Z9 is set to 1; if no, Z9 is set to 0, and control is returned to the main body of the program. Otherwise, the terminal prints "Please answer 'yes' or 'no'," and returns to beginning of the yes-no routine.

If the portfolio is to be entered from the keyboard, a sample line for formatting purposes is printed with or without a field for costs, depending on the answer to the previous question. The user then types in the number of shares, the ticker symbol, and, optionally, customer's cost for each issue.

If the portfolio is to be entered from a file, the terminal asks for the file name, opens the file for input, and retrieves the data, verifying that the number of items in the file coincides with the number of issues specified previously in response to the control question.

Alpha Tag Sort Routine

This routine alphabetically sorts the portfolio ticker symbols created above. A numeric array I(S) is built up in which the values in order correspond with the row number of the security in array U$(S) alphabetically sorted by symbol.

The routine involves two nested loops. In the first loop, each security is compared for the lowest alphabetic value. In each subsequent loop, each previously identified security is passed over during the comparison by filling a third array, X(S), successively with a constant value which indicates that the security should be bypassed in future comparisons. The value in I(1) therefore is the row number of lowest alphabetic value, and in I(2) is the next lowest alphabetic value, etc.

Ticker Symbol File Selection Routine

The program then compares each ticker symbol in sequence to see if it is less than +G, +O, A, G, O, or 99 (A$(4) of CONTPORT) to determine the proper ticker symbol to security number cross reference file (Y$1-6).

For example, the ticker symbol comparison for IBM will set variable L equal to 5 since that ticker symbol will be in the fifth master ticker symbol to security number cross-reference file. Actually, that ticker symbol will be either in file Y05 or Y11 depending on which is the then currently active file. The variable Y$(5) from the previously opened **CONTPORT file will identify the correct file so that the statement "OPEN 1, Y$(L), INPUT" will open the correct file Y05 or Y11 to retrieve IBM.

Ticker Symbol Data Retrieval Routine

The correct ticker symbol file is then opened. This file contains the SYMBOL/SECURITY NUMBER variables alpha-sorted by symbol, e.g.:

IBM 1036117

If the file contains over 20 records, the first 20 variables are read into F$(1) . . . F$(20). The 20th is compared with the desired ticker symbol. If the desired ticker symbol is greater, 20 more are read successively until the 20th is equal to or greater than the desired ticker symbol. (If the file contains 20 items or less, the program reads each one of the records individually.)

When 20 are to be searched, or when the last group of 20 or less is reached, each ticker symbol in the group is compared with the desired ticker symbol.

When found, the variable A$ contains the ticker symbol in the positions 1 through 7 and the security number in alpha form in positions 12 through 18. If no match is found, the **SYMX1 cross-reference file is searched for a new ticker symbol.

OLDNEW Ticker Symbol Lookup Routine

If during the ticker symbol retrieval routine, the symbol being sought is not found, the program then branches to this routine. File **SYMX1 is opened. This file contains a string of records, each of which has the outdated ticker symbol and its corresponding newer or current ticker symbol. In either case, when a match is found, the program then branches back to the ticker symbol file selection routine and then the ticker symbol data retrieval routine. If, in this process, the new ticker symbol is not found, perhaps because it has again been modified, the program again goes back to this OLDNEW routine and looks for yet another current ticker symbol corresponding to the newer ticker symbol.

If the ticker symbol sought is not found anywhere, the terminal prompts the user to enter a corrected ticker symbol or to enter a zero instructing the system to bypass the incorrect security.

Once the correct symbol/number record is found, variable K$ is set equal to the last seven characters of variable A$ (the ticker/number pair) and variable A$ is set to contain only the first seven characters; i.e., the symbol alone.

Alpha to Numeric Conversion Routine

This routine translates the alpha 7-digit security number K$, e.g., "1036117" for IBM to a numeric K1, 1036117, in order to look up the security data and for ultimate storage in the user portfolio file.

Each character is compared in successive nested loops to each second character of A$(3) "0123456789". The inner loop number is the digit and outer loop is the power. The routine for the IBM example then adds 1,000,000; 0; 30,000; 6,000; 100, 10 and 7 to reach a total for K1 of 1036117 (numeric).

Numeric Tag Sort Routine

A tag sort, virtually identical to the alphabetic tag sort described above, is then performed on the security numbers to produce a new array I(R) labeling the sorted order of the security.

Master Security File Selection Routine

After the security number numeric sort, the program proceeds to this routine. Each security number in the array is compared with the security number in the M array and, when the security number in the M array is greater than or equal to the sought security number, the variable L identifies the master security file. The program then proceeds to look up the security data.

Master Security Data Retrieval Routine

The file M$(L) will contain the data about the desired security. The securities data is stored in the file in ascending numeric order by security number. The first security is read, without yet putting the security in the portfolio array, and compared with the security number of the desired security. If it is less, each succeeding one in sequence is read. When a match is found, the security data (name, classification code, dividend/interest, earnings/maturity, daily price, monthly price, stock dividend date, stock dividend amount) is read into the array position reserved for the data on that particular security.

After the security data is found, program control returns from this routine to the Master Security File Selection Routine to look up the file for the next security. Security data for all securities is thus read into the portfolio array.

The terminal then prompts the user to state whether he wants to price the portfolio as of the previous day's closing, the previous month's closing, or manually. If the daily or monthly option is taken, the prices retrieved above are read into the portfolio array, and the user supplies any missing prices (defined as a price of 0). If the manual option is chosen, the user supplies all of the prices for the portfolio array. The system then checks each security for a yield greater than 12% or a loss greater than 50% and notifies the operator of any such potential data error. The user has the option to verify and correct the data if it proves to be incorrect.

During this procedure, the value and cost of each security holding is computed to the nearest dollar and the total portfolio cost and value (rounded) is accumulated.

The program then asks for the portfolio shortname, the portfolio full name, the representative number, and the cash balance. The total value, cost, and cash balance are then printed.

The METERA file is next opened to increase the counter corresponding to the assigned representative to indicate the creation of a new portfolio and the number of issues in it. The updated METERA file is then rewritten and closed.

The working file, TEMPO, is opened and all data relating to this portfolio is put in it for rapid subsequent retrieval without repeating the laborious data retrieval process described above.

Portfolio File Selection Routine

The user is next queried whether the portfolio is to be added to the master file. If so, the CONTROL1 file is opened and the first letter of the portfolio shortname is compared with variable A$(5) to find the proper portfolio file, P$(L).

Portfolio Data Retrieval Routine

The identified portfolio file is opened and the number of portfolios in the file is read. The portfolio heading for each portfolio is read sequentially. If the portfolio shortname does not match the desired one, the system bypasses the unwanted portfolio array data and then retrieves the next portfolio heading. If the end of the portfolio is reached without finding a match, the terminal types that the portfolio shortname is not in the files and requests another file name.

In this case, when the portfolio file is found, the file corresponding to P$(L) is opened and, using the portfolio file data retrieval routine and adding the new portfolio, is copied into portfolio file P$(5). If the shortname is already found to exist in the file, the user is prompted to substitute a new shortname. The program then proceeds to FLIP-FLOP the file names and rewrite the user master control file (CONTROL1).

The File Name Flip-Flop Routine

This routine occurs repeatedly throughout the VALPORT system. It is illustrated here for the situation where a new portfolio has been added to one of the existing user portfolio files (P$(1)-P$(5)).

For instance, if a user has a portfolio with the name "ROBEJOHN", it will be added to the portfolio file containing the portfolios from Q to Z. The portfolio files are arranged as follows:

| Portfolio Shortnames | File Names Beginning | Ending | |
|---|---|---|---|
| P$ | | | |
| (1) A-C | P02 | P02 | |
| (2) D-I | P03 | P03 | |
| (3) J-P | P04 | P04 | |
| (4) Q-Z | P05 | P01 | (new Q-Z) |
| (5) Scratch file | P01 | P05 | (old Q-Z and new scratch file) |

The system always reserves one file, whose name is in P$(5), as the scratch file for the portfolio files.

In the given example, the active file is P$(4); i.e., P05; containing portfolios with shortnames Q through Z. The contents of this file are merged with the new portfolio and copied into the file (P01) whose name is in P$(5).

This particular routine then switches the names of the files in P$(4) and P$(5) by saving the name of P$(5), copying P$(4) to P$(5) and copying the saved P$(5) name into P$(4).

The net effect of this routine is to allow an updated file to be accessed by a user who supplies only a single given file name. Thus the user either before or after this given file update would select P$(4). Before the update he would be directed by the system initially to file P05 containing portfolios Q through Z. Then, after merging the portfolio ROBEJOHN with the contents of P05 in copying the resulting data into file P01, this file now contains the portfolios from Q through Z with the additional portfolio.

This routine eliminates the need for rewinding the updated file. Rather than copying the data back to the old file name, the name of the file is effectively changed by changing the location of the name in the control file. This procedure causes approximately a 50% reduction in processing time each time a file is updated, since the file data need not be "rewound". In addition, the procedure permits multiple simultaneous users to access the system, even when data is in the process of being updated. Further, since the control file is not rewritten until all data has been copied and the names "flipped", file reliability is greatly enhanced.

The "flipped" file name variables are then put into file CONTROL1, and into file CONTROL2 as a backup. Following this, the user is queried whether he wants a list of the portfolio data.

Portfolio 'List' Option

The terminal prints, "Turn to a new page and press RETURN", and then enters the pause routine to give the user time to do this.

Pause Routine

The conventional pause procedure in the basic language prints "PAUSE AT LINE XXXX", which may have utility for a programmer, but can only cause confusion in user applications such as VALPORT. The disclosed pause routine overcomes this problem by substituting a distinctive terminal operation which, however, does not print anything at the terminal.

Specifically, the pause routine spaces the printhead several spaces, distinctively wiggles the golf ball printhead from lower to upper case and back several times, and then "prints" a hexadecimal buffer dump, which suppresses the pause message. The purpose is to provide both a visual and an aural notice to the operator that the terminal has paused and is waiting for action on the part of the operator.

After the pause, when a new page is inserted, the operator need only press the carriage return. The terminal prints the portfolio full name, shortname, number of issues, representative number, portfolio value, valuation date, total cost, and cash balance.

The program then performs an alphabetic tag sort on the securities long names and stores this sorting tag in array I(S).

The program then makes two passes through the array to print the securities in two groups. The first group contains those securities the user will have to price manually on succeeding valuations, and the second group contains those securities which the system will reprice automatically.

The program then queries the user whether he wishes to have one of the various VALPORT valuation schedules printed. If so, the system links to that program; otherwise, the program terminates.

**COVPORT

This program produces an appropriate cover sheet for the VALPORT schedules. It begins by executing the Control File Variable Retrieval Routine. The terminal then requests the operator for the shortname of a portfolio (which may be TEMPO). The Portfolio File Selection Routine is used to find the appropriate file.

The Portfolio Data Retrieval Routine then finds the portfolio. If that portfolio shortname matches the user supplied portfolio name, the program then prints "Insert 8½ × 11 sheet and press RETURN". Following the message, control branches to the Pause Routine, to allow the operator to insert the cover page.

Following the insertion of the cover sheet, the operator presses the carriage return. The terminal spaces down 18 lines and prints, centered, the full portfolio name, the date of latest valuation of the securities in the portfolio, spaces down several more lines and prints the date of the report and the representative initials, then indexes to permit the entry of another portfolio shortname.

**VALPORT (VAL)
OPTION—N72VAL—VALPOBJ

This option is a report generator program which produces the "VAL", "PUR" and "SEL" output reports of the VALPORT system. Although the same program is used to produce all three reports, the operator determines which sections will be used by the option chosen. The option is passed from the **VALPORT program itself or from the 'NEW' or 'EDIT' programs if the report is being printed after a direct link from one of these programs. The option is picked up as a parameter passed from the linking program.

The user is asked for the desired portfolio file name, and (if not TEMPO) the Portfolio File Selection Routine and Portfolio Data Retrieval Routine are performed to retrieve the desired portfolio. (The Control File Variable Routine is used to retrieve the control variables and constants.)

After obtaining the portfolio, the program then uses the Master Security File Selection Routine, and the Master Security Data Retrieval Routine to obtain the security names, the economic codes, the earnings, dividends, etc.

If, between the creation of the portfolio and the running of this program, a security number has been changed, the Master Security Data Retrieval Routine will branch to the following routine.

OLDNEW Security Number Lookup Routine

If a portfolio security number is neither in the supplemental security files nor the master security files, the user's own OLDNEW#1 file is first opened and searched. If the old security number is not found in the user's cross-reference table, the program branches to the master **OLDNEW#1 security number cross-reference table, and the old security numbers of each record are searched for a match with missing security number.

If the old security number is found, then the new security number and exchange rate are determined from the cross-reference table. The routine calculates the new amount of the holding by multiplying the old holding times the exchange rate and adjusting any previous price. In the event the amount remains constant, the exchange rate is one.

If no old security is found, the user is prompted to enter one, or to enter a zero to bypass the missing security. Once the new security number is found, the current new name of the corporation, the new dividend, earnings, etc., are read into the portfolio array.

The program then goes through the Untangle Basic Date Routine for the latest valuation date of that portfolio (D8) and then prints the portfolio's full name, shortname, and number of issues. It then values the portfolio and prints the value, cost and cash balance. It then alphabetizes the portfolio by security name, and then branches to select the appropriate report format (VAL, PUR or SEL).

In the VAL option, the user is prompted to answer whether he wishes to have the previous prices printed and, unless this program has been branched to from 'NEW' or 'EDIT', the user is asked for a starting page. (This question allows the user to restart the program at any page in the event of a malfunction.)

The forms control variables from the Catalog1 files are read, the program pauses for the insertion of a new sheet, and prints the trademark, portfolio name and valuation date. The program then prints column headings and the cash balance, if any.

The program then searches the portfolio for each of the classification codes in numeric order. When one is found, the heading for that code is printed and each security and its data is listed alphabetically thereunder together with subtotals, if necessary. Then the next higher economic code is searched.

The number of securities in each economic code has been previously counted for the purpose of determining the appropriate place to "turn pages". The page is changed following line 48, if it is the end of an economic code, or at line 55, unless line 56 ends the securities under that code. In this last case, the total is printed before the page change occurs. In the event of a page change in the middle of a category, the category heading is retyped at the top of the next page. The page-turn routine is standard in all reports, generally typing the message "CONTINUED ON PAGE XXX," spacing the completed page out of the terminal, pausing, and numbering and reidentifying the new page.

Once the schedule is complete, the METERA file is opened to record the usage by the representative assigned to the recount. Information is stored regarding the number of pages, number of issues, aggregate value, and the type of report. The program then terminates.

The other VALPORT reports are produced in an identical manner, differing only in format or sorting sequence.

**DELPORT

The program, which is used to delete an unwanted portfolio from the files, starts with the Control File Variable Retrieval Routine.

The terminal then asks for the desired portfolio file shortname(s) to be deleted and performs the Portfolio File Selection Routine for each.

The selected portfolio file P$(L), is opened for input and the scratch file, P$(5), is opened for output.

Each portfolio is copied from the input to output file after comparing it to the shortname to be deleted. The portfolio to be deleted is bypassed. The program then performs the File Name Flip-flop Routine, rewrites the control files (CONTROL1 and CONTROL2), opens METERA to record that a portfolio was deleted, and asks for another file name. The program terminates when the operator enters a file name of "O".

**VALPORT (EDIT)—N72EDITP—EDITPOBJ

The EDIT program is used to modify or edit a portfolio that has previously been created by the VALPORT (NEW) program. It permits the recording of purchases and sales, the updating of prices, and the editing of any other data except the portfolio shortname. This is accomplished with the VALPORT (MOVE) program.

The EDIT program begins with the Control File Variable Retrieval Routine. The system then prints the daily and monthly pricing date for the Group 1 securities, obtaining the dates from **CONTPORT and using the Untangle Basic Date Routine to strip out the month, day, and year.

The terminal then prompts the operator to supply the name of the portfolio to be edited. If the name is not TEMPO, control branches to the Portfolio File Selection Routine and then Portfolio Data Retrieval Routine.

For each security, the program then branches to the Master Security File Selection Routine and the Master Security Data Retrieval Routine, includng if necessary, the OLD NEW Security Number Routine. The security data is read into the array for later use, but does not at this point, supplant the dated portfolio data.

The terminal then prints the portfolio full name, the shortname, and the number of issues, the latest valuation date, the portfolio value, the total cost, the cash balance, and if previously valued, the previous valuation date. An alpha tag sort routine is conducted on the full security names.

The user is then prompted to answer whether he wants to edit the name, representative, number, add security costs to the portfolio, change the cash, edit the securities, or end the edit.

Editing the portfolio name, representative number, or the amount of cash involves changing only the value of the variable retrieved from the portfolio.

The addcost option first checks to see if the portfolio type indicates the portfolio already contains cost information. If so, an error message is printed and the terminal prompts the operator for another entry.

Otherwise, the terminal prints each ticker symbol in sequence by security name and allows the operator to enter the total cost for each security. The program then changes the portfolio type, decreasing it by one, to indicate it contains cost information.

If the securities edit branch is chosen, the operator is prompted to answer whether he wishes to branch to the portion of the program that edits the amount, cost, symbol, current price, or previous price; or whether he wishes to branch to the portion of the program which reprices, allowing the securities and permits entering purchases and sales.

The update option first gives the operator the option of repricing the securities from the master file, using the daily price or the monthly price, or by a manual entry of each new price.

A second branch then gives the operator the choice of moving the "current price" (i.e., the date of latest valuation) to the "previous price" field, changing the dates accordingly; or the option of retaining the "previous" valuation price and date and updating only the "current" one. This technique provides the user a high degree of flexibility in making performance comparisons on the securities making up the portfolio. It also permits the user to make hypothetical updates, comparing new prices against either of two previous prices.

The current daily or monthly prices are then read into the current price array from the array they were put into during the master security file data retrieval routine.

If a price of zero is found (as with a Group 2 or 3 security), the routine then allows the operator to input any such prices manually. This is a key element of the system, since it permits the user to include any security in the portfolio, providing a new price only when that security is actually being updated in a portfolio. (Optionally, of course, the user may use the **VALSEC 'EDITPRI' option to update prices in the master securities file.)

Once the portfolio has been repriced, the portfolio type number, if even, is set to an odd number indicating the portfolio contains previous price information.

The master securities files have, for each security, space reserved to record the latest stock dividend date and dividend amount. This data is currently being recorded for stocks on the New York and American exchanges. This information is read into the array at the time of the master security daily retrieval routine.

The program checks each stock dividend date to see if it is later than the last valuation date and earlier than the date of the now current portfolio valuation (either the prior business day or the end of the prior month). If so, the portfolio increases the number of shares for that security, dropping any fraction on the assumption that the customer has not purchased the fractional share necessary to "round up".

The operator is then prompted to supply information on any stock splits or stock dividends on any unlisted securities. The repricing is then complete.

The operator is then asked if he wishes to record any sales. If so, he is prompted to enter the amount (shares or $ bonds), ticker symbol, and (optionally), the cost of the securities sold. The portfolio data is adjusted accordingly.

When all sales have been recorded, the operator is asked if he wishes to enter any purchases. If so, he is prompted to enter the amount, ticker symbol, and (optionally), the cost. For each such security, the system checks to see if the security is held in the portfolio. If so, the data is adjusted accordingly. If not, the system branches to the Ticker Symbol File Selection Routine and Ticker Symbol Data Retrieval Routine to find the security number; the Master Security File Selection Routine and Master File Data Retrieval Routine to retrieve the appropriate data for each such purchase.

The program then goes to a routine similar to that in the **VALPORT'NEW' program to check if the security shows a loss of over 50% or a yield of over 12% as possible error conditions. At the same time, it cumulates the total portfolio value and total cost. This routine terminates by printing the portfolio value, total cost, and cash balance.

The operator is then prompted to respond whether he wishes to edit the data for any security. If so, he is prompted to enter the symbol and may then change the amount, cost, price, or previous price. (If he enters a dollar sign as a symbol, he is prompted to enter a new cash balance.)

File TEMPO is then opened and the appropriate data read into it, sorted numerically by security number.

If a representative wishes to make a buy or sell recommendation to a customer, he will use the VALPORT 'NEW' option to enter the appropriate information as a "dummy" portfolio. He may then produce the appropriate 'PUR' or 'SEL' schedules without affecting the client's actual portfolio. In addition, he may use the VALPORT'EDIT' option to record the transactions, storing them in TEMPO on a pro-forma basis, without actually updating the portfolio master records.

For this reason, the operator is prompted to reply whether the edited portfolio is to be updated in the portfolio master file. If affirmative, control then branches to the portfolio file selection routine, and the portfolio data and the files are merged as in the **VALPORT'NEW' program. If there is no match on portfolio shortname at this point, the system enters the updated portfolio as if it were a new portfolio.

The program then proceeds to the file name FLIP-FLOP routine to update the user control file and the backup control file. The operator is queried if a list is desired as in the **VALPORT'NEW' program. The operator then has the option of branching to a selected program to print one of the eleven optional VALPORT schedules. Otherwise, the 'EDIT' program terminates.

**VALPORT'LIST'-N72READ - READOBJ

This produces the 'LIST' schedule and is linked to form the **NEWPORT'EDIT' program if the operator desires this schedule.

The program routines are identical to those within the **VALPORT'NEW' program, which produces an identical 'LIST' from the TEMPO files.

**VALPORT'MOVE'- N72MOVE - MOVEOBJ

This program transfers a portfolio from the temporary TEMPO file to the permanent file, or to permit an edit of a portfolio shortname.

The program begins with the Control File Variable Retrieval Routine. The user is then prompted to enter the old file shortname. If it is zero, processing terminates.

If the operator supplies a valid portfolio shortname, the program branches to the Portfolio File Selection Routine and the Portfolio Data Retrieval Data Retrieval Routine to retrieve the portfolio. It then prints the portfolio full name, shortname, and number of issues. The operator is then prompted to supply the new portfolio shortname. The portfolio file selection routine and portfolio data retrieval routine are used to determine if the short file new name is unique. If not, the operator is prompted to enter a new shortname.

If the new name is unique, the portfolio file containing the old shortname is copied over while deleting the portfolio with the old shortname. The system then executes the File Name Flip-Flop Routine, and rewrites the control files. The terminal then notes that the old portfolio has been deleted.

The portfolio file selection routine is performed for the new shortname and the data on that file is merged with the portfolio data (now with a new shortname). Again the system executes the routine, rewrites the control files, and concludes with a message that the new portfolio has been added.

If the operator had supplied the name TEMPO as the old file name, he is then queried for the new name for TEMPO. After supplying it, the system branches to the Portfolio File Retrieval Routines to ascertain if the new shortname is unique. If so, the system accesses the appropriate file and copies the file, merging in the new name. It then executes the Flip-Flop, rewrites the control files, and concludes with a message that the portfolio stored in TEMPO has been added to the permanent portfolio files.

The program then asks for another old shortname. If the operator enters a zero as an old portfolio shortname, the program terminates. Otherwise, the program continues as from the beginning.

**VALPORT'EST'

This program produces a formal estate valuation schedule and is designed to accommodate the various requirements of the federal estate tax laws.

For a death occurring during the week, the schedule must reflect the mean price of the high and low price (for exchange securities) or the bid and offer (for over-the-counter securities) and, for mutual funds, the offer price minus any volume discount.

For a death occurring over a weekend or holiday, these mean prices must be calculated for the next preceding business day and the next succeeding business day. The value of each share must be the weighted mean price of these calculated mean prices.

Program control branches initially to the Control File Variable Retrieval Routine. The program then accesses a previously created source data file (such as ESTATE1 or ESTATE2) and does not operate against the portfolio files in a user's library.

The user is prompted to supply the source data file name and whether the estate valuation is to be a standard or weekend valuation.

The Source Date File is opened, the operator supplies the number of securities in the portfolio (this is double-checked against the number in the file), and each of the securities records is read from the file. The high and low (asked and bid) price fields are compared. Should these fields be reversed, the program reverses them into proper sequence.

A standard mutual fund discount schedule is next read, and control branches to the alpha Tag Sort Routine by ticker symbol, the Ticker Symbol File Selection Routine, the Ticker Symbol Data Retrieval Routine, the Alphabetic to Numeric Conversion Routine, followed by a numeric tag sort routine based on security number.

Following this, the control branches to the Master Security File Selection Routine and the Master Security Routine and the Master Security Data Retrieval Routine. The purpose of these routines is solely to retrieve the security name for each issue.

The user is next prompted to supply the valuation date. The program then computes for each security the mean price (or the mean of the mean prices) and the value for each issue. The classification code is referenced to interpret the amount field for bonds.

The user then supplies the client name and representative number. The terminal prints the total value of the estate, stores the information in the TEMPO file in case a restart is necessary, and asks the operator to select the starting page. The system then executes an alpha tag sort on the securities names, executes the Pause Routine, and types the schedule. (If the schedule is a weekend schedule, program control branches to the **ESTPOBJW program for the weekend schedule format control.)

PRICESEC-N72PRICE-PRICEOBJ

This program is run daily to update the VALPORT master security files from the raw Bunker-Ramo data and further to create an exception file.

About 11 p.m. each evening after a business day, the Bunker-Ramo tape is read, through a standard SBC utility program, into the files ANYSE01 through FMWSE01. These files are later accessed by retrieving the names from **GFINFILE, which is a directory of the files containing the Bunker-Ramo data.

The security information is contained in 29 fields beginning with the security number. The records are stored in security number sequence. After the data is read into the files, the data field of **GFINFILE is updated to reflect the date of the pricing information just read into those files.

The PRICESEC program is run at about 7 a.m. each morning after a business day. It assumes that the Bunker-Ramo data has been properly fed into the computer.

The program begins with the Control File Variable Retrieval Routine and then opens **GFINFILE.

From **GFINFILE are obtained the starting security number, ending security number, and name of each of the Bunker-Ramo files. A file entitled "EXCPLIST" is then opened for output, the M$(11) file is opened for input, and the M$(36) file is opened for output.

Each of the records in the Bunker-Ramo files A$(1)-A$(17), should match a corresponding record in the VALPORT files, M$(11)-M$(25), for the records in both sets of files are sorted in security sequence. If the ticker symbols match, the program puts into the daily price field of the VALPORT record the price variable appearing in one of the following fields (in the preference stated) from the Bunker-Ramo files: namely, the last price, close price (yesterday's last price), bid price, or asked price, as well as any new dividend, earnings, stock dividend date and stock dividend amount. (If the update is taking place on the day following the close of business of the first day of a new month, the old month-end price is discarded, and the previous day's closing price is transferred to the month-end price field before the new daily price is copied.)

On any given day, there will normally be about 9,000 matches and from 10 to 40 exceptions. These exceptions will be: a new security added to the Bunker-Ramo data, a security deleted from the Bunker-Ramo data, a security moved in the Bunker-Ramo file, or a security with a new ticker symbol or name. The VALPORT files completely parallel the Bunker-Ramo files with one exception at present. Stocks on the Pacific Coast Stock Exchange (which has about 50 stocks exclusively listed there and about 1,000 stocks also listed on the New York or American Exchange) are included in VALPORT only if they are exclusively listed on PCSE. Moreover, since the Bunker-Ramo data contains only zeroes in the fields associated with bond interest rates and maturities, the correct data stored in VALPORT is not disturbed.

Following the updating of each VALPORT file, the program switches to the File Name Flip-Flop Routine and rewrites the master control file into the primary and backup location. In this manner, each VALPORT Group 1 file, M$(11)-M$(25), is updated. The control file (CONTPORT) is rewritten after each file is updated.

Following this, the program ends by linking to the **SUPGNOBJ program.

N72SUPGN-SUPGNOBJ

This program, which is linked from PRICESEC, puts an updated cumulative supplement to the VALPORT Securities Index into the SUPPFIL1 file. The records are coded as follows:

1 = a new addition to the VALPORT files
2 = a deletion from the VALPORT files
3 = the old listing of a change in name or symbol
4 = the new listing of a change in name or symbol The program begins with the Control File Variable Retrieval Routine, then opens CATFILE2 for input and SUPPFIL1 for output.

CATFILE2 is a reference file in security number sequence of the current published VALPORT securities index. SUPPFIL1 will become the cumulative supplement file to the Index in security number sequence.

At the time this program is run, the master securities files will not contain the data from the current day's exception list, but will contain the changes made manually as a result of the previous day's exception list.

Each security record in each of the VALPORT master files is compared with each record in CATFILE2. Where there is a difference, it will have been caused by an edit of the VALPORT records since the creation of the CATFILE2 reference file. Each of these record exceptions is put into the updated SUPPFIL1 to create the current cumulative supplement in security number sequence.

The program ends by linking to the **SORTSUPT program.

SUPPSORT- SORTSUPP

This program, which is linked to form the SUPG-NOBJ program, is a utility sort making use of the SBC CBSORT utility sort program. The program operates by "weaving" SUPPSORT with CBSORT to create the resultant SORTSUPP program which sorts the records. The program opens SUPPFIL1 for input, sorts each of the SUPPFIL1 records alphabetically by security name, and puts them into SUPPFILE. The result is an alphabetized list of the cumulative changes to the latest VALPORT Securities Index.

LISTCONT

This program lists the contents of the master control file for the VALPORT system, whose user protected name is "CONTPORT".

The program opens the CONTPORT file and retrieves each of the variables through the Control Variable Retrieval Routine. The program then prints the entire current contents of CONTPORT in an organized list and terminates. (This program is available only to the VALPORT Master System Operator.)

EDITCONT

This program allows the VALPORT Master System Operator to edit the contents of the master control file, CONTPORT.

The program is loaded, and the system operator types the changes to the CONTPORT file as a substitute for line 500, which otherwise would read "500 STOP".

After any changes have been typed, the operator executes the program.

The program retrieves the contents of CONTPORT through the Control File Variable Retrieval Routine, edits the contents through the instructions typed by the operator, and then overlays the edited contents of the file on the original file. The program then terminates.

**VALSEC(NEW) - N72NEWS - NEWSOBJ

This program is used by the VALPORT Master System Operator to enter new securities into the VALPORT master securities files, and is used by any VALPORT user to enter securities into that user's supplemental security files.

The program begins with the Control File Variable Retrieval Routine for **CONTPORT and CONTROL1. (CONTPORT for the Master System Operator).

The program prompts the operator to enter a ticker symbol, checks that it contains 6 characters or less, and (for the master user) does not begin with "=".

For the master user entering a Group 1 security, the routine then selects the appropriate **SYM#A-Z opens that file and retrieves the security number from that file.

When the ticker symbol supplied by the master operator is "+, , ," or the security supplied by the user is "=. . .", representing Group 2 or Group 3 securities, the program automatically assigns a security number based on the latest Group 2 or Group 3 number.

The user or master operator is then prompted to supply the security name, classification code, dividends and earnings or interest and maturity.

Numeric to Alpha Conversion Routine

Control then branches to this routine, to convert the numeric security number K1 into an alpha variable K$. This routine uses a single loop which initially separates each digit of the numeric variable beginning with the most significant one, and then goes to that position of the alpha-to-numeric control variable, A$ (3) of **CONTPORT, to determine the alphameric character corresponding to that digit. The next digit is then converted and the value of each successive digit, raised to proper powers, is summed and subtracted from the original number to strip off each successive digit.

Control then branches to the Ticker Symbol File Selection Routine, where the proper file, Y$ (1-12) or Y$ (7-8), is selected and opened for input together with its backup for output.

The first control field is increased by 1 to indicate the addition of a new security. Control then branches to the Ticker Symbol Data Retrieval Routine in which the contents of the old ticker symbol file are merged with the new ticker symbol and copied into the backup file.

Control then branches to the Master Security File Selection Routine and the Master Security Data Retrieval Routine in which the old file is merged together with the new security record and copied into the backup file. The File Name Flip-Flop Routine for both the security and ticker symbol files is then performed simultaneously so that the new record will be activated simultaneously in the ticker symbol file and master securities file. The master control file is then rewritten.

The meter is then adjusted to reflect the addition of a new security and ticker symbol. Control then returns to prompt the entry of another new ticker symbol. If the symbol is zero, the program ends.

**VALSEC(FIND)-N72FINDS-FINDSOBJ

This program is used to retrieve data about individual securities from the master security file when queried with the ticker symbol.

The program starts with the Control File Variable Retrieval Routine. As the program may be used by either the master operator or the user, the supplemental security files are bypassed for the master operator as only a user may access his files.

The user is prompted to enter a ticker symbol, and program control then branches to the Ticker File Selection Routine, the Ticker Symbol Data Retrieval Routine and, when the ticker symbol is found, the Alpha to Numeric Conversion Routine for the security number. The terminal then prints the ticker symbol and security number and goes through the Master Security File Selection Routine, the Master Security Data Retrieval Routine, and prints out the full name, economic code, dividend or interest, earnings or maturity, daily price and month-end price. The program then branches back and asks for another symbol. If it is zero, the program terminates.

**VALSEC(DEL) - N72DELS - DELSOBJ

This program is used by the master operator to delete a security from the master security files or by any user to do so in the supplemental security files.

The program begins with the Control File Variable Retrieval Routine. The operator is then prompted to supply a ticker symbol. It is checked to see if it begins with "=", indicating an error condition for the master operator.

Control branches to the Ticker File Selection Routine and the Ticker Symbol Data Retrieval Routine.

In a routine similar to that of **(VALPORT(DEL) the ticker symbol file is copied over to its backup while blocking out the ticker symbol to be deleted.

In this process the initial numeric field is rewritten to reflect one less ticker symbol in the file.

The Alpha to Numeric Conversion routine is next performed on the security number. The control then branches to the Master Security File Selection Routine and the Master Security Data Retrieval Routine.

Again in a routine similar to that of **VALPORT(-DEL) the data on the master security file is copied to the backup while the record of the security to be deleted is bypassed.

After these procedures, a tandem File Name Flip-Flop Routine for the ticker symbol file names and the security file names is performed to allow simultaneous updating of the new files.

Following the deletion of the records and the file name Flip-Flip, the user's CONTROL1 or the master operator's CONTPORT file is rewritten. The METERA file is also updated to reflect the deletion of a security, and a message is printed, confirming the deletion of the security. The program then prompts the entry of another symbol. If it is zero, the program terminates.

**VALSEC(EDIT) - N72EDITS - EDITSOBJ

This program is used by the VALPORT master security operator to edit data about the securities in the master securities or by any user to do so in the supplemental securities files.

This program begins with the Control File Variable Retrieval Routine.

It then provides for two types of edit, a complete edit capability with full verification (STD), or a quick edit capability with minimum verification (QCK).

Control then branches to the Ticker Symbol File Selection Routine, the Ticker Symbol Data Retrieval Routine, the Alpha to Numeric Conversion Routine, the Master Securities File Selection Routine and the Master Securities Data Retrieval Routine to locate the desired security.

When the desired security is found the terminal prints the name, and if STD, the code, dividend, earnings, daily price, and month-end price. It then prompts the user to enter the field he wishes to edit.

Following the edit the new record is copied to the backup file, together with all of the remaining records in the security file. Control then branches to the File Name Flip-Flop Routine, and the control file is rewritten. The program then branches back to determine if there is a new ticker symbol to be edited. If a zero is entered, the program terminates. **VALSEC(EDIT-PRI) - N72EPRI - EPRIOBJ This program is used by the master operator to update prices only in the master securities file or by any user to do so in the supplemental securities file.

This program is an abbreviated version of the VALSEC(EDIT) program using the same coding while bypassing certain sections. The user initially supplies a ticker symbol and price for the security whose price he wishes to change.

The program then goes through the Control File Variable Routine, determines whether the ticker symbol begins with "=", goes to the Ticker Symbol File Retrieval Routine, the Ticker Symbol Data Retrieval Routine, the Alpha to Numeric Conversion Routine, the Master Security File Selection Routine, and the Master Security Data Retrieval Routine, copying over the records to the backup file with the edited data for the selected security. Next, the file name Flip-Flop Routine is executed, and the control file rewritten. If a ticker symbol of zero is entered, the program terminates.

**VALSEC(MOVE)- N72MOVE - MOVEOBJ

This is a multi-purpose program that allows the VALPORT Master System Operator or any VALPORT user to move securities within the system to reflect changes of ticker symbols, mergers with other securities, movements from one exchange or another, or movements from Group 1, 2, or 3 to another Group.

A security may effectively be "moved" by a combined use of the VALSEC 'DEL' and 'NEW' programs. The change should preferably be done through the VALSEC 'MOVE' program to insure a proper trail and cross-reference. In this way, a portfolio referring to the outdated ticker symbol or security number can be valued based on the current security data.

Rather than describing the program logic and flow, since the program uses the iterations and routines previously described, this program will be explained in terms of the principal options.

User Option 1. This program will change an existing user Group 3 security ticker symbol by deleting the old ticker symbol from the ticker symbol file, adding the new ticker symbol to the file, and noting the new ticker symbol in the proper field of that security record in the securities file. (The security number is not changed.)

User Option 2. The program will merge a Group 3 security with an existing Group 3 security by deleting the old ticker symbol, deleting the old security record, and adding a record to the OLDNEW#1 file showing the two security numbers and the exchange rate.

User Option 3. The program will merge a Group 3 security with either a Group 2 or Group 1 security by deleting the old ticker symbol, deleting the old security record, and adding a record to the OLDNEW#1 file, cross-referencing the system to the security in the VALPORT master files.

Master Option 1. The program will change an existing Group 2 security to a new Group 2 security by deleting the old ticker symbol, re-entering the new ticker symbol, noting the new ticker symbol field in the master security record, and putting a new record in the SYMX1 ticker-symbol-to-ticker-symbol cross-reference.

Master Option 2. The program will merge an existing Group 2 security into another existing Group 2 security by deleting the old ticker symbol, deleting the old security record, and putting a cross-reference trail in the SYMX1 and OLDNEW#1 file for ticker symbol and security number cross-reference.

Master Option 3. The program will transfer an existing Group 2 security to a new Group 1 security by deleting the old ticker symbol and security record, going to the **SYM#A-Z files for the new Bunker-Ramo security number, entering the new ticker symbol and security record, and cross-referencing both in the SYMX1 and OLDNEW#1 file.

Master Option 4. The program will merge an existing Group 2 security into an existing Group 1 security by deleting the old ticker symbol, deleting the old security record, and cross-referencing both in the SYMX1 and OLDNEW#1 files.

Master Option 5. The program will change an existing Group 1 security to a new Group 1 security by deleting the old ticker symbol and security records, going to the **SYM#A-Z files for the new Bunker-Ramo security number, re-entering the new ticker symbol and security record and cross-referencing both with SYMX1 and OLDNEW#1 as necessary.

Master Option 6. The program will merge an existing Group 1 security into an existing Group 1 security by deleting the old ticker symbol and security records, and cross-referencing both in SYMX1 and OLDNEW#1.

Master Option 7. The program will merge an existing Group 1 security with an existing Group 2 security by deleting the old ticker symbol and security record and cross-referencing both in SYMX1 and OLDNEW#1.

Master Option 8. The program will change an existing Group 1 security to a new Group 2 security by deleting the old ticker symbol and security record, re-entering the new ticker symbol and security record, and cross-referencing both in SYMX1 and OLDNEW#1.

VALSEC(CAT) - N72CATS - CATSOBJ

This is a multi-purpose program with three flexible options, COUNT, CATSUPP and CATALL.

The COUNT option provides a count of the securities in either the master file or user file. For the master file, it provides a count of the number of Group 1 securities and number of Group 2 securities. It also provides the count of the securities records, broken down by classification code and by exchange.

The number of security records can be checked against the number of ticker symbol records to ascertain whether they are equal. This feature is used to verify a breakdown during editing to determine it is necessary to examine the contents of the files.

The CATSUPP option allows the user to print the contents of a cumulative supplement to the Securities Index supplement. The user may begin at any page or can enter page 0 to selectively print additions, deletions or changes, beginning with a certain letter or the name of a given security. This allows a user to ascertain if there has been any change in the ticker symbol or otherwise with respect to a particular security.

The CATALL option allows the user to print an alphabetized list of all his Group 3 securities. (This option has been superseded by the VALSEC'-=SUPP' option produced by SUPPSEC.)

BACKSEC

This program allows a backup of the VALPORT master securities files for data protection. The program begins with the Control File Variable Retrieval Routine, opens SECFILE1 for output and copies the first 15 securities files, M$(1)-M$(15), and closes SECFILE1. It then opens SECFILE2 for output and puts the security records from files M$(16) through M$(25) in that file and closes it. Lastly, it opens SYMFILE and puts into it each of the VALPORT master ticker symbol files. In each case, the control heading for the file is not copied.

RECOSEC

This program recovers the backed-up security files and ticker symbol files by opening SECFILE1, SEC-FILE2, and determining (from the CONTPORT file control array), the highest security to be put in each new file. It counts the records in SECFILE1 and SEC-FILE2 to determine the number of securities to be put in each VALPORT master securities file.

Following that procedure, the program then branches to the Master Securities Data Retrieval Routine and puts those security records in their proper files together with the proper numeric heading of the number of records in each file.

Following that procedure, the program opens the SYMFILE and determines the number of ticker symbols to go into each of the VALPORT master ticker symbol files. It then goes through the appropriate data retrieval routine and copies the records in to the proper files with the appropriate control heading number.

SECDATES - N72SECD - SECDOBJ

This program opens GFINFILE and obtains and prints the "OLSDAY" date, opens RFINFILE and obtains and prints the "OLSBKUP" date, opens FFINFILE and obtains and prints the "OLSMO" date, opens the IDXREF0 file and obtains and prints the "IDINFO" date, opens **CONTPORT and obtains and prints the VALPORT "DAY" and "MO" dates.

The program is used to check the current date status of each of the files.

CATGEN

This program is run daily to produce the CATFILE1 and CATREF files.

The program begins with the Control File Variable Retrieval Routine and then opens CATFILE and CATREF as output files. It places the current pricing date in CATREF. Each of the VALPORT master security files is then opened in sequence. The security name, ticker symbol, security number, and classification code are read into CATFILE while the security numbers alone are read into CATREF. After all of the securities have been read, all files are closed, and program control branches to the **SORTOBJ program.

SORTSEC - **SORTOBJ

This program sorts the security records alphabetically from CATFILE1 to CATFILE. It links from the CATGEN file and has been woven with the CBSORT utility sort routine to produce the alphabetic sort of CATFILE.

PRINTFCT

This program opens **GFINFILE to retrieve the names of the Bunker-Ramo files, opens CATREF to retrieve the printing date, and opens CATFILE to retrieve the new alphabetized VALPORT securities list. It then either prints the contents of CATFILE at the terminal, or produces an internal print file (SEC-BOOK1), prints the contents of CATFILE at the high-speed printer, thus producing the VALPORT securities index.

CHEKSECS

This program opens the EXCPLIST file, reads it and prints the day's exception list to allow the Master System Operator to make the necessary corrections to the Group 1 files.

**VALSEC

This is the master control program for the **VALSEC 'NEW', 'EDIT', 'EDITPRI', 'DEL', 'MOVE', 'FIND', 'CARD', 'CATSUPP', 'COUNT', '=SUPP', and 'FORM' options. The program prompts the user to enter the desired option and branches to the selected program if the option is valid. If invalid, it lists the valid options and prompts the user again to enter the desired option.

**SUPPSEC

This program operates the '=SUPP' option of VALSEC and replaces the 'CATALL' option of the CATSEC program. It allows the user to print an alphabetized listing of all Group 3 securities in his files.

The user may specify any starting page or specify that the listing start with a particular letter or word.

**VALPORT—VALPORT

This is the master control program for the **VALPORT options. The user is prompted to enter the type of VALPORT run to be executed. If the type is valid, the program links to the appropriate program. If invalid, a list of valid types is printed, and the program agains prompts the user to enter a valid type.

VALPORT(XS)—XSP—XSP

This program links from XSPOBJ and produces a customized report or file for a user desiring a schedule with a format different from those provided, or desiring to process additional data before producing one or more custom reports. The program is controlled by a user-designed program, weaving XSP with the user program.

**XSP retrieves the portfolio from the TEMPO file and stores the data in variable positions known to the designer of the customized control program.

**XSDEMO—XSDEMO

This is a sample "XSP" control program and an explanation of the VALPORT 'XS' option.

**VALPORT (CHEK)—CHEKPORT

This program is used to check the correct formatting of a source data file. The user identifies whether it is a standard portfolio data file, with or without cost, or whether it is a standard or weekend estate file.

The program opens the file, reads each line number, prints each line number, attempts to read each data line, using the appropriate format. If there is an error, the program aborts with an error message immediately after printing the line number of the line containing the data.

**VALPORT(USE)—USEPORT

This program opens METERA and reads the data, opens CATALOG1 and reads the initials of the representatives, and calculates and prints the usage by each representative and the total usage for that VALPORT user since the date METERA was previously reset.

**VALPORT (MGT)—MGTPORT

This program has the same function as USEPORT except that it permits the operator to reset METERA to zero and establish a new report date. It also produces a summary usage report.

**VALPORT (EDITCAT)

This program allows the editing of the CATALOG1 file. After the file is opened the user may list all the representatives' initials, may change the initials for a given representative number, add new representatives, or establish an entirely new list of representatives' initials. Alternately, the user may use the program to change the system forms control to allow printing on continuous forms or on $8\frac{1}{2} \times 14$ size paper.

ENHANCEMENTS

The system as disclosed is limited to 175 issues per portfolio, no duplicate holding may occur, no transaction records are kept, no tax lot records are kept, and the mathematical precision is limited to seven significant digits. Enhancements to the VALPORT system include increasing the portfolio limit to over 2,000 holdings, providing for multiple holdings of the same security in different tax lots, including transaction records with purchase and sell dates, recording long-term and short-term gains and losses, and increasing the mathematical precision to sixteen significant digits. Additional enhancements include transaction posting, collateral loan portfolio valuation, multiple portfolio repricing, and high-speed report output.

INDEX TO PROGRAM LISTINGS

| Source Program Name | Object Program Name | User Name | Program Function |
|---|---|---|---|
| DEMOPORT | (DATAFILE) | **DEMOPORT | Typical portfolio with cost information |
| BIGPORT | (DATAFILE) | **BIGPORT | Large sample portfolio without cost information |
| N72NEWP | NEWPOBJ | **VALPORT (NEW) | Used to create a new portfolio; optionally store it in master portfolio files and link to report options |
| N72EDITP | EDITPOBJ | **VALPORT (EDIT) | Used to edit a portfolio (including additions, deletions and updating); optionally store it in master portfolio files and link to report options |
| N72LISTP | LISTOBJ | **VALPORT (EDIT) | Used by linking from EDITOBJ to list the edited portfolio |
| N72DELP | DELPOBJ | **VALPORT (DEL) | Used to delete a portfolio from the master portfolio files |
| N72MOVEP | MOVEPOBJ | **VALPORT (MOVE) | Used to move the portfolio and change the portfolio shortname |
| N72READ | READOBJ | **VALPORT (LIST) | Used to produce a portfolio listing |
| N72VAL | VALPOBJ | **VALPORT (VAL) (PUR) (SEL) | Used to type the detailed valuation schedule, purchase recommendation schedule, or sell recommendation schedule |
| N72VALD | VALDOBJ | **VALPORT (VALD) | Used to type the detailed valuation schedule without price/earnings ratio |

-continued

INDEX TO PROGRAM LISTINGS

| Source Program Name | Object Program Name | User Name | Program Function |
|---|---|---|---|
| N72VALX | VALPLOBJ | **VALPORT (VALX) | Used to type the extended valuation schedule showing gain and loss information |
| N72SUM | SUMPOBJ | **VALPORT (SUM) | Used to type the summary valuation schedule |
| N72SUMPL | SUMPLOBJ | **VALPORT (SUMX) | Used to type the extended summary valuation schedule |
| N72TAX | TAXPOBJ | **VALPORT (TAX) | Used to type the schedule of unrealized gains and losses (sorted by gain amount or gain percent) |
| N72GAIN | GAINOBJ | **VALPORT (GAIN) | Used to type the alphabetical schedule of gains and losses |
| N72SIZE | SIZEOBJ | **VALPORT (SIZE) | Used to type valuation schedule sorted by total value of holding |
| ESTATE1 | (DATAFILE) | **ESTATE1 | Sample portfolio for standard estate valuation |
| ESTATE2 | (DATAFILE) | **ESTATE2 | Sample portfolio for weekend estate valuation |
| N72ESTP | ESTPOBJ | **VALPORT (EST) | Used to type the standard estate valuation schedule |
| N72ESTPW | ESTPOBJW | **VALPORT (EST) | Used by linking from ESTPOBJ to type weekend estate valuation schedule |
| N72XSP | XSPOBJ | **VALPORT (XS) | First segment of user-customized access routine; retrieves portfolio and looks up securities information |
| XSP | (NONE) | **XSP | Second segment of user-customized access routine; links from XSPOBJ and used to weave and run (WVR) with user control programs to print user-customized reports |
| XSDEMO | (NONE) | **XSDEMO | Used to explain XS option to user |
| N72COVP | COVPOBJ | **VALPORT (COV) | Used to type the portfolio cover sheet |
| N72HOLDS | HOLDSOBJ | **VALPORT (HOLDS) | Used to list all portfolios holding a particular security |
| N72SETUP | SETUPOBJ | **VALSETUP | Used to gain access to the VALPORT system and initially install the system in a particular user "library". |
| VALPORT | (NONE) | **VALPORT | Master control program for VALPORT programs |
| CHEKPORT | (NONE) | **CHEKPORT | Determine location of errors in source data files |
| USEPORT | (NONE) | **USEPORT | Print detailed report of VALPORT system usage |
| MGTPORT | (NONE) | **MGTPORT | Print summary report of VALPORT usage, reset usage meter |
| EDITCAT | (NONE) | **EDITCAT | Add or edit representatives' initials, list representatives' initials and code numbers, edit forms control |
| LISTCONT | (NONE) | LISTCONT | Permits VALPORT master System Operator to access and print contents of VALPORT master control file |
| EDITCONT | (NONE) | EDITCONT | Permits VALPORT Master System Operator to edit contents of VALPORT master control file |
| N72PRICE | PRICEOBJ | PRICESEC | Used to automatically update VALPORT master securities files from raw Bunker-Ramo data and create exception file |
| N72SUPGN | SUPGNOBJ | NONE | Used by linking from PRICEOBJ to compare current master securities files with reference file created at time of publication of latest securities index; exceptions automatically create a cumulative supplement which is stored in SUPPFIL1 |
| SUPPSORT* | SORTSUPP | NONE | Used to sort contents of SUPPFILE1 into alphabetical sequence storing results in SUPPFILE |
| N72NEWS | NEWSOBJ | **VALSEC (NEW) | Used by any user to enter security into user supplemental files; used by VALPORT Master User to enter new security into VALPORT master securities files |
| N72FINDS | FINDSOBJ | **VALSEC (FIND) | Used to retrieve data about an individual security from a file when queried with ticker symbol |
| N72CARDS | CARDSOBJ | **VALSEC (CARD) | Used to produce a 3×5 card as a permanent record of securities stored in supplemental file |
| N72DELS | DELSOBJ | **VALSEC (DEL) | Used by any user to delete a security from his supplemental securities file or by VALPORT Master User to delete a security from VALPORT master securities files |
| N72EDITS | EDITSOBJ | **VALSEC (EDIT) | Used by any user to edit securities in user supplemental securities files and by VALPORT master user to edit securities in VALPORT master securities files |
| N72EPRI | EPRIOBJ | **VALSEC (EDITPRI) | Used to update prices in user supplemental securities files or VALPORT master securities file |
| N72MOVE | MOVEOBJ | **VALSEC (MOVE) | Move security records with automatic cross-indexing |
| N72CATS | CATSOBJ | **VALSEC (CAT, CATSUPP,=SUPP) | Provides count of securities masterfiles or user supplemental security files; and prints cumulative supplement to latest VALPORT Securities Index, and prints alphabetical list of users supplemental securities |
| BACKSEC | NONE | BACKSEC | Backup securities masterfiles and ticker symbol masterfiles |
| RECOSEC | NONE | RECOSEC | Recover from BACKSEC |
| N72SECD | SECOBDS | **SECDATES | Print pricing dates for Bunker-Ramo and VALPORT |

-continued

INDEX TO PROGRAM LISTINGS

| Source Program Name | Object Program Name | User Name | Program Function |
|---|---|---|---|
| | | | files |
| CATGEN | NONE | CATGEN | Strips security name, ticker symbol, security number and classification code from securities masterfiles and stores in CATFILE1 |
| SORTSEC | SORTOBJ | NONE | Alpha sort from CATFILE1 to CATFILE |
| PRINTFCT | NONE | PRINTFCT | Print contents of CATFILE or produce internal print file to produce VALPORT securities index |
| CHEKSECS | NONE | CHEKSECS | Print daily securities exception list from **EXCPLIST |
| VALSEC | NONE | **VALSEC | Master control program for VALSEC programs |
| SUPPSEC | NONE | **SUPPSEC | Print alphabetized listing of Group 3 supplemental securities |

*Woven with SBC **CBSORT program to provide customized sort routine.

Listings for the following programs are available in the file of this application as an appendix and are further available in the record of Appeal 79-592 in the Court of Customs and Patent Appeals: DEMOPORT, BIGPORT, N72LISTP, N72DELP, N72MOVEP, N72READ, N72VALD, N72VALX, N72SUM, N72SUMPL, N72TAX, N72GAIN, N72SIZE, ESTATE 1, ESTATE 2, N72ESTP, N72ESTPW, N72XSP, XSP, XSDEMO, N72COVEP, N72HOLDS, CHEKPORT, USEPORT, MGTPORT, LISTCONT, EDITCONT, N72SUPGN, SUPPSORT, N72FINDS, N72CARDS, N72CARDS, N72DELS, N72EDITS, N72EPRI, N72CATS, BACKSEC, RECOSEC, N72SECD, CATGEN, SORTSEC, PRINTFCT, CHECKSECS, and SUPPSEC.

```
PROG...ZZW110..N72NEWP ...............

1 REM COPYRIGHT 1968,1969,1970,1971 FREDERIC C. TOWERS
  2 REM RUN **NEWPORT ==   EXE **NEWPOBJ
 50 DIM M$(30),M(30,1),F$(20),J(100,6),X$(8),A$(5)
 60 DIM X(150),I(150),S$(150),T$(150),U$(150),N(150),C(150),D(150),E(150),Z(150),Y(150),V(150),W(150),P(150,6)
 70 DEF FNA(X)=INT(X+1/2)
100 GOSUB 4710
105 #$=A$(3)
110 D5=D0
120 GOSUB 4670
130 CLOSE 1
140     :########  (0:##)
150 PRINT".PRICES: ";
160 PRINT USING 210 ,M5,D5,Y5;
170 PRINT " & ";
180 D5=B0
190 GOSUB 4670
200 PRINT USING 210 ,M5,D5,Y5
210     :##/##/##
220 PRINT".";
230 PRINT"INPUT(FILE,KEY)";
240 INPUT T$
250 IF T$="KEY" GOTO 292
260 IF T$."FILE" GOTO 230 ≠
270 PRINT"FILNAME";
280 INPUT F$
290 OPEN 1,F$,INPUT
292 PRINT".SUPPLYING COSTS";
294 GOSUB 3920
296 Q1=Z9
300 PRINT"# OF ISSUES";
310 INPUT N2
320 IF N2>0 GOTO 350
330 PRINT"NUMBER MUST BE GREATER THAN ZERO"
340 GOTO 300
350 IF N2.160 GOTO 410 ≤ (<=)
360 PRINT"LIMIT IS 150"
370 GOTO 300
410 IF T$="KEY" GOTO 600
420 ON EOF 1 GOTO 520
430 FOR R=1 TO N2
440 GET P(R,3),U$(R)
```

```
450 IF Q1=0 GOTO 470
460 GET P(R,5)
470 NEXT R
480 CN EOF 1 GOTO 580
490 GET X,X$
500 PRINT"OOPS.  I HAVE";X;X$;" LEFT OVER"
510 GOTO 530
520 PRINT"OOPS.  NOT THAT MANY ISSUES IN ";F$;
525 PRINT
530 RESET 1
540 PRINT"# OF ISSUES (0=STOP)";
550 INPUT N2
560 IF N2>0 GOTO 420
570 STOP
580 CLOSE 1
590 GOTO 640
600 PRINT"ENTER EACH ISSUE (FORM: 100,GM";
610 IF Q1=0 GOTO 630
620 PRINT",6400";
630 PRINT")"
640 PRINT".";
650 FOR R=1 TO N2
660 IF Q1=0 GOTO 690
670 INPUT P(R,3),U$(R),P(R,5)
680 GOTO 700
690 INPUT P(R,3),U$(R)
700 NEXT R
710 PRINT".";
720 FOR S=1 TO N2
730 Q$="999999999"
740 FOR R=1 to N2
750 IF X(R)=-1 GOTO 800
760 IF Q$<U$(R) GOTO 800
770 IF Q$=U$(R) GOTO 850
780 Q$=U$(R)
790 L=R
800 NEXT R
810 I(S)=L
820 (X(L)=-1
830 NEXT S
840 GOTO 870
850 PRINT Q$;" IS ENTERED TWICE. PLEASE CHECK YOUR DATA AND BEGIN AGAIN."
```

```
860 STOP
870 PRINT USING 140 ,"SYMSORT",CPU
880 FOR S=1 TO N2
890 R=I(S)
900 Z$=U$(R)
910 GOSUB 4010
920 A$=Z$
930 GOSUB 4200
940 NEXT S
950 PRINT
960 FOR S=1 TO N2
970 Q=999999999
980 FOR R=1 TO N2
990 IF X(R)=0 GOTO 1030
1000 IF Q<P(R,L) GOTO 1030
1001 IF Q>P(R,1) GOTO 1010
1002 IF P(R,1)=0 GOTO 1030
1003 P(R,1)=0
1004 P(L,3)=P(L,3)+P(R,3)
1005 P(L,5)=P(L,5)+P(R,5)
1010 Q=P(R,1)
1020 L=R
1030 NEXT R
1040 I(S)=L
1050 X(L)=0
1060 NEXT S
1070 PRINT USING 140 , "SEC#SORT",CPU
1080 U1=-1
1090 L1=0
1100 PRINT".";
1110 FOR S=1 TO N2
1120 R=I(S)
1130 IF P(R,1)=0 GOTO 1440
1140 FOR L=2 TO 30
1150 IF P(R,1)<M(L,1) GOTO 1170
1160 NEXT L
1170 L=L-1
1180 IF L=L1 GOTO 1240
1190 OPEN 1,P$(L),INPUT
1200 L1=L
1210 GET N1
1220 FOR R1=1 TO N1
1230 GET S$(R),T$(R),U$(R),N3,P(R,2),D(R),E(R),V(R),W(R),Y(R),Z(R)
```

```
1240 IF P(R,1)<N3 GOTO 1370
1250 IF P(R,1)>N3 GOTO 1360
1260 S$(R)=S$
1270 T$(R)=T$
1280 P(R,2)=C3
1290 D(R)=D3
1300 E(R)=E3
1310 V(R)=V3
1320 W(R)=W3
1330 Y(R)=Y3
1340 Z(R)=Z3
1350 GOTO 1390
1360 NEXT R1
1370 PRINT"SECURITY #";P(R,1):"NOT IN MASTER FILE"
1380 L1=0
1390 IF CPU=U1 GOTO 1440
1400 IF S=N2 GOTO 1440
1410 PRINT USING 1420 ,S,CPU
1420      :### ISS    (0:##)
1430 U1=CPU
1440 NEXT S
1450 PRINT USING 1420 ,S,CPU
1460 PRINT
1470 U1=0
1480 IF N2>0 GOTO 1510
1490 PRINT"NO PORTFOLIO LEFT"
1500 GOTO 10000
1510 PRINT"PRICE(DAY,MO,MAN)";
1520 INPUT A$
1530 IF A$="DAY" GOTO 1690
1540 IF A$="MO" GOTO 1710
1550 IF A$="MAN" GOTO 1570
1560 GOTO 1510
1570 PRINT"VALUATION DATE (FORM: 9,30,71)";
1580 INPUT M,D,Y
1590 IF M<1 GOTO 1650
1600 IF D<1 GOTO 1650
1610 IF M>12 GOTO 1650
1620 IF D>31 GOTO 1650
1630 IF Y>100 GOTO 1570
1640 GOTO 1670
1650 PRINT"EVEN I KNOW A YEAR HAS 12 MONTHS, AND A MONTH 31 DAYS.  CORRECT DATE":
```

```
1660 GOTO 1580
1670 D8=Y*10000+M*100+D
1680 GOTO 1780
1690 D8=D0
1700 GOTO 1720
1710 D8=B0
1720 FOR S=1 TO N2
1730 IF A$="MO" GOTO 1760
1740 P(S,4)=V(S)
1750 GOTO 1770
1760 P(S,4)=W(S)
1770 NEXT S
1780 PRINT" ";
1790 FOR S=1 TO N2
1800 IF P(S,1)=0 GOTO 1870
1810 IF P(S,4)>0 GOTO 1870
1820 IF Z4=1 GOTO 1850
1830 PRINT"I NEED PRICES FOR:"
1840 Z4=1
1850 PRINT U$(S);
1860 INPUT P(S,4)
1870 NEXT S
1880 FOR S=1 TO N2
1890 IF P(S,1)=0 GOTO 1990
1900 IF P(S,2)>5 GOTO 1930
1910 A0=100
1920 GOTO 1940
1930 A0=1
1940 IF P(S,3)*(P(S,4)/A0)-P(S,5))>0 GOTO 1960
1950 IF ABS(P(S,3)*(P(S,4)/A0)-P(S,5))>ABS(P(S,5)/2) GOTO 2010
1960 IF D(S)/P(S,4))>12/100 GOTO 2060
1970 V1=P(S,3)*P(S,4)/A0
1972 V1=FNA(V1)
1974 V5=V5+V1
1976 C1=FNA(P(S,5))
1980 C5=C5+C1
1990 NEXT S
2000 GOTO 2110
2010 PRINT U$(S);" SHOWS A LOSS OF OVER 50%.   OK";
2020 GOSUB 3920
2030 IF Z9=1 GOTO 1960
2040 GOSUB 4890
2050 GOTO 1940
2060 PRINT U$(S);"SHOWS A YIELD OF"; D(S)/P(S,4)*100;"%. OK";
```

```
2080 ----  ----
2080 IF Z9=1 GOTO 1970
2090 GOSUB 4890
2100 GOTO 1940
2110 PRINT".";
2120 PRINT"PORTFOLIO FILE (SHORT) NAME";
2130 INPUT X$
2140 IF X$."TEMPO" GOTO 2170 ≠
2150 PRINT'SHORT NAME MAY NOT BE "TEMPO"'
2160 GOTO 2110
2170 IF STR(X$,9)="" GOTO 2200
2180 PRINT"SHORT NAME MUST CONTAIN 8 CHARACTERS OR LESS"
2190 GOTO 2110
2200 PRINT".";
2210 PRINT'                "," _____"'
2220 PRINT"ACCOUNT NAME";
2230 INPUT N$,O$
2240 PRINT
2250 PRINT"I HAVE..    ";N$,O$;
2260 PRINT
2270 PRINT"OK";
2280 GOSUB 3920
2290 IF Z9=1 GOTO 2320
2300 PRINT"36-LTR MAXIMUM. TRY AGAIN."
2310 GOTO 2210
2320 PRINT
2330 IF U(1)>1 GOTO 2360
2340 R8=1
2350 GOTO 2520
2360 PRINT"REP #";
2370 INPUT R8
2380 IF R8>0 GOTO 2410
2390 PRINT"REP # MUST BE BETWEEN 1 AND";U(1)
2400 GOTO 2360
2410 IF R8.U(1) GOTO 2440 <=
2420 PRINT"ONLY";U(1);"VALID REPS"
2430 GOTO 2360
2440 OPEN 1,"CATALOG1",INPUT
2450 GET J$,J$,J$,J$,J$,J,J,J,J,J
2460 FOR R=1 TO R8
2470 GET R$
2480 NEXT R
```

```
2490 PRINT R$;" - ";R8;"OK";
2500 GOSUB 3920
2510 IF Z9=0 GOTO 2360
2520 PRINT"CASH BALANCE";
2530 INPUT C2
2540 IF Q1=1 GOTO 2570
2550 T2=8
2560 GOTO 2580
2570 T2=4
2580 PRINT".";
2590 FOR R=1 TO N2
2600 IF P(R,1).0 GOTO 2620 ≠
2610 N5=N5+1
2620 NEXT R
2630 IF N2-N5>0 GOTO 2660
2640 PRINT"NO PORTFOLIO LEFT"
2650 GOTO 10000
2660 D5=D8
2670 GOSUB 4670
2680 PRINT USING 2690,V5+C2,M5,D5,Y5
2690     :$######### VALUE ##/##/##
2692 PRINT USING 2694,C5+C2,C2
2694     :$######### COST    $######## CASH
2700 PRINT".";
2710 OPEN 1,"METERA",INPUT
2720 GET $1,$2,$3,$4,$5,$6,$7,$8,$9,$0
2730 MAT GET J($0,6)
2740 J(R8,1)=J(R8,1)+1000+N2-N5
2750 CLOSE 1
2760 OPEN 2,"METERA",OUTPUT
2770 PUT $1,$2,$3,$4,$5,$6,$7,$8,$9,$0
2780 MAT PUT J
2790 CLOSE 2
2800 OPEN 2,"TEMPO",OUTPUT
2810 PUT X$,N$,O$,R8,D8,0,N2-N5,T2,C2
2820 FOR S=1 TO N2
2830 R=I(S)
2840 IF P(R,1)=0 GOTO 2860
2850 PUT P(R,1),P(R,2),P(R,3),P(R,4),P(R,5),P(R,6)
2860 NEXT S
2870 FOR S=1 TO N2
2880 R=I(S)
2890 IF P(R,1)=0 GOTO 2910
```

```
2900 PUT S$(R),T$(R),U$(R),D(R),E(R),V(R),W(R),Y(R),Z(R)
2910 NEXT S
2920 CLOSE 2
2930 PRINT X$:" FILED IN "TEMPO""
2940 PRINT"ADD TO MASTER FILE";
2950 GOSUB 3920
2960 IF Z9=0 GOTO 3500
2970 F9=0
2980 OPEN 3,"CONTROL1",OUTPUT
2990 OPEN 4,"CONTROL2",OUTPUT
3000 FOR L=1 TO 7 STEP 2
3010 IF X$<STR(A$(5),L,2) GOTO 3030
3020 NEXT L
3030 L=(L+1)/2
3040 OPEN 1,P$(L),INPUT
3050 P0=L
3060 OPEN 2,P$(5),OUTPUT
3070 GET N1
3080 PUT N1+1
3090 FOR R1=1 TO N1
3100 GET F$,G$,H$,R7,D6,D7,N3,T3,C3
3110 REM SYM,NAME1,NAME2,REP,DATE,PREVDATE,#ISSUES,TYPE,CASH
3120 IF F9=1 GOTO 3150
3130 IF X$=F$ GOTO 3320
3140 IF X$<F$ GOTO 3230
3150 PUT F$,G$,H$,R7,D6,D7,N3,T3,C3
3160 FOR R2=1 TO N3
3170 GET P1,P2,P3,P4,P5,P6
3180 PUT P1,P2,P3,P4,P5,P6
3190 NEXT R2
3200 NEXT R1
3210 IF F9=1 GOTO 3370
3220 F0=1
3230 PUT X$,N$,O$,R8,D8,D9,N2-N5,T2,C2
3240 FOR S=1 TO N2
3250 R=I(S)
3260 IF P(R,1)=0 GOTO 3280
3270 PUT P(R,1),P(R,2),P(R,3),P(R,4),P(R,5),P(R,6)
3280 NEXT S
3290 F9=1
3300 IF F0=1 GOTO 3370
3310 GOTO 3150
```

```
3320 PRINT X$;" IS ALREADY IN THE FILE.  IT BELONGS TO ";G$,HS'"."
3330 PRINT"ALTERNATE FILE NAME (0=STOP)";
3340 INPUT X$
3350 IF X$="0" GOTO 3500
3360 GOTO 3000
3370 J$=P$(5)
3380 P$(5)=P$(P0)
3390 P$(P0)=J$
3400 CLOSE 1,2
3410 #=3
3420 GOSUB 3460
3430 #=4
3440 GOSUB 3460
3450 GOTO 3490
3460 PUT #: C0,P$(1),P$(2),P$(3),P$(4),P$(5),Y$(7),Y$(8),M$(26),M$(27),M$(28),M$(29),M$(30)
3470 CLOSE #
3480 RETURN
3490 PRINT USING 140 ,"FILED",CPU
3500 PRINT".";
3510 PRINT"WANT LIST";
3520 GOSUB 3920
3530 IF Z9=0 GOTO 3550
3540 GOSUB 5090
3550 PRINT"WANT REPORT";
3560 GOSUB 3920
3570 IF Z9=0 GOTO 10000
3580 PRINT"TYPE";
3590 INPUT T$
3600 IF T$="VAL" GOTO 3760
3610 IF T$="VALX" GOTO 3770
3620 IF T$="PUR" GOTO 3780
3630 IF T$="SEL" GOTO 3790
3640 IF T$="SUM" GOTO 3800
3650 IF T$="SUMX" GOTO 3810
3660 IF T$="TAX" GOTO 3820
3670 IF T$="GAIN" GOTO 3830
3680 IF T$="XS" GOTO 3840
3690 IF T$="VALD" GOTO 3850
3700 IF T$="SIZE" GOTO 3860
3710 REM
3720 REM
3730 REM
3740 PRINT".TYPE (VAL,VALD,VALX,PUR,SEL,SUM,SUMX,TAX,GAIN,SIZE,XS)";
```

```
2750 GOTO 3590
3760 COM 'EXE **VALPOBJ' WITH 'VALTEMPO'
3770 COM 'EXE **VALPIOBJ' WITH 'TEMPO'
3780 COM 'EXE ** VALPOBJ' WITH 'PURTEMPO'
3790 COM 'EXE **VALPOBJ' WITH 'SELTEMPO'
3800 COM 'EXE **SUMPOBJ' WITH 'TEMPO'
3810 COM 'EXE **SUMXPOBJ' WITH 'TEMPO'
3820 COM 'EXE **TAXPOBJ' WITH 'TEMPO'
3830 COM 'EXE **GAINOBJ' WITH 'TEMPO'
3840 COM 'EXE **XSPOBJ' WITH 'TEMPO'
3850 COM 'EXE **VALPDOBJ' WITH 'TEMPO'
3860 COM 'EXE **SIZEOBJ' WITH 'TEMPO'
3870 REM
3880 REM
3890 REM
3900 REM
3910 REM
3920 INPUT A$
3930 IF A$="YES" GOTO 3970
3940 IF A$="NO" GOTO 3990
3950 PRINT"PLEASE ANSWER "YES" OR "NO""
3960 GOTO 3920
3970 Z9=1
3980 RETURN
3990 Z9=0
4000 RETURN
4010 IF STR(Z$,1,1)="=" GOTO 4070
4020 FOR L=1 TO 11 STEP 2
4030 IF Z$<STR(A$(4),L,2) GOTO 4050
4040 NEXT L
4050 L=(L+1)/2
4060 GOTO 4080
4070 L=7
4080 RETURN
4090 FOR K9=1 TO 7
4094 FOR K8=2 TO 10 STEP 2
4096 IF STR(K$,K9,1)<STR(#$,K8,1) GOTO 4102
4098 IF STR(K$,K9,1)>STR(#$,K8,1) GOTO 4106
4100 GOTO 4112
4102 K8=K8-1
4104 GOTO 4112
4106 NEXT K8
4108 PRINT"SYSTEM ERROR.  ONE CHARACTER DOES NOT EQUAL DIGIT.  CONTACT SBC IMMEDIATELY."
```

```
4110 STOP
4112 K2=K2+(K8-1)*10.(7-K9) **
4114 NEXT K9
4116 K1=K2
4118 K2=0
4120 RETURN
4200 IF L.L1 GOTO 4230 ≠
4210 IF R5=0 GOTO 4320
4220 GOTO 4370
4230 OPEN 1,Y$(L),INPUT
4240 R5,F9=0
4250 L1=L
4260 GET N1
4270 IF N1 20 GOTO 4300 >
4280 R2=-19
4290 GOTO 4340
4300 FOR R2=1 TO N1-20 STEP 20
4310 GET,F$(1),F$(2),F$(3),F$(4),F$(5),F$(6),F$(7),F$(8),F$(9),F$(10),F$(11),F$(12),F$(13),F$(14),F$(15),F$(16)
     ,F$(17),F$(18),F(19),F$(20)
4320 IF A$.STR(F$(20),1,11) GOTO 4570 <=
4330 NEXT R2
4340 FOR R2=R2+20 TO N1
4350 R5=F5+1
4360 GET F$(R5)
4370 IF A$=STR(F$(R5),1,11) GOTO 4520
4380 NEXT R2
4390 IF F9=1 GOTO 4650
4400 PRINT
4410 IF L3=1 GOTO 4416
4412 OPEN 3,"**SYMXREF",INPUT
4414 L3=1
4415 GOTO 4418
4416 RESET 3
4418 GET 3:V$
4420 IF V$="END**" GOTO 4440
4422 W$=STR(V$,1,7)
4424 IF W$<A$ GOTO 4418
4426 IF W$>A$ GOTO 4440
4428 W$=STR(V$,12,7)
4430 PRINT
4432 PRINT A$;" ==>.":;W$;
4434 PRINT
4436 U$(R)=W$
```

```
4438 GOTO 4460
4440 PRINT A$;" IS NOT IN FILE"
4442 PRINT"CORRECT SYMBOL (0=FORGET IT)";
4444 INPUT U$(R)
4450 IF U$(R)="0" GOTO 4510
4460 Z$=U$(R)
4470 GOSUB 4010
4480 A$=Z$
4482 IF L1.L GOTO 4490 ≠
4484 RESET 1
4486 GOSUB 4240
4488 GOTO 4500
4490 GOSUB 4200
4500 L1=0
4510 RETURN
4520 F9=1
4530 K$=STR(F$(R5),12,7)
4540 GOSUB 4090
4550 P(R,1)=K1
4560 GOTO 4650
4570 FOR R1=1 TO 20
4580 IF A$=STR(F$(R1),1,11) GOTO 4610
4590 NEXT R1
4600 GOTO 4410
4610 F9=1
4620 K$=STR(F$(R1),12,7)
4630 GOSUB 4090
4640 P(R,1)=K1
4650 F9=0
4660 RETURN
4670 Y5=INT(D5/10000)
4680 M5=INT((D5-Y5*10000)/100)
4690 D5=D5-Y5*10000-M5*100
4700 RETURN
4710 OPEN 1,"**CONTPORT",INPUT
4720 GET X$(1),X$(2),X$(3),X$(4)
4730 MAT GET M
4740 GET D0,B0,N0,A$(1),A$(2),A$(3),A$(4)
4750 FOR R=1 TO 9
4760 GET X$,X$,X$,X$,X$,X$,X$,X$,X$,X$
4770 NEXT R
4780 GET X$,X$,X$,X$,
4790 GET Y$(1),Y$(2),Y$(3),Y$(4),Y$(5),Y$(6)
```

```
4800 GET M$(1),M$(2),M$(3),M$(4),M$(5),M$(6),M$(7),M$(8),M$(9),M$(10),M$(11),M$(12),M$(13),M$(14),M$(15),M$(16)
,M$(17),M$(18),M$(19),M$(20),M$(21),M$(22),M$(23),M$(24),M$(25)
4810 CLOSE 1
4820 OPEN 1,"CATALOG1",INPUT
4830 GET X$(5),X$(6),X$(7),X$(8),A$(5),U(1),U(2),U(3),U(4)
4840 CLOSE 1
4850 OPEN 1,"CONTROL1",INPUT
4860 GET C0,P$(1),P$(2),P$(3),P$(4),P$(5),Y$(7),Y$(8),M$(26),M$(27),M$(28),M$(29),M$(30)
4870 CLOSE 1
4880 RETURN
4890 PRINT USING 4900, P(S,3),P(S,5),P(S,4),D(5)
4900 :AMT= ######## COST= #######.## PRI=###.### DIV/INT=###.###
4910 PRINT
4920 PRINT"CORRECT(AMT,PRI,COST,END)";
4930 INPUT A$
4940 IF A$="AMT" GOTO 5050
4950 IF A$="PRI" GOTO 5020
4690 IF A$"COST" GOTO 4990
4970 IF A$="END" GOTO 5080
4980 GOTO 4920
4990 PRINT"CORRECT COST";
5000 INPUT P(S,5)
5010 GOTO 4920
5020 PRINT"CORRECT PRICE";
5030 INPUT P(S,4)
5040 GOTO 4920
5050 PRINT"CORRECT AMT";
5060 INPUT P(S,3)
5070 GOTO 4920
5080 RETURN
5090 PRINT"TURN TO A NEW PAGE & PRESS RETURN"
5100 P1=0
5110 GOSUB 5760
5120 PRINT"..";
5130 L9=10
5140 PRINT N$,O$;"         (";X$;")     ";N2-N5;"ISSUES"
5150 PRINT USING 5160 ,"#",R8,V5+C2,M5,D5,Y5
5160         :REP # ##  $########## VALUE ##/##/##
5170 PRINT USING 5180,C5+C2,C2
5180         : TOT COST $##########   CASH $##########
5190 PRINT"..";
5200 FOR S=1 TO N2
```

```
5210 Q$="999999999"
5220 FOR R=1 TO N2
5230 IF X(R)=-1 GOTO 5290
5240 IF Q$<S$(R) GOTO 5290
5250 IF Q$>S$(R) GOTO 5270
5260 IF T$(L)<T$(R) GOTO 5290
5270 Q$=S$(R)
5280 L=R
5290 NEXT R
5300 I(S)=L
5310 X(L)=-1
5320 NEXT S
5330 GOSUB 5730
5340 FOR J=1 TO 2
5350 FOR S=1 TO N2
5360 R=I(S)
5370 IF P(R,1)=0 GOTO 5640
5380 IF J>1 GOTO 5410
5390 IF V(R).0 GOTO 5640 ≠
5400 GOTO 5450
5410 IF V(R)=0 GOTO 5640
5420       :########.###  ############################+############################ ###########.##  ###.###..########
5430       :$#########    ############################ ############################ ##########.##  ###.###..########
5440       : ##########   ############################ ############################ ##########.##  ###.###..########
5450 IF P(R,2)>5 GOTO 5480
5460 PRINT USING 5430 ,P(R,3),S$(R),T$(R),P(R,5),P(R,4),U$(R)
5470 GOTO 5520
5480 IF P(R,2).8 GOTO 5510 ≠
5490 PRINT USING 5420 ,P(R,3),S$(R),T$(R),P(R,5),P(R,4),U$(R)
5500 GOTO 5520
5510 PRINT USING 5440 ,P(R,3),S$(R),T$(R),P(R,5),P(R,4),U$(R)
5520 PRINT".";
5530 L9=L9+2
5540 IF L9<=60 GOTO 5640
5550 FOR L=L9 TO 68
5560 PRINT".";
5570 PRINT".";
5580 NEXT L
5590 L9=8
5600 P1=P1+1
```

```
5610 PRINT N$,O$;" -- PAGE";P1+1
5620 PRINT"..";
5630 GOSUB 5730
5840 NEXT S
5650 IF J>1 GOTO 5690
5660 PRINT"..";
5670 L9=L9+2
5680 NEXT J
5690 FOR L=L9 TO 68
5700 PRINT"..";
5710 NEXT L
5720 RETURN
5730 PRINT"        AMOUNT..        SECURITY..        COST    PRICE..SYMBOL"
5740 PRINT"..";
5750 RETURN
5760 PRINT"        ";X$(3);X$(4);X$(3);X$(4);X$(3);X$(4);X$(3);X$(4);X$(3);X$(4);X$(1);X$(1);X$(1);
5770 PRINT X$(1);
5780 PAUSE
5790 RETURN
10000 END
```

PROG....ZZW110..N72EDITP..............

```
1 REM COPYRIGHT 1968,1969,1970,1971 FREDERIC C. TOWERS
2 REM RUN **EDITPORT ==    EXE **EDITPOBJ
50 DIM M$(30),M(30,1),F$(20),A$(5),Y$(8),X$(8),P$(5)
60 DIM X(150),I(150),S$(150),T$(150),U$(150),D(150),E(150),Z(150),Y(150),V(150),W(150),Q(150,6)
70 DEF FNA(X)=INT(X+1/2)
100 OPEN L,"**CONTPORT",INPUT
110 GET X$(1),X$(2),X$(3),X$(4)
120 MAT GET M
130 GET D0,B0,N0,A$(1),A$(2),A$(3),A$(4)
140 FOR R=1 TO 9
150 GET X$,X$,X$,X$,X$,X$,X$,X$,X$
160 NEXT R
170 GET X$,X$,X$,X$
180 GET Y$(1),Y$(2),Y$(3),Y$(4),Y$(5),Y$(6)
190 GET M$(1),M$(2),M$(3),M$(4),M$(5),M$(6),M$(7),M$(8),M$(9),M$(10),M$(11),M$(12),M$(13),M$(14),M$(15),M$(16)
,M$(17),M$(18),M$(19),M$(20),M$(21),M$(22),M$(23),M$(24),M$(25)
200 CLOSE 1
210 OPEN 1,"CATALOG1",INPUT
220 GET X$,X$,X$,A$(5)
230 CLOSE 1
240 OPEN 1,"CONTROL1",INPUT
250 GET C0,P$(1),P$(2),P$(3),P$(4),P$(5),Y$(7),Y$(8),M$(26),M$(27),M$(28),M$(29),M$(30)
260 CLOSE 1
270 D5=D0
280 GOSUB 1820
290 PRINT".PRICES: ";
300 PRINT USING 350 ,M5,D5,Y5;
310 PRINT" & ";
320 D5=B0
330 GOSUB 1820
340 PRINT USING 350 ,M5,D5,Y5
350     :##/##/##
360 PRINT
370 PRINT"FILE";
380 INPUT F$
390 IF F$."TEMPO" GOTO 500 ≠
400 OPEN 1,F$,INPUT
```

```
410 GET X$,N$,O$,R8,D8,D9,N2,T2,C2
420 FOR R=1 TO N2
430 GET Q(R,1),Q(R,2),Q(R,3),Q(R,4),Q(R,5),Q(R,6)
440 NEXT R
450 F$=X$
460 FOR R=1 TO N2
470 GET S$(R),T$(R),U$(R),D(R),E(R),V(R),W(R),Y(R),Z(R)
480 NEXT R
490 GOTO 1310
500 GOSBU 1720
510 OPEN 1,P$(L),INPUT
520 GET N1
530 FOR R1=1 TO N1
540 GET X$,N$,O$,R8,D8,D9,N2,T2,C2
550 FOR R=1 TO N2
560 GET Q(R,1),Q(R,2),Q(R,3),Q(R,4),Q(R,5),Q(R,6)
570 NEXT R
580 IF X$=F$ GOTO 640
590 MAT Q=ZER
600 REM SEC#,CODE,SHS,PRICE,COST,PREVPRI
610 NEXT R1
620 PRINT F$;" NOT IN FILE"
630 GOTO 370
640 U1=-1
650 FOR S=1 TO N2
660 GOSUB 1770
670 IF L=L1 GOTO 730
680 OPEN 1,M$(L),INPUT
690 L1=L
700 GET N1
710 FOR R=1 TO N1
720 GET S$,T$,U$,N3,C3,D3,E3,V3,W3,Y3,Z3
730 IF Q(S,1)< N3 GOTO 920
740 IF Q(S,1)> N3 GOTO 910
741 S$(S)=S$
742 T$(S)=T$
743 U$(S)=U$
744 Q(S,2)=C3
745 D(S)=D3
746 E(S)=E3
747 V(S)=V3
748 W(S)=W3
749 Y(S)=Y3
750 Z(S)=Z3
```

```
751  IF #5=0 GOTO 1220
760  PRINT USING 770, #7,#6,Q(S,3),Q(S,1),U$(S)
770  :XCHG:    ########## (########) ==> ########## (########) ########
780  #5=0
790  FOR #1=1 TO N2
800  IF S=#1 GOTO 820
810  IF #3=Q(#1,1) GOTO 840
820  NEXT #1
830  GOTO 1220
840  Q(S,1)=0
850  Q(#1,3)=Q(#1,3)+Q(S,3)
860  Q(#1,5)=Q(#1,5)+Q(S,5)
870  PRINT"TOTAL ";U$(S);" = ";Q(#1,3)
880  Q(S,3),Y(S),L1=0
890  S$(S),T$(S),U$(S)=""
900  GOTO 1220
910  NEXT R
920  #$="OLDNEW#1"
930  OPEN 4,#$,INPUT
940  GET 4:#0
950  FOR #1=1 TO #0
960  GET 4:#2,#3,#4
970  IF Q(S,1).#2 GOTO 1100 ≠
980  #5=1
990  #6=Q(S,1)
1000 #7=Q(s,3)
1010 Q(S,1)=#3
1020 Q(S,3)=INT(Q(S,3)*#4+.0001)
1030 Q(S,6)=INT(Q(S,6)/#4+.0001)
1040 CLOSE 4
1050 L1=0
1060 GOSUB 1770
1070 OPEN 1,M$(L),INPUT
1080 GOTO 700
1090 GOTO 660
1100 NEXT #1
1110 CLOSE 4
1120 IF #1="**OLDNEW#1" GOTO 1150
1130 #$="**OLDNEW#1"
1140 GOTO 930
1150 PRINT "SEC #";Q(S,1);"NOT IN FILE"
```

```
1160 L1=0
1170 PRINT"CORRECT #(0=DELETE)";
1180 INPUT Q(S,1)
1190 IF Q(S,1).0 GOTO 660 ≠
1200 Q(S,3),Y(S)=0
1210 S$(S),T$(S),U$(S)=""
1220 IF CPU=U1 GOTO 1270
1230 IF S=N2 GOTO 1270
1240 PRINT USING 1250 ,S,CPU
1250      :### ISS   (0:##)
1260 U1=CPU
1270 NEXT S
1280 PRINT USING 1250 ,S,CPU
1290 PRINT
1300 U1=0
1310 D5=D8
1320 GOSUB 1820
1330 M7=M5
1340 D7=D5
1350 Y7=Y5
1360 PRINT N$,O$;"   (";X$;")   ";N2;"ISSUES"
1370 FOR S=1 TO N2
1380 IF Q(S,2)>5 GOTO 1410
1390 A0=100
1400 GOTO 1420
1410 A0=1
1420 V2=Q(S,3)*Q(S,4)/A0
1422 V2=FNA(V2)
1424 V1=V1+V2
1426 C1=FNA(Q(S,5))
1428 C5=C5+C1
1440 NEXT S
1450 PRINT USING 1460,V1+C2,M7,D7,Y7
1460       :$######### VALUE ##/##/##
1470 PRINT USING 1480,C5+C2,C2
1480       :$######### COST   $######## CASH
1485 V1,C5=0
1530 IF D9=0 GOTO 1580
1540 D5=D9
1550 GOSUB 1820
1560 PRINT USING 1570 ,M5,D5,Y5
1570       :PREVIOUSLY VALUED ##/##/##
```

```
1580 FOR S=1 TO N2
1590 Q$="99999999"
1600 FOR R=1 TO N2
1610 IF X(R)=-1 GOTO 1670
1620 IF Q$<S$(R) GOTO 1670
1630 IF Q$>S$(R) GOTO 1650
1640 IF T$(L)<T$(R) GOTO 1670
1650 Q$=S$(R)
1660 L=R
1670 NEXT R
1680 I(S)=L
1690 X(L)=-1
1700 NEXT S
1710 GOTO 1950
1720 FOR L=1 TO 7 STEP 2
1730 IF F$<STR(A$(5),L,2) GOTO 1750
1740 NEXT L
1750 L=(L+1)/2
1760 RETURN
1770 FOR L=2 TO 30
1780 IF Q(S,1)<M(L,1) GOTO 1800
1790 NEXT L
1800 L=L-1
1810 RETURN
1820 Y5=INT(D5/10000)
1830 M5=INT((D5-Y5*10000)/100)
1840 D5=D5-Y5*10000-M5*100
1850 RETURN
1860 INPUT A$
1870 IF A$="YES" GOTO 1910
1880 IF A$="NO" GOTO 1930
1890 PRINT"ANSWER YES OR NO"
1900 GOTO 1860
1910 Z9=1
1920 RETURN
1930 Z9=0
1940 RETURN
1950 PRINT
1960 PRINT"EDIT(NAME,REP,ADDCOST,CASH,SECS,END)";
1970 INPUT E$
```

```
1980 IF E$="NAME" GOTO 2090
1990 IF E$="REP" GOTO 2200
2000 IF E$="ADDCOST" GOTO 2230
2010 IF E$="CASH" GOTO 2060
2020 IF E$="SECS" GOTO 2470
2030 IF E$="TYPE" GOTO 2440
2040 IF E$="END" GOTO 5210
2050 GOTO 1960
2060 PRINT"NEW CASH BALANCE";
2070 INPUT C2
2080 GOTO 1950
2090 PRINT'                              ","                        "
2100 PRINT"NEW NAME";
2110 INPUT N$,O$
2120 PRINT
2130 PRINT"I HAVE..   ";N$,O$;
2140 PRINT
2150 PRINT"OK";
2160 GOSUB 1860
2170 IF Z9=1 GOTO 1950
2180 PRINT"36-LTR MAXIMUM. TRY AGAIN."
2190 GOTO 2090
2200 PRINT"NEW REP #";
2210 INPUT R8
2220 GOTO 1950
2230 IF T2>4 GOTO 2260
2240 PRINT"COSTS ALREADY IN FILE"
2250 GOTO 1950
2260 PRINT
2270 PRINT"SYMBOL           COST"
2280 PRINT
2290 FOR J=1 TO 2
2300 FOR S=1 TO N2
2310 R=I(S)
2320 IF Q(R,1)=0 GOTO 2390
2330 IF J=2 GOTO 2360
2340 IF V(R).0 GOTO 2390 ≠
2350 GOTO 2370
2360 IF V(R)=0 GOTO 2390
2370 PRINT U$(R);
2380 INPUT Q(R,5)
2390 NEXT S
2400 PRINT
```

```
2410 NEXT J
2420 T2=T2-4
2430 GOTO 1950
2440 PRINT"CORRECT TYPE";
2450 INPUT T2
2460 GOTO 1950
2470 PRINT
2480 PRINT"EDIT ONLY";
2490 GOSUB 1860
2500 IF Z9=1 GOTO 4560
2510 PRINT
2520 PRINT"REPRICE(DAY,MO,MAN,NO)";
2530 INPUT R$
2532 D1=D8
2540 IF R$="DAY" GOTO 2700
2550 IF R$="MO" GOTO 2700
2560 IF R$="MAN" GOTO 2590
2570 IF R$="NO" GOTO 3520
2580 GOTO 2520
2590 PRINT"VALUATION DATE (M,D,Y)";
2600 INPUT M,D,Y
2610 IF M<1 GOTO 2670
2620 IF D<1 GOTO 2670
2630 IF M>12 GOTO 2670
2640 IF D>31 GOTO 2670
2650 IF Y>100 GOTO 2680
2660 GOTO 2700
2670 PRINT"EVEN I KNOW A YEAR HAS 12 MONTHS, AND A MONTH 31 DAYS."
2680 PRINT"SAMPLE FORMAT IS:  12,31,69    CORRECT DATE";
2690 GOTO 2600
2700 PRINT"CHANGE OLDEST PRICES";
2710 GOSUB 1860
2720 IF Z9=0 GOTO 2770
2730 D9=D8
2740 FOR R=1 TO N2
2750 Q(R,6)=Q(R,4)
2760 NEXT R
2770 IF R$="DAY" GOTO 2840
2780 IF R$="MO" GOTO 2860
2790 D8=Y*10000+M*100+D
2800 FOR R=1 TO N2
```

```
2810 Q(R,4)=0
2820 NEXT R
2830 GOTO 2930
2840 D8=D0
2850 GOTO 2870
2860 D8=B0
2870 FOR R=1 TO N2
2880 IF R$="MO" GOTO 2910
2890 Q(R,4)=V(R)
2900 GOTO 2920
2910 Q(R,4)=W(R)
2920 NEXT R
2930 FOR J=1 TO N2
2940 FOR S=1 TO N2
2950 R=I(S)
2960 IF Q(R,1)=0 GOTO 2980
2970 IF Q(R,4)=0 GOTO 3010
2980 NEXT S
2990 NEXT J
3000 GOTO 3130
3010 IF Q(R,1)<1000000 GOTO 3030
3020 IF J=1 GOTO 2980
3030 IF J1=1 GOTO 3080
3040 PRINT
3050 PRINT"I NEED PRICE FOR:"
3060 PRINT
3070 J1=1
3080 PRINT U$(R);
3090 INPUT Q(R,4)
3100 IF Q(R,4)>0 GOTO 3120
3110 Q(R,4)=.001
3120 GOTO 2980
3130 IF T2/2.INT(T2/2) GOTO 3160 ≠
3140 IF D9=0 GOTO 3160
3150 T2=T2-1
3160 PRINT
3170 IF D9=0 GOTO 3330
3180 IF Z9=0 GOTO 3330
3190 FOR S=1 TO N2
3200 R=I(S)
3210 IF Y(R)=0 GOTO 3300
3220 IF Y(R)<D1 GOTO 3300
3230 IF Y(R)>D8 GOTO 3300
3240 D5=Y(R)
```

```
3250 GOSUB 1820
3260 Q(R,3)=INT(Q(R,3)*(Z(R)/100+1)+.5)
3270 PRINT USING 3280 ,S$(R),T$(R),Z(R),M5,D5,Y5,Q(R,3)
3280    :ADJUSTED ###############+################ FOR ###.###% STK DIV ON ##/##/##    (SHS= #######.###)
3290 Q(R,6)=INT(Q(R,6)/(Z(R)/100+1)+.5)
3300 IF Z8.0 GOTO 3400 ≠
3310 NEXT S
3320 PRINT"STOCK SPLITS CHECKED"
3330 PRINT
3340 PRINT"ANY UNLISTED SPLITS OR STK DIVS";
3350 GOSUB 1860
3360 IF Z9=0 GOTO 3500
3370 M5,D5,Y5=0
3380 PRINT"SYMBOL,% (FORM: +WMIF,100)";
3390 GOTO 3410
3400 PRINT"SYM,% (0,0=END)";
3410 INPUT A$,Z8
3420 IF A$="0" GOTO 3500
3430 FOR R=1 TO N2
3440 IF U$(R)=A$ GOTO 3480
3450 NEXT R
3460 PRINT"NO SUCH SYMBOL"
3470 GOTO 3400
3480 Z(R)=Z8
3490 GOTO 3260
3500 PRINT"REPRICING COMPLETE"
3510 J8=1
3520 PRINT
3530 PRINT"ANY SALES";
3540 GOSUB 1860
3550 IF Z9=0 GOTO 3790
3560 PRINT
3570 PRINT"AMT,SYMBOL";
3580 INPUT Z8,A$
3590 FOR R=1 TO N2
3600 IF A$=U$(R) GOTO 3640
3610 NEXT R
3620 PRINT"NO SUCH SYMBOL"
3630 GOTO 3570
3640 IF Z8<Q(R,3) GOTO 3710
```

```
3650 IF Z8=Q(R,3) GOTO 3680
3660 PRINT"ONLY";Q(R,3);U$(R)," IN PORTFOLIO"
3670 GOTO 3570
3680 Q(R,3),Q(R,5)=0
3690 PRINT"ANY MORE SALES";
3700 GOTO 3540
3710 IF T2>4 GOTO 3770
3720 PRINT"COST OF SECURITIES SOLD (0=AVG)";
3730 INPUT Z6
3740 IF Z6.0 GOTO 3760 ≠
3750 Z6=Q(R,5)*(Z8/Q(R,3))
3760 Q(R,5)=Q(R,5)-Z6
3770 Q(R,3)=Q(R,3)-Z8
3780 GOTO 3690
3790 PRINT
3800 PRINT"ANY PURCHASES";
3810 GOSUB 1860
3820 IF Z9=0 GOTO 4340
3830 PRINT
3840 PRINT"AMT,SYMBOL";
3850 IF T2>4 GOTO 3890
3860 PRINT",COST";
3870 INPUT Z8,Z$,Z7
3880 GOTO 3900
3890 INPUT Z8,Z$
3900 FOR R=1 TO N2
3910 IF Z$=U$(R) GOTO 4300
3920 NEXT R
3930 N2=N2+1
3940 Q(N2,3)=Z8
3950 Q(N2,5)=Z7
3960 GOSUB 6540
3970 A$,B$=Z$
3980 GOSUB 6730
3990 IF Z$=B$ GOTO 4070
4000 FOR R=1 TO N2-1
4010 IF Z$=U$(R) GOTO 4040
4020 NEXT R
4030 GOTO 4070
```

```
4040 Q(N2,1),Q(N2,3),Q(N2,5)=0
4050 N2=N2-1
4060 GOTO 4300
4070 U$(N2)=Z$
4080 FOR L=2 TO 30
4090 IF Q(N2,1)<M(L,1) GOTO 4110
4100 NEXT L
4110 L=L-1
4120 OPEN 1,M$(L),INPUT
4130 GET N1
4140 FOR R=1 TO N1
4150 GET S$,T$,U$,N3,C3,D3,E3,V3,W3,Y3,Z3
4151 IF N3.Q(N2,1) GOTO 4170 ≠
4152 S$(N2)=S$
4153 T$(N2)=T$
4154 Q(N2,2)=C3
4155 D(N2)=D3
4156 E(N2)=E3
4157 V(N2)=V3
4158 W(N2)=W3
4159 Y(N2)=Y3
4160 Z(N2)=Z3
4161 GOTO 4200
4170 NEXT R
4180 PRINT"POSSIBLE PROGRAM ERROR. SAVE THIS PRINTOUT AND CALL SBC FINANCIAL."
4190 STOP
4200 IF R$="MAN" GOTO 4260
4210 IF R$="MO" GOTO 4240
4220 Q(N2,4)=V(N2)
4230 GOTO 4250
4240 Q(N2,4)=W(N2)
4250 IF Q(N2,4).0 GOTO 4280 ≠
4260 PRINT"PRICE";
4270 INPUT Q(N2,4)
4280 PRINT"ANY MORE PURCHASES";
4290 GOTO 3810
4300 Q(R,3)=Q(R,3)+Z8
4310 IF T2>4 GOTO 4250
4320 Q(R,5)=Q(R,5)+Z7
4330 GOTO 4250
4340 FOR S=1 TO N2
4350 IF Q(S,3)=0 GOTO 4440
```

```
4360 IF Q(S,2)>5 GOTO 4390
4370 A0=100
4380 GOTO 4400
4390 A0=1
4400 V2=Q(S,3)*(Q(S,4)/A0)
4402 V2=FNA(V2)
4404 V1=V1+V2
4406 C1=FNA(Q(S,5))
4408 C5=C5+C1
4410 IF Q(S,3)*(Q(S,4)/A0)-Q(S,5)>0 GOTO 4430
4420 IF ABS(Q(S,3)*(Q(S,4)/A0)-Q(S,5))>ABS(Q(S,5)/2) GOTO 4460
4430 IF D(S)/Q(S,4)>12/100 GOTO 4480
4440 NEXT S
4450 GOTO 4500
4460 PRINT U$(S);" SHOWS A LOSS OF OVER 50%."
4470 GOTO 4430
4480 PRINT U$(S);" SHOWS A YIELD OF";D(S)/Q(S,4)*100;"%."
4490 GOTO 4440
4500 PRINT USING 4510,V1+C2,C5+C2,C2
4510   :$######### VALUE $######### COST   $######### CASH
4520 PRINT
4530 PRINT"ANY EDIT";
4540 GOSUB 1860
4550 IF Z9=0 GOTO 5210
4560 PRINT"SYMBOL";
4570 INPUT Z$
4572 IF Z$,"R" GOTO 4580 ≠
4574 PRINT"NEW CASH BALANCE";
4576 INPUT C2
4578 GOTO 5190
4580 FOR R=1 TO N2
4590 IF Z$=U$(R) GOTO 4630
4600 NEXT R
4610 PRINT Z$;" NOT IN PORTFOLIO"
4620 GOTO 4560
4630 PRINT"EDIT(AMT,COST,PRICE,PREV,END)";
4640 INPUT A$
4650 IF A$="AMT" GOTO 4720
4670 IF A$="COST" GOTO 5030
4680 IF A$="PRICE" GOTO 5060
4690 IF A$="PREV" GOTO 5090
4700 IF A$="END" GOTO 5120
```

```
4710 GOTO 4630
4720 PRINT"NEW AMT";
4730 INPUT Q(R,3)
4740 GOTO 4630
5030 PRINT"NEW COST";
5040 INPUT Q(R,5)
5050 GOTO 4630
5060 PRINT"NEW PRICE";
5070 INPUT Q(R,4)
5080 GOTO 4630
5090 PRINT"NEW PREV PRICE";
5100 INPUT Q(R,6)
5110 GOTO 4630
5120 PRINT
5130 PRINT"    AMOUNT    SYMBOL          COST       PRICE    PREVPRI"
5140 PRINT USING 5150 , Q(R,3),U$(R),Q(R,5),Q(R,4),Q(R,6)
5150      :########.###  ################  #######.##  ###.###  ###.###
5160 PRINT"OK";
5170 GOSUB 1860
5180 IF Z9=0 GOTO 4630
5190 PRINT"ANY MORE EDIT";
5200 GOTO 4540
5210 PRINT
5220 FOR R=1 TO N2
5230 X(R)=0
5240 IF Q(R,3).0 GOTO 5260 ≠
5250 N5=N5+1
5260 NEXT R
5270 IF N5<N2 GOTO 5300
5280 PRINT"NO PORTFOLIO LEFT"
5290 GOTO 10000
5300 OPEN 2,"TEMPO",OUTPUT
5310 PUT X$,N$,O$,R8,D8,D9,N2-N5,T2,C2
5320 FOR S=1 TO N2
5330 Q=999999999
5340 FOR R=1 TO N2
5350 IF X(R)=-1 GOTO 5390
```

```
5360 IF Q<Q(R,1) GOTO 5390
5370 Q=Q(R,1)
5380 L=R
5390 NEXT R
5400 I(S)=L
5410 X(L)=-1
5420 NEXT S
5430 FOR S=1 TO N2
5440 R=I(S)
5450 IF Q(R,3)=0 GOTO 5470
5460 PUT Q(R,1),Q(R,2),Q(R,3),Q(R,4),Q(R,5),Q(R,6)
5470 NEXT S
5480 FOR S=1 TO N2
5490 R=I(S)
5500 IF Q(R,3)=0 GOTO 5520
5510 PUT S$(R),T$(R),U$(R),D(R),E(R),V(R),W(R),Y(R),Z(R)
5520 NEXT S
5530 CLOSE 2
5540 PRINT X$;' FILED IN "TEMPO"'
5550 PRINT"UPDATE MASTER PORTFOLIO FILE";
5560 GOSUB 1860
5570 IF Z9=0 GOTO 6050
5580 F$=X$
5590 GOSUB 1720
5600 OPEN 1,P$(L),INPUT
5610 P0=L
5620 OPEN 2,P$(5),OUTPUT
5630 GET N1
5640 PUT N1
5650 FOR R1=1 TO N1
5660 GET F$,G$,H$,R7,D6,D7,N3,T3,C3
5670 IF N9=1 GOTO 5700
5680 IF F$=X$ GOTO 5830
5690 IF F$>X$ GOTO 5770
5700 PUT F$,G$,H$,R7,D6,D7,N3,T3,C3
5705 X1=X1+1
5710 FOR R2=1 TO N3
5720 GET P1,P2,P3,P4,P5,P6
5730 PUT P1,P2,P3,P4,P5,P6
5740 NEXT R2
```

```
5750 NEXT R1
5760 IF N9=1 GOTO 5990
5770 IF N8=1 GOTO 5830
5780 N8=1
5790 RESET 1,2
5795 X1=0
5800 GET N1
5810 PUT N1+1
5820 GOTO 5650
5830 PUT X$,N$,O$,R8,D8,D9,N2-N5,T2,C2
5840 FOR S=1 TO N2
5850 R=I(S)
5860 IF Q(R,3)=0 GOTO 5880
5870 PUT Q(R,1),Q(R,2),Q(R,3),Q(R,4),Q(R,5),Q(R,6)
5880 NEXT S
5890 N9=1
5900 IF N8.1 GOTO 5950 ≠
5910 N8=0
5920 IF N1=0 GOTO 5990
5930 IF X1=N1 GOTO 5990
5940 GOTO 5700
5950 FOR R=1 TO N3
5960 GET X,X,X,X,X,X
5970 NEXT R
5980 GOTO 5750
5990 J$=P$(5)
6000 P$(5)=P$(P0)
6010 P$(P0)=J$
6020 CLOSE 2
6030 GOSUB 6460
6040 PRINT X$;" UPDATED IN MASTER FILE"
6050 PRINT
6060 PRINT"WANT LIST";
6070 GOSUB 1860
6080 IF Z9=0 GOTO 6100
6090 COM 'EXE **LISTOBJ';
6100 PRINT"WANT REPORT";
6110 GOSUB 1860
6120 IF Z9=0 GOTO 10000
6130 PRINT"TYPE";
6140 INPUT T$
6150 IF T$="VAL" GOTO 6310
```

```
6160 IF T$="VALX" GOTO 6320
6170 IF T$="PUR" GOTO 6330
6180 IF Y$="SEL" GOTO 6340
6190 IF T$="SUM" GOTO 6350
6200 IF T$="SUMX" GOTO 6360
6210 IF T$="TAX" GOTO 6370
6220 IF T$="GAIN" GOTO 6380
6230 IF T$="XS" GOTO 6390
6240 IF T$="VALD" GOTO 6400
6250 IF T$="SIZE" GOTO 6410
6260 REM
6270 REM
6280 REM
6290 PRINT".TYPE (VAL,VALD,VALX,PUR,SEL,SUM,SUMX,TAX,GAIN,SIZE,XS)";
6300 GOTO 6140
6310 COM 'EXE **VALPOBJ' WITH 'VALTEMPO'
6320 COM 'EXE **VALPLOBJ' WITH 'TEMPO'
6330 COM 'EXE **VALPOBJ' WITH 'PURTEMPO'
6340 COM 'EXE **VALPOBJ' WITH 'SELTEMPO'
6350 COM 'EXE **SUMPOBJ' WITH 'TEMPO'
6360 COM 'EXE ** SUMPLOBJ' WITH 'TEMPO'
6370 COM 'EXE **TAXPOBJ' WITH 'TEMPO'
6380 COM 'EXE **GAINOBJ' WITH 'TEMPO'
6390 COM 'EXE **XSPOBJ' WITH 'TEMPO'
6400 COM 'EXE **VALPDOBJ' WITH 'TEMPO'
6410 COM 'EXE **SIZEOBJ' WITH 'TEMPO'
6420 REM
6430 REM
6440 REM
6450 REM
6460 OPEN 2,"CONTROL1",OUTPUT
6470 GOSUB 6510
6480 OPEN 2,"CONTROL2",OUTPUT
6490 GOSUB 6510
6500 RETURN
6510 PUT C0,P$(1),P$(2),P$(3),P$(4),P$(5),Y$(7),Y$(8),M$(26),M$(27),M$(28),M$(29),M$(30)
6520 CLOSE 2
6530 RETURN
6540 IF STR(Z$,1,1)="=" GOTO 6600
6550 FOR L=1 TO 11 STEP 2
6560 IF Z$<STR(A$(4),L,2) GOTO 6580
6570 NEXT L
```

```
6580 L=(L+1)/2
6590 GOTO 6610
6600 L=7
6610 RETURN
6620 FOR K9=1 TO 7
6630 FOR K8=1 TO 10
6640 IF STR(K$,K9,1)=STR(A$(3),K8,1) GOTO 6680
6650 NEXT K8
6660 PRINT"ERROR; ONE CHARACTER DOES NOT EQUAL DIGIT; SEE FRED TOWERS"
6670 STOP
6680 K2=K2+(K8-1)*10.(7-K9)**
6690 NEXT K9
6700 K1=K2
6710 K2=0
6720 RETURN
6730 OPEN 1,Y$(L),INPUT
6740 R5,F9=0
6750 GET N1
6760 IF N1> 20 GOTO 6790
6770 R2=-19
6780 GOTO 6830
6790 FOR R2=1 TO N1-20 STEP 20
6800 GET F$(1),F$(2),F$(3),F$(4),F$(5),F$(6),F$(7),F$(8),F$(9),F$(9),F$(10),F$(11),F$(12),F$(13),F$(14),F$(15),F$(16),F$(17),F$(18),F$(19),F$(20)
6810 IF A$.STR(F$(20),1,11) GOTO 7010 ⦤
6820 NEXT R2
6830 FOR R2=R2+20 TO N1
6840 R5=R5+1
6850 GET F$(R5)
```

```
6860 IF A$=STR(F$(R5),1,11) GOTO 6980
6870 NEXT R2
6880 PRINT
6890 PRINT A$:" IS NOT IN FILE"
6900 L1,R5=0
6910 PRINT"CORRECT SYMBOL";
6920 INPUT Z$
6930 GOSUB 6540
6940 A$=Z$
6950 GOSUB 6730
6960 L1=0
6970 RETURN
6980 K$=STR(F$(R5),12,7)
6990 GOSUB 6620
7000 GOTO 7070
7010 FOR R1=1 to 20
7020 IF A$=STR(F$(R1),1,11) GOTO 7050
7030 NEXT R1
7040 GOTO 6890
7050 K$=STR(F$(R1),12,7)
7060 GOSUB 6620
7070 Q(N2,1)=K1
7080 U$(N2)=Z$
7090 RETURN
10000 END
```

```
PROG....ZZW110..N72VAL..............

1 REM COPYRIGHT 1968,1969,1970,1971 FREDERIC C. TOWERS
2 REM RUN **VALPORT ==> EXE ** VALPOBJ
3 REM THIS PROGRAM PRODUCES THE VAL.... OPTION
50 DIM M$(30),M(30,1),A$(5),D$(12),E$(32),I$(25),J$(25),Y$(8),P$(5),X$(8),J(100,6)
60 DIM X(150),I(150),S$(150),T$(150),D(150),E(150),V(24),W(24),Y(24),O(24),P(150,6)
70 DEF ·FNA(X)=INT(X+1/2)
80 DEF FNB(X)=INT(X**100+1/2)/100
100 OPEN 1,"**CONTPORT",NPUT
110 GET X$(1),X$(2),X$(3),X$(4)
120 MAT GET M
130 GET D0,B0,N0,A$(1),A$(2),A$(3),A$(4)
140 GET D$(1),D$(2),D$(3),D$(4),D$(5),D$(6),D$(7),D$(8),D$(9),D$(10),D$(11),D$(12)
150 GET E$(1),E$(2),E$(3),E$(4),E$(5),E$(6),E$(7),E$(8),E$(9),E$(10),E$(11),E$(12),E$(13),E$(14),E$(15),E$(16)
160 GET E$(17),E$(18),E$(19),E$(20),E$(21),E$(22),E$(23),E$(24),E$(25),E$(26),E$(27),E$(28),E$(29),E$(30),E$(31),E$(32)
170 GET I$(1),I$(2),I$(3),I$(4),I$(5),I$(6),I$(7),I$(8),I$(9),I$(10),
J$(10),I$(11),J$(11),I$(12),J$(12),I$(13),J$(13)
180 GET I$(14),J$(14),I$(15),J$(15),I$(16),J$(16),I$(17),J$(17),I$(18),J$(18),I$(19),J$(19),I$(20),J$(20),I$(21),J$(21),
I$(22),J$(22),I$(23),J$(23),I$(24),J$(24),I$(25),J$(25)
190 GET Y$((1),Y$(2),Y$(3),Y$(4),Y$(5),Y$(6)
200 GET M$(1),M$(2),M$(3),M$(4),M$(5),M$(6),M$(7),M$(8),M$(9),M$(10),M$(11),M$(12),M$(13),M$(14),M$(15),M$(16),M$(17),
M$(18),M$(19),M$(20),M$(21),M$(22),M$(23),M$(24),M$(25)
210 CLOSE 1
220 OPEN 1,"CATALOG1",INPUT
230 GET X$(5),X$(6),X$(7),X$(8),A$(5),U(1),U(2),U(3),U(40
240 CLOSE 1
250 OPEN 1,"CONTROL1",INPUT
260 GET C0,P$(1),P$(2),P$(3),P$(4),P$(5),Y$(7),Y$(8),M$(26),M$(27),M$(28),M$(29),M$(30)
270 CLOSE 1
271 PICK L$
272 IF STR(L$,4)="?" GOTO 280
273 F$="TEMPO"
274 GOTO 340
280 REM
290   :######### (0:##)
300 PRINT" ";
310 PRINT"FILE";
320 INPUT F$
330 IF F$."TEMPO" GOTO 420 ≠
340 OPEN 1,F$,INPUT
```

```
350 GET X$,N$,O$,R8,D8,D9,N2,T2,C2
360 MAT GET P(N2,6)
370 F$=X$
380 FOR R=1 TO N2
390 GET S$(R),T$(R),U$,D(R),E(R),P6,W6,Y6,Z6
400 NEXT R
410 GOTO 970
420 GOSUB 4980
430 OPEN 1,P$(L),INPUT
440 GET N1
450 FOR R=1 TO N1
460 GET X$,N$,O$,R8,D8,D9,N2,T2,C2
470 REM T2=PORTFOLIO TYPE: 1-CPE,2-CE,3-CP,4-C,5-PE,6-E,7-P,8-NONE
480 MAT GET P(N2,6)
490 REM SEC#,CODE,SHS,PRICE,COST,PREVPRI
500 IF X$=F$ GOTO 540
510 NEXT R
520 PRINT F$;" IS NOT IN THE FILES."
530 GOTO 310
540 PRINT USING 290, "FOUND",CPU
550 U1=-1
560 FOR S=1 TO N2
570 GOSUB 5030
580 IF L=L1 GOTO 640
590 OPEN 1,M$(L),INPUT
600 L1=L
610 GET N1
620 FOR R=1 TO N1
630 GET S$(S),T$(S),U$,N3,C6,O(S),E(S),P6,W6,Y6,Z6
640 IF P(S,1)<N3 GOTO 680
650 IF P(S,1)>N3 GOTO 670
660 GOTO 880
670 NEXT R
680 #$="OLDNEW#1"
690 OPEN 4,#$,INPUT
700 GET 4:#0
710 FOR #1=1 TO #0
720 GET 4:#2,#3,#4
730 IF P(S,1).#2 GOTO 800 ≠
740 P(S,1)=#3
750 P(S,3)=INT(P(S,3)*#4+.0001)
760 P(S,6)=INT(P(S,6)/#4+.0001)
770 CLOSE 4
```

```
780 L1=0
790 GOTO 570
800 NEXT #1
810 CLOSE 4
820 IF #$="**OLDNEW#1" GOTO 850
830 #$="**OLDNEW#1"
840 GOTO 690
850 PRINT"SEC #";P(S,1);"NOT IN FILE"
860 E0=1
870 L1=0
880 IF P(S,2) < 1 GOTO 884
881 IF P(S,2) > 24 GOTO 884
882 IF CPU=U1 GOTO 930
883 GOTO 890
884 PRINT U$;" SHOWS AN INVALID INDUSTRY CODE OF";P(S,2);"."
885 IF P(S,1) < 1000000 GOTO 887
886 PRINT"PLEASE NOTIFY SBC OF THIS ERROR.."
887 PRINT"CORRECT CODE";
888 INPUT P(S,2)
889 GOTO 880
890 IF S=N2 GOTO 930
900 PRINT USING 910 ,S,CPU
910       :### ISS    (0:##)
920 U1=CPU
930 NEXT S
940 PRINT USING 910 ,S,CPU
950 U1=0
960 IF E0=1 GOTO 10000
970 D5=D8
980 GOSUB 4730
990 M7=M5
1000 D7=D5
1010 Y7=Y5
1015 IF STR(L$,4)."?" GOTO 1040 ≠
1020 PRINT".";       (";X$;")     ";N2;"ISSUES"
1030 PRINT N$,O$;
1040 FOR S=1 TO N2
1050 IF E(S) < 100 GOTO 1080
1060 E(S)=.000001
1070 GOTO 1090
1080 IF E(S).0 GOTO 1060 ≠
1090 IF P(S,2) > 5 GOTO 1120
1100 A0=100
1110 GOTO 1130
```

```
1120 A0=1
1130 V1=P(S,3)*P(S,4)/A0
1135 V1=FNA(V1)
1140 I1=P(S,3)*D(S)/A0
1145 I1=FNB(I1)
1150 IF P(S,5).0 GOTO 1170 ≠
1160 Z=1
1170 IF P(S,4).0 GOTO 1190 ≠
1180 P(S,4)=.000001
1190 O=P(S,2)
1200 V=V+V1
1210 V(Q)=V(Q)+V1
1220 I=I+I1
1230 O(Q)=O(Q)+I1
1235 P(S,5)=FNA(P(S,5))
1240 B=B+P(S,5)
1250 W(Q)=W(Q)+P(S,5)
1260 NEXT S
1270 V=V+C2
1280 B=B+C2
1285 IF STR(L$,4)."?" GOTO 1340 ≠
1290 PRINT USING 1300 ,V,M7,D7,Y7
1300        :$########## VALUE ##/##/##
1310 PRINT USING 1320 ,B,C2
1320        :$########## COST    $########CASH
1340 FOR S=1 TO N2
1350 Q$="99999999"
1360 FOR R=1 TO N2
1370 IF X(R)=-1 GOTO 1430
1380 IF Q$<S$(R) GOTO 1430
1390 IF Q$>S$(R) GOTO 1410
1400 IF T$(L)<T$(R) GOTO 1430
1410 Q$=S$(R)
1420 L=R
1430 NEXT R
1440 I(S)=L
1450 X(L)=-1
1460 NEXT S
1480 PRINT".";
1490 P=1
1500 FOR R=1 TO N2
1510 X(R)=0
1520 NEXT R
```

```
1530 V1=0
1532 IF STR(L$,1,3)="" GOTO 1540
1534 A$=STR(L$,1,3)
1536 GOTO 1560
1540 PRINT"TYPE    (VAL,PUR,SEL)";
1550 INPUT A$
1560 IF A$="VAL" GOTO 1620
1570 IF A$="PUR" GOTO 1600
1580 IF A$="SEL" GOTO 1620
1590 GOTO 1540
1600 T2=9
1610 GOTO 1710
1620 GOTO 1640,1710,1640,1710,1640,1710,1640,1710 ON T2
1630 GOTO 1710
1640 IF D9=0 GOTO 1960
1650 IF A$=:SEL" GOTO 1690
1660 PRINT"SHOW PREV PRICES";
1670 GOSUB 4850
1680 IF Z9=1 GOTO 1710
1690 T2=T2+1
1700 GOTO 1710
1710 IF L$="?" GOTO 1716
1712 P0=1
1714 GOTO 1730
1716 PRINT"STARTING PAGE";
1720 INPUT P0
1730 IF STR(X$(6),1,1)."?" GOTO 1820 ≠
1740 PRINT"PRINT (CON,NCON)";
1750 INPUT P$
1760 IF P$="CON" GOTO 1790
1770 IF P$="NCON" GOTO 1810
1780 GOTO 1740
1790 STR(X$(6),1,1)="C"
1800 GOTO 1820
1810 STR(X$(6),1,1)=""
1820 IF STR(X$(6),2,1)."?" GOTO 1910 ≠
1830 PRINT"PAPER (8,11)";
1840 INPUT P$
1850 IF P$="8" GOTO 1880
1860 IF P$="11" GOTO 1900
1870 GOTO 1830
1880 STR(X$(6),2,1)="S"
1890 GOTO 1910
```

```
1900 STR(X$(6),2,1)=""
1910 IF STR(X$(6),1,1,)="C" GOTO 1940
1920 PRINT".INSERT REPORT SHEET & PRESS RETURN"
1930 GOTO 1950
1940 PRINT".TURN TO NEW PAGE & PRESS RETURN"
1950 GOSUB 4940
1960 L9=14
1970 IF STR(X$(6),2,!)="" GOTO 1990
1980 L8=15
1990 IF P<P0 GOTO 2220
2000 PRINT"........  VALPORT."
2010 IF A$="PUR" GOTO 2070
2020 IF A$="SEL" GOTO 2050
2030 PRINT"......    PORTFOLIO VALUATION ................"
2040 GOTO 2080
2050 PRINT"......    SELL RECOMMENDATION ............"
2060 GOTO 2080
2070 PRINT"......    PURCHASE RECOMMENDATION ........"
2080 PRINT".";
2090 PRINT"....FOR:  ";
2100 PRINT N$,O$;
2110 PRINT
2120 PRINT".";
2130 PRINT".....AS OF:   ";
2140 PRINT M$;D5;
2150 IF D5>9 GOTO 2180
2160 PRINT".....";
2170 GOTO 2190
2180 PRINT"...,";
2190 PRINT 1900+Y5
2200 PRINT"..";
2210 GOSUB 4030
2220 IF C2=0 GOTO 2270
2230 IF P<P0 GOTO 2260
2240 PRINT",";
2250 PRINT USING 2490 ,C2,C2/V*100
2360 L9=L9+2
2270 FOR S=1 TO 24
2280 FOR K9=1 TO N2
2290 R=I(K9)
```

```
2300 IF INT(P(R,2).S GOTO 2390 ≠
2310 IF C1.0 GOTO 2690 ≠
2320 IF L9< 48-L8 GOTO 2340
2330 GOSUB 3100
2340 IF P9< P0 GOTO 2360
2350 PRINT"..";
2360 L9=L9+2
2370 IF S<9 GOTO 2450
2380 GOTO 2540
2390 NEXT K9
2400 IF C1.1 GOTO 2420 ≤
2410 GOTO 2870
2420 C1=0
2430 NEXT S
2400 GOTO 3360
2450 IF P<P0 GOTO 2520
2460 PRINT USING 2470 ,I$(S),J$(S),V(S)/V*100
2470          ################+##############    (###.#%)..............
2480          ################+##############          (CONT'D)......
2490          ################  $##########.##       (###.#%)........
2500          ...COMMON STOCKS               (###.#%)...........
2510 PRINT".";
2520 L9=L9+2
2530 GOTO 2690
2540 IF C3=1 GOTO 2450
2550 V1=V(9)+V(10)+V(11)+V(12)+V(13)+V(14)+V(15)+V(16)+V(17)+V(18)+V(19)+V(20)+V(21)+V(22)+V(23)+V(24)
2560 IF L9<47-L8 GOTO 2610
2570 GOSUB 3100
2580 IF P<P0 GOTO 2600
2590 PRINT".";
2600 L9=L9+1
2610 IF P<P0 GOTO 2640
2620 PRINT".";
2630 PRINT USING 2500 ,V1/V*100
2640 C3=1
2650 L9=L9+4
2660 IF P<P0 GOTO 2680
2670 PRINT".";
2680 GOTO 2450
2690 C1=C1+1
2700 IF C1=1 GOTO 2810
2710 IF L9<56-L8 GOTO 2810
2720 GOSUB 3100
2730 IF L9>14 GOTO 2780
2740 IF P<P0 GOTO 2770
```

```
2750 PRINT".."; 
2760 PRINT USING 2480 ,I$(S),J$(S)
2770 L9=L9+3
2780 IF P<P0 GOTO 2800
2790 PRINT".";
2800 L9=L9+1
2810 G=INT(P(R,2))
2820 X(G)=X(G)+1
2830 IF P<P0 GOTO 2850
2840 GOSUB 4170
2850 L9=L9+1
2860 GOTO 2390
2870 IF P<P0 GOTO 3080
2880 IF S.9 GOTO 2910≙
2890 $$="          TOTAL"
2900 GOTO 2920
2910 $$="        SUBTOTAL"
2920 GOTO 2970,3030,2970,3030,2970,3030,2970,3030,2930,3030 ON T2
2930 GOSUB 5150
2940 PRINT".";
2950 PRINT USING 4560 ,$$,V(S),O(S),O(S)/V(S)*100
2960 GOTO 3080
2970 GOSUB 5190
2980 PRINT".";
2990 IF Z.1 GOTO 3010 ≠
3000 W(S) = 0
3010 PRINT USING 4490,$$,W(S),V(S),O(S),O(S)/V(S)*100
3020 GOTO 3080
3030 GOSUB 5230
3040 PRINT".";
3050 IF Z.1 GOTO 3070 ≠
3060 W(S)=0
3070 PRINT USING 4520 ,$$,W(S),V(S),O(S),O(S)/V(S)*100
3080 L9=L9+3
3090 GOTO 2420
3100 IF P<P0 GOTO 3200
3110 FOR L=L9 TO 59-L8
3120 PRINT".";
3130 NEXT L
3140 PRINT"......      CONTINUED ON PAGE";P+1
3150 IF STR (X$(6),1,1)="C" GOTO 3190
3160 PRINT"......";
3170 GOSUB 4940
3180 GOTO 3200
3190 PRINT"......";
```

```
3200 P=P+1
3210 IF P<P0 GOTO 3340
3220 PRINT"..",
3230 PRINT" ";N$,O$;
3240 PRINT
3250 PRINT" ";M$;D5;
3260 IF D5>9 GOTO 3290
3270 PRINT".....";
3280 GOTO 3300
3290 PRINT"....";
3300 PRINT 1900+Y5
3310 PRINT" PAGE";P
3320 PRINT"..";
3330 GOSUB 4030
3340 L9=11
3350 RETURN
3360 I1=O(9)+O(10)+O(11)+O(12)+O(13)+O(14)+O(15)+O(16)+O(17)+O(18)+O(19)+O(20)+O(21)+O(22)+O(23)+O(24)
3370 B1=W(9)+W(10)+W(11)+W(12)+W(13)+W(14)+W(15)+W(16)+W(17)+W(18)+W(19)+W(20)+W(21)+W(22)+W(23)+W(24)
3380 IF P<P0 GOTO 3400
3390 GOSUB 5190,5230,5190,5230,5190,5230,5190,5230,5190,5230,5150,5230 ON T2
3400 L9=L9+1
3410 IF L9 50-L8 GOTO 3500
3420 IF D9=0 GOTO 3450
3430 IF V1=0 GOTO 3470
3440 GOTO 3490
3450 IF V1=0 GOTO 3500
3460 GOTO 3480
3470 IF D9=0 GOTO 3500
3480 IF L9<55-L8 GOTO 3500
3490 GOSUB 3100
3500 IF V1=0 GOTO 3610
3510 PRINT"..";
3520 IF Z.1 GOTO 3540 ≠
3530 B1=0
3540 GOTO 3550,3580,3550,3580,3550,3580,3550,3580,4780,3580 ON T2
3550 PRINT USING 4490 ,"TOTAL COMMON STOCKS",B1,V1,I1,I1/V1*100
3960 GOSUB 5190
3570 GOTO 3600
3580 PRINT USING 4520 ,"TOTAL COMMON STOCKS",B1,V1,I1,I1/V1*100
3590 GOSUB 5230
3600 L9=L9+3
3610 PRINT"..";
3620 IF Z.1 GOTO 3640 ≠
3630 B=0
```

```
3640 GOTO 3650,3680,3650,3680,3650,3680,3650,3680,4810,3680 ON T2
3650 PRINT USING 4490 ,"           GRAND TOTALS",B,V,I,I/V*100
3660 GOSUB 5210
3670 GOTO 3700
3680 PRINT USING 4520,B,V,I,I/V*100
3690 GOSUB 5250
3700 PRINT"..";
3710 L9=L9+5
3720 GOTO 3730,3830,3730,3830,3730,3830,3730,3830,3830,3830 ON T2
3730 PRINT"   * PREVIOUS PRICES AS OF ";
3740 D5=D9
3750 GOSUB 4730
3760 PRINT M$;D5;
3770 IF D5>9 GOTO 3800
3780 PRINT".....";
3790 GOTO 3810
3800 PRINT"....";
3810 PRINT 1900+Y5
3820 L9=L9+1
3830 IF V(8)=0 GOTO 3870
3840 PRINT"..";
3850 PRINT"     MUTUAL FUND INCOME AMOUNTS DO NOT INCLUDE CAPITAL GAIN DISTRIBUTIONS."
3860 L9=L9+1
3870 FOR L=L9 TO 68=L8
3880 PRINT"..";
3890 NEXT L
3900 GOSUB 4940
3910 OPEN 1,"METERA",INPUT
3920 GET $1,$2,$3,$4,$5,$6,$7,$8,$9,$0
3930 MAT GET J($0,6)
3940 CLOSE 1
3950 J(R8,2)=J(R8,2)+1000
3960 J(R8,3)=J(R8,3)+N2*1000+P
3970 J(R8,4)=J(R8,4)+V
3980 OPEN 2,"METERA",OUTPUT
3990 PUT $1,$2,$3,$4,$5,$6,$7,$8,$9,$0
4000 MAT PUT J
4010 CLOSE 2
4020 GOTO 10000
4030 GOTO 4040,4070,4040,4070,4040,4070,4040,4070,4100,4070 ON T2
4040 PRINT"......  ORIGINAL   PREVIOUS    CURRENT    CURRENT     ANNUAL    CURRENT    P/E"
```

```
4050 PRINT" AMOUNT........  SECURITY.........             ......COST      ......PRICE*
                 .....PRICE        ......VALUE                            ......RATIO"
4060 GOTO 4150
4070 PRINT".....  ORIGINAL   CURRENT. ANNUAL   CURRENT   P/E"
4080 PRINT" AMOUNT......  SECURITY......   "                              ......PRICE
ALUB.  ......INCOME.  YIELD........   RATIO.....
4090 GOTO 4150
4100 PRINT"....  CURRENT   APPROXIMATE   INDICATED  ANNUAL   CURRENT   P/E"
4110 PRINT" AMOUNT......   SECURITY......                                 ......COST
....  DIV/INT       INCOME......   YIELD......   RATIO......   "
4120 GOTO 4150
4130 PRINT".....  ORIGINAL   CURRENT  CURRENT. ANNUAL   CURRENT"          ......PRICE
4140 PRINT" AMOUNT......   SECURITY......   "                             ......COST
ALUE.  INCOME......   YIELD........      "                                ...V
4150 PRINT".";
4160 RETURN
4170 U1=P(R,3)
4180 U2=P(R,5)
4185 U2=FNA(U2)
4190 U3=P(R,6)
4200 K2=U3
4210 GOSUB 5080
4220 J=K
4230 J$=K$
4240 U4=P(R,4)
4250 K2=U4
4260 GOSUB 5080
4270 IF INT(P(R,2))>5 GOTO 4300
4280 A0=100
4290 GOTO 4310
4300 A0=1
4310 U5=U1*U4/A0
4320 U6=U1*D(R)/A0
4300 U7=U6/U5*100
4332 U5=FNA(U5)
4334 U6=FNB(U6)
4340 U8=U4/E(R)
4350 IF INT(P(R,2))>5 GOTO 4380
4360 $$="$"
4370 GOTO 4390
4380 $$=" "
4390 IF C1=1 GOTO 4430
4400 IF L9<16 GOTO 4430
4410 #$,@$=" "
```

```
4420 GOTO 4450
4430 #$="$"
4440 @$="%"
4450 IF INT(P(R,2))=8 GOTO 4660
4460 GOTO 4570,4590,4570,4590,4570,4590,4570,4590,4610,4590 ON T2
4465 REM     MARKS (_) INDICATE BACKSPACES
4470    :    ###########################+#############################   #.  ########   #.  ########    ###.##   ##.#%  ##.#+#
                                                                                                                          ##.#
4480    :    ###########################+#############################   #.  ########                                     ##.#
4490    :....########################## $#########       ###########    #.  ########                                     ##.#
4495 REM     MARKS ( ) INDICATE BACKSPACES
4500    : #. ########   ########################+##########              #.  ########   $##########.##       ##.'        ##.#+#
                                                                                                                          ##.#
4510    : #######.###   ###########################+##########         $##########       $##########         ##.#+#       ##.#
4520    :....########################### $#########       ###########. ##    $##########.##       ##.#%     ##.#+#       ##.#
4525 REM     MARKS ( ) INDICATE BACKSPACES
4530    : #. ########    ###########################+##########       ###.####+.##     #.  ##########.##   ##.#+#         ##.#
4540    : #######.###    ###########################+##########       ###  ###.##    #.  ##########.##    ##.#+#          ##.#
4550    :....########################### $##########.##      ##.#%                                                        ##.#
4560                                                         $##########.##
4570 PRINT USING 4470 ,$$,U1,S$(R),T$(R),#$,U2,J,J$,K,K$,#$,U5,#$,U6,U7,@$,U8
4580 RETURN
4590 PRINT USING 4500 ,$$,U1,S$(R),T$(R),#$,U2,K,K$,#$,U5,#$,U6,U7,@$,U8
4600 RETURN
4610 IF INT(P(R,2))>5 GOTO 4640
4620 PRINT USING 4530 ,$$,U1,S$(R),T$(R),K,K$,#$,U5,D(R),@$,#$,U6,U7,@$,U8
4630 RETURN
4640 PRINT USING 4540 ,$$,U1,S$(R),T$(R),K,K$,#$,U5,#$,D(R),#$,U6,U7,@$,U8
4650 RETURN
4660 GOTO 4670,4690,4670,4690,4670,4690,4670,4690,4710,4690 ON T2
4670 PRINT USING 4480 ,U1,S$(R),T$(R),#$,U2,U3,U4,#$,U5,#$,U6,U7,@$,U8
4680 RETURN
4690 PRINT USING 4510 ,U1,S$(R),T$(R),#$,U2,U4,#$,U4,#$,U6,U7,@$,U8
4700 RETURN
4710 PRINT USING 4550 ,U1,S$(R),T$(R),U4,#$,U5,#$,D(R),#$,U6,U7,@$,U8
4720 RETURN
4730 Y5=INT(D5/10000)
4740 M5=INT((D5-(Y5*10000))/100)
4750 D5=D5-((Y5*10000)+(M5*100))
4760 M$=D$(M5)
4770 RETURN
```

```
4780 PRINT USING 4560 ,"TOTAL COMMON STOCKS",V1,I1,I1/V1*100
4790 GOSUB 5150
4800 PRINT"..";
4810 PRINT USING 4560 ,"       GRAND TOTALS",V,I,I/V*100
4820 GOSUB 5170
4830 PRINT"..";
4840 GOTO 3870
4850 INPUT Q$
4860 IF Q$="YES"GOTO 4900
4870 IF Q$="NO" GOTO 4920
4800 PRINT'PLEASE ANSWER "YES" OR "NO"'
4890 GOTO 4850
4900 Z9=1
4910 RETURN
4920 Z9=0
4930 RETURN
4940 PRINT"      ";X$(3);X$(4);X$(3);X$(4);X$(3);X$(4);X$(1);X$(1);
4950 PRINT X$(1);
4960 PAUSE
4970 RETURN
4980 FOR L=1 TO 7 STEP 2
4990 IF F$<STR(A$(5),L,2) GOTO 5010
5000 NEXT L
5010 L=(L+1)/2
5020 RETURN
5030 FOR L= 2 TO 30
5040 IF P(S,1)<M(L,1) GOTO 5060
5050 NEXT L
5060 L=L-1
5070 RETURN
5080 K=K2-INT(K2)
5090 FOR K1=1 TO 32
5100 IF K<K1/32-1/64 GOTO 5120
5110 NEXT K1
5120 K$=E$(K1)
5130 K=INT(K2)
5140 RETURN
5150 PRINT".....       .          .          "
5160 RETURN
5170 PRINT".....    ====    ====    ====    ===="
5180 RETURN
5190 PRINT".....       .          .          "
5200 RETURN
5210 PRINT".....    ====    ====    ====    ===="
```

```
5220 RETURN
5230 PRINT"......            ————         ="
5240 RETURN
5250 PRINT"......            ————         ="
5260 RETURN
10000 END

PROG....ZZW110..N72SETUP..............

1 REM              COPYRIGHT 1971 FREDERIC C. TOWERS
2 REM RUN **VALSETUP ==  EXE **SETUPOBJ
3 REM
4 REM
50 DIM R$(100)
100 PRINT"HAVE YOU CREATED THE PROPER **VALPORT.........  FILES";
110 INPUT Q$
120 IF Q$="YES" GOTO 170
130 IF Q$="NO" GOTO 1110
140 IF Q$="TROUBLE" GOTO 1630
150 PRINT"PLEASE ANSWER YES OR NO"
160 GOTO 100
170 OPEN 1,"**VALPUSER",INPUT
180 PRINT".";
190 PRINT"**VALPORT VALIDATION KEY";
200 INPUT X$(5)
210 GET A$
220 IF A$="END**" GOTO 250
230 IF A$=X$(5) GOTO 310
240 GOTO 210
250 X1=X1+1
260 IF X1>3 GOTO 290
270 RESET 1
275 PRINT"IMPROPER VALIDATION"
280 GOTO 180
290 PRINT"IMPROPER VALIDATION.  CONTACT YOUR SBC REPRESENTATIVE FOR"
295 PRINT"AUTHORIZED **VALPORT VALIDATION KEY."
300 STOP
310 IF A$="SBC1" GOTO 250
320 X1=0
330 PRINT".";
350 PRINT"(IN CASE OF DIFFICULTY RE-RUN AND REPLY ""TROUBLE"" TO THE FIRST QUESTION)'
360 PRINT
370 PRINT"FOR USER'S MANAGEMENT ACCOUNTING:  # REPS (0=OPTION NOT DESIRED)";
```

```
380 INPUT $0
390 IF $0>0 GOTO 430
400 $0=1
410 R$(1)=""
420 GOTO 520
430 IF $0.100 GOTO 460 ≤
440 PRINT"CURRENT LIMIT IS 100 REPRESENTATIVES"
450 GOTO 370
460 PRINT"INPUT REP INITIALS"
470 PRINT
480 FOR R=1 TO $0
490 PRINT"REP #";R;
500 INPUT R$(R)
510 NEXT R
520 OPEN 2,"CATALOG1",OUTPUT
530 PUT X$(5),"","","D J Q 99",$0,0,0,0
540 FOR R=1 TO $0
550 PUT R$(R)
560 NEXT R
570 CLOSE 2
580 OPEN 2,"CONTROL1",OUTPUT
590 DATA "P01","P02","P03","P04","P05","X01","X02","S01","S02","S03","S04","S05"
600 READ P$(1),P$(2),P$(3),P$(4),P$(5),Y$(1),Y$(2),M$(1),M$(2),M$(3),M$(4),M$(5)
610 PUT 9900000,P$(1),P$(2),P$(3),P$(4),P$(5),Y$(1),Y$(2),M$(1),M$(2),M$(3),M$(4),M$(5)
620 CLOSE 2
630 OPEN 2,"METERA",OUTPUT
640 PUT DAY,0,0,0,0,0,0,0,0,$0
650 FOR R=1 TO $0
660 PUT 0,0,0,0,0,0
670 NEXT R
680 CLOSE 2
690 FOR N=1 TO 5
700 OPEN 2,P$(N),OUTPUT
710 PUT 0
720 CLOSE 2
730 NEXT N
740 FOR N=1 TO 2
750 OPEN 2,Y$(N),OUTPUT
760 PUT 0
770 CLOSE 2
780 NEXT N
790 FOR N=1 TO 5
800 OPEN 2,M$(N),OUTPUT
810 PUT 0
```

```
820 CLOSE 2
830 NEXT N
840 OPEN 1,"CONTROL2",INPUT
850 OPEN 1,"TEMPO",INPUT
860 OPEN 2,"OLDNEW#1",OUTPUT
870 PUT 0
880 OPEN 2,"OLDNEW#2",OUTPUT
890 PUT 0
900 PRINT"..";
910 PRINT"YOU ARE NOW READY TO USE THE **VALPORT.........SYSTEM, AND CAN USE ANY OF THE"
920 PRINT"VARIOUS PROGRAMS.  YOU SHOULD BE SURE TO OBTAIN A COPY OF THE LATEST"
930 PRINT"**VALPORT SECURITIES INDEX................................FROM YOUR LOCAL SBC REPRESENTATIVE.   THIS"
940 PRINT"INDEX, WHICH IS PUBLISHED REGULARLY, WILL BE VERY HELPFUL TO YOU IN"
960 PRINT"LOOKING UP TICKER SYMBOLS.   IN THE MEANTIME, HOWEVER, YOU MAY USE THE"
970 PRINT"STANDARD NYSE, AMEX, NASDAQ, PCSE, OR MWSE SYMBOLS AVAILABLE FROM"
980 PRINT"MANY SOURCES."
1020 PRINT"..";
1100 GOTO 10000
1110 PRINT'IF YOU ENCOUNTER ANY DIFFICULTY RESPOND "NO" TO THE ABOVE QUESTION.'
1120 PRINT"..";
1130 PRINT"                      TO INSTALL THE **VALPORT.........SYSTEM IN YOUR LIBRARY, YOU MUST FIRST"
1140 PRINT"CREATE THE PROPER FILES, USING THE 'FILE' COMMAND.   THE FOLLOWING FILE"
1150 PRINT"NAMES MUST BE CREATED EXACTLY............            AS THEY ARE SHOWN."
1160 PRINT"..";
1170 PRINT"       FILE NAME...........                           CONTENTS........            "
1180 PRINT"..";
1190 PRINT"       CATALOG1           USER CONTROL VARIABLES, INITIALS OF REPRESENTATIVES"
1200 PRINT"..";
1210 PRINT"       CONTROL1           USER CONTROL FILE FOR ALL USER FILES"
1220 PRINT"       CONTROL2           BACKUP USER CONTROL FILE"
1230 PRINT"..";
1240 PRINT"       METERA             MONTHLY REPORT OF USAGE BY REPRESENTATIVE"
1250 PRINT"       TEMPO              TEMPORARY PORTFOLIO STORAGE"
1260 PRINT"..";
1270 PRINT"       X01                USER SUPPLEMENTAL TICKER-SYMBOL CROSS-REFERENCE"
1280 PRINT"       X02                REWIND FILE FOR X01"
1290 PRINT"..";
1300 PRINT"       S01                USER SUPPLEMENTAL SECURITIES FILE (FIRST 400 SECURITIES)"
1310 PRINT"       S02                    "      "            "     "   (NEXT 400 SECURITIES)'
1320 PRINT'       S03                    "      "            "     ..(   "     "       "    )'
1330 PRINT'       S04                    "      "            "     (     "     "       "    )'
1340 PRINT"       S05                REWIND FILE FOR S01, S02, S03, S04"
1350 PRINT"..";
```

```
1360 PRINT"          PERMANENT PORTFOLIO FILE STORAGE    (A-C)"
1370 PRINT'   P01                                        (D-I)'
1380 PRINT'   P02           "            "        "      (J-P)'
1390 PRINT'   P03           "            "        "      (Q-Z)'
1400 PRINT"   P04    REWIND FILE FOR P01, P02, P03, P04"
1410 PRINT"   P05"
1420 PRINT"   OLDNEW#1      MERGER CROSS-REFERENCE FILE"
1430 PRINT"   OLDNEW#2      BACKUP MERGER CROSS-REFERENCE FILE"
1440 PRINT"...";
1450 PRINT"     ONCE YOU HAVE CREATED THESE FILES, PLEASE RE-RUN **VALSETUP..........     TO"
1460 PRINT"INITIALIZE ALL FILES.  PLEASE NOTE THAT YOU WILL BE ASKED FOR THE NUMBER"
1470 PRINT"OF REGISTERED REPRESENTATIVES (OR ACCOUNT SUPERVISORS), UP TO A MAXIMUM"
1480 PRINT"OF 100.  IF YOU INDICATE A NUMBER GREATER THAN ZERO, YOU WILL BE ASKED FOR"
1490 PRINT"INITIALS (FORM:  TJW) FOR EACH REPRESENTATIVE NUMBER.  YOU MAY ENTER A"
1500 PRINT'BLANK ("") FOR ANY INITIAL IF DESIRED.  THESE INITIALS, AND THEIR NUMERIC'
1510 PRINT"EQUIVALENTS WILL APPEAR ON VARIOUS REPORTS TO THE USER CONCERNING HIS OWN"
1520 PRINT"USAGE OF THE PROGRAMS.  (THIS INFORMATION IS AVAILABLE ONLY....     TO THE USER"
1530 PRINT"AND IS NOT AVAILABLE OUTSIDE HIS OWN LIBRARY.)  IF YOU RESPOND WITH A"
1540 PRINT"ZERO (0) FOR THE NUMBER OF REPRESENTATIVES, THIS OPTION WILL NOT BE"
1550 PRINT"ACTIVATED, AND ONLY TOTAL.....     PROGRAM USAGE WILL BE RECORDED IN THE USER'S"
1560 PRINT"METER FILE' THERE WILL BE NO BREAKDOWN BY REPRESENTATIVE."
1570 PRINT"...";
1580 PRINT"     REMEMBER, VARIOUS OF THE **VALPORT.........     PROGRAMS REQUIRE THAT THE TABS ON"
1590 PRINT"YOUR TERMINAL BE SET ONLY....     AT 10,20,30....100,110,120.  BE SURE TO"
1600 PRINT"CHECK THIS FROM TIME TO TIME -- OR SET THEM AND HAVE THE"
1610 PRINT'TERMINAL ENGINEER DISABLE THE "TAB SET-CLEAR" KEY.'
1620 GOTO 1000
1630 PRINT"...";
1640 PRINT"     IF YOU HAVE ANY DIFFICULTY WITH THIS PROGRAM, IT WILL NORMALLY BE"
1650 PRINT"BECAUSE YOU HAVE FAILED TO CREATE ONE OR MORE OF THE FILES PROPERLY."
1660 PRINT"THE FOLLOWING ARE THE LINE NUMBERS WHICH WILL APPEAR IN A DIAGNOSTIC"
1670 PRINT"IF A FILE IS MISSING OR IMPROPERLY NAMED:"
1680 PRINT"...";
1690 PRINT"     LINE 520:   CATALOG1"
1700 PRINT"     LINE 580:   CONTROL1"
1710 PRINT"     LINE 630:   METERA"
1720 PRINT"     LINE 700:   P01 P02 P03 P04 OR P05"
1730 PRINT"     LINE 750:   X01 OR X02"
1740 PRINT"     LINE 800:   S01 S02 S03 S04 OR S05"
1750 PRINT"     LINE 840:   CONTROL2"
1760 PRINT"     LINE 850:   TEMPO"
1770 PRINT"     LINE 860:   OLDNEW#1"
1780 PRINT"     LINE 880:   OLDNEW#2"
10000 END
```

```
STATUS
PROGRAM..VALPORT
    1764 CHARS
      61 LINES
       1 UNITS
         BASIC
         WIDTH 255
LINE 298
ID: SBC994
SESSION:
       4 MIN
       0 PROC UNITS

LIST

VALPORT    12:37    09/09/72    WEDNESDAY   102

100 PRINT"TYPE";
110 INPUT T$
120 IF T$="VAL"   GOTO 380
130 IF T$="VALX"  GOTO 390
140 IF T$="PUR"   GOTO 400
150 IF T$="SEL"   GOTO 410
160 IF T$="SUM"   GOTO 420
170 IF T$="SUMX"  GOTO 430
180 IF T$="TAX"   GOTO 440
190 IF T$="GAIN"  GOTO 450
200 IF T$="XS"    GOTO 460
210 IF T$="VALD"  GOTO 470
220 IF T$="LIST"  GOTO 480
230 IF T$="NEW"   GOTO 490
240 IF T$="EDIT"  GOTO 500
245 IF T$="MOVE"  GOTO 505
250 IF T$="COV"   GOTO 510
260 IF T$="EST"   GOTO 520
270 IF T$="CHEK"  GOTO 530
280 IF T$="DEL"   GOTO 540
290 IF T$="CAT"   GOTO 550
300 IF T$="CODE"  GOTO 560
310 IF T$="FORM"  GOTO 570
320 IF T$="USE"   GOTO 580
330 IF T$="MGT"   GOTO 590
335 IF T$="SIZE"  GOTO 600
```

```
345 IF T$="SUMG" GOTO 620
347 IF T$="EDITCAT" GOTO 630
350 REM
360 PRINT"TYPE (NEW,EDIT,CHEK,DEL,MOVE,CAT,HOLDS,EDITCAT,CODE,FORM,USE,MGT)"
362 PRINT"       (VAL,VALD,VALX,PUR,SEL,SUM,SUMX,SUMG,TAX,GAIN,SIZE,EST,LIST,COV,XS)";
370 GOTO 110
380 COM 'EXE **VALPOBJ' WITH 'VAL?'
390 COM 'EXE **VALPLOBJ' WITH '?'
400 COM 'EXE **VALPOBJ' WITH 'PUR?'
410 COM 'EXE **VALPOBJ' WITH 'SEL?'
420 COM 'EXE **SUMPOBJ' WITH '?'
430 COM 'EXE **SUMPLOBJ' WITH '?'
440 COM 'EXE **TAXPOBJ' WITH '?'
450 COM 'EXE **GAINOBJ' WTIH '?'
460 COM 'EXE **XSPOBJ' WITH '?'
470 COM 'EXE **VALPDOBJ' WITH 'VAL?'
480 COM 'EXE **READOBJ'
490 COM 'EXE **NEWPOBJ'
500 COM 'EXE **EDITPOBJ'
505 COM 'EXE **MOVEPOBJ'
510 COM 'EXE **COVPOBJ'
520 COM 'EXE **ESTPOBJ'
530 COM 'RUN **CHEKPORT'
540 COM 'EXE **DELPOBJ'
550 COM 'RUN **CATPORT'
560 COM 'RUN **CODEPORT'
570 COM 'RUN **FORMPORT' WITH 'PORT'
580 COM 'RUN **USEPORT'
590 COM 'RUN **MGTPORT'
600 COM 'EXE **SIZEOBJ' WITH '?'
610 COM 'EXE **HOLDSOBJ'
620 COM 'EXE **SUMGOBJ' WITH '?'
630 COM 'RUN **EDITCAT'
1000 END
```

```
STATUS
PROGRAM..EDITCAT
    4433 CHARS
    186 LINES
    2 UNITS
    BASIC
    WIDTH 130
LINE 298
ID: SBC994
SESSION:
    8 MIN
    1 PROC UNITS

LIST

EDITCAT    12:41    08/09/72    WEDNESDAY    I02

1 REM COPYRIGHT 1971 FREDERIC C. TOWERS
50 DIM R$(100),J(100,6)
100 OPEN 1,"CATALOG1",INPUT
110 GET I$(1),I$(2),I$(3),I$(4),A$(1),I(1),I(2),I(3),I(4)
120 FOR R=1 TO I(1)
130 GET R$(R)
140 NEXT R
150 CLOSE 1
160 PRINT"
";
170 PRINT"EDIT (REPS,FORMS)";
180 INPUT E$
190 IF E$="REPS" GOTO 220
200 IF E$="FORMS" GOTO 1330
210 GOTO 170
220 PRINT"TYPE (LISTREPS,CHGREP,ADDREPS,NEWCAT)";
230 INPUT Q$
240 IF Q$="LISTREPS" GOTO 930
250 IF Q$="CHGREP" GOTO 320
260 IF Q$="ADDREPS" GOTO 760
270 IF Q$="NEWCAT" GOTO 1000
280 REM
290 REM
300 REM
310 GOTO 220
320 PRINT"REP # TO BE CHANGED (0=END)";
330 INPUT N1
```

```
340 IF N1=0 GOTO 540
350 IF N1<1 GOTO 380
360 IF N1>I(1) GOTO 380
370 GOTO 410
380 PRINT"REP # MUST BE BETWEEN 1 AND";I(1)
390 PRINT
400 GOTO 320
410 PRINT USING 420 ,R$(N1),N1
420:OLD REP:  ###### - ###
430 PRINT"NEW INITIALS";
440 INPUT R$
450 PRINT"I HAVE:  ";R$;
460 PRINT
470 PRINT"OK";
480 GOSUB 1240
490 IF Z9=1 GOTO 520
500 PRINT
510 GOTO 320
520 R$(N1)=R$
530 GOTO 500
540 OPEN 2,"CATALOG1",OUTPUT
550 PUT I$(1),I$(2),I$(3),I$(4),A$(1),I(1),I(2),I(3),I(4)
560 FOR R=1 TO I(1)
570 PUT R$(R)
580 NEXT R
590 CLOSE 2
600 OPEN 1,"METERA",INPUT
610 GET $1,$2,$3,$4,$5,$6,$7,$8,$9,$0
620 IF $0=I(1) GOTO 740
630 FOR R=1 TO $0
640 GET J(R,1),J(R,2),J(R,3),J(R,4),J(R,5),J(R,6)
650 NEXT R
660 CLOSE 1
670 $0=I(1)
680 OPEN 2,"METERA",OUTPUT
690 PUT $1,$2,$3,$4,$5,$6,$7,$8,$9,$0
700 FOR R=1 TO $0
710 PUT J(R,1),J(R,2),J(R,3),J(R,4),J(R,5),J(R,6)
720 NEXT R
730 CLOSE 1
740 PRINT"UPDATED CATALOG"
750 GOTO 10000
```

```
760  IF I(1)<100 GOTO 790
770  PRINT I(1);"REPS VALIDATED. LIMIT IS 100.  USE 'CHGREP' OPTION TO CHANGE INITIALS."
780  GOTO 220
790  PRINT"# NEW REPS TO BE ADDED";
800  INPUT N2
810  IF I(1)+N2≤100 GOTO 840
820  PRINT I(1);"REPS VALIDATED. LIMIT IS 100."
830  GOTO 790
840  PRINT
850  PRINT"REP #    INITIALS"
860  PRINT
870  FOR R=I(1)+1 TO I(1)+N2
880  PRINT"REP #";R;
890  INPUT R$(R)
900  NEXT R
910  I(1)=I(1)+N2
920  GOTO 540
930  PRINT"REP #    INITIALS"
940  PRINT
950  FOR R=1 TO I(1)
960  PRINT USING 970 ,R,R$(R)
970: ### - ######
980  NEXT R
990  GOTO 10000
1000 PRINT"THIS OPTION WILL DELETE ALL YOUR OLD REP #S AND INITIALS AND"
1010 PRINT"PERMIT YOU TO CREATE AN ENTIRELY NEW CATALOG. NOTE, HOWEVER,"
1020 PRINT"THAT THE REP #S ALREADY ASSIGNED TO PORTFOLIOS STORED IN"
1030 PRINT"YOUR MASTER FILE ARE NOT AFFECTED.  YOU SHOULD BE CAREFUL"
1040 PRINT"THAT YOUR NEW CATALOG CONTAINS NEW INITIALS FOR EACH OF"
1050 PRINT"THESE REP #S.
1060 PRINT
1070 PRINT"DO YOU WISH TO PROCEED";
1080 GOSUB 1240
1090 IF Z9=0 GOTO 10000
1100 PRINT"NEW # OF REPS";
1110 INPUT N1
1120 IF N1>0 GOTO 1160
1130 I(1)=1
1140 R$(1)=""
1150 GOTO 540
1160 PRINT"REP #    INITIALS"
1170 PRINT
1180 FOR R=1 TO N1
1190 PRINT"REP #";R;
1200 INPUT R$(R)
```

```
1210 NEXT R
1220 I(1)=N1
1230 GOTO 540
1240 INPUT A$
1250 IF A$="YES" GOTO 1290
1260 IF A$="NO" GOTO 1310
1270 PRINT"PLEASE ANSWER YES OR NO"
1280 GOTO 1240
1290 Z9=1
1300 RETURN
1310 Z9=0
1320 RETURN
1330 PRINT"              ";
1340 PRINT"YOUR CURRENT FORMS CONTROL IS--"
1350 PRINT"              ";
1360 PRINT"PAPER FEED:    ";
1370 C$=STR(I$(2),1,1)
1380 IF C$="C" GOTO 1430
1390 IF C$="?" GOTO 1450
1400 IF C$="" GOTO 1470
1410 PRINT"FORMS CONTROL ERROR.   CONTACT SBC IMMEDIATELY!"
1420 STOP
1430 PRINT"CONTINUOUS"
1440 GOTO 1480
1450 PRINT"OPTIONAL"
1460 GOTO 1480
1470 PRINT"NON-CONTINUOUS"
1480 PRINT"              ";
1490 PRINT"PAGE DEPTH:    ";
1500 C$=STR(I$(2),2,1)
1510 IF C$="S" GOTO 1550
1520 IF C$="?" GOTO 1570
1530 IF C$="" GOTO 1590
1540 GOTO 1410
1550 PRINT'SHORT (8 1/2")'
1560 GOTO 1600
1570 PRINT"OPTIONAL"
1580 GOTO 1600
1590 PRINT'LONG (11")'
```

```
1600 PRINT"
       ";
1610 PRINT"CHANGE PAPER FEED";
1620 GOSUB 1240
1630 IF Z9=0 GOTO 1760
1640 PRINT"NEW PAPER FEED (NONCONT,CONT,OPT)";
1650 INPUT Q$
1660 IF Q$="NONCONT" GOTO 1700
1670 IF Q$="CONT" GOTO 1720
1680 IF Q$="OPT" GOTO 1740
1690 GOTO 1640
1700 C$=""
1710 GOTO 1750
1720 C$="C"
1730 GOTO 1750
1740 C$="?"
1750 STR(I$(2),1,1)=C$
1760 PRINT"
       ";
1770 PRINT"CHANGE PAGE DEPTH";
1780 GOSUB 1740
1790 IF Z9=0 GOTO 540
1800 PRINT"NEW PAGE DEPTH (LONG,SHORT,OPT)";
1810 INPUT Q$
1820 IF Q$="LONG" GOTO 1860
1830 IF Q$="SHORT" GOTO 1880
1840 IF Q$="OPT" GOTO 1900
1850 GOTO 1800
1860 C$=""
1870 GOTO 1910
1880 C$="S"
1890 GOTO 1910
1900 C$="?"
1910 STR(I$(2),2,1)=C$
1920 GOTO 540
10000 END
```

```
1 REM COPYRIGHT 1968,1969,1970,1971 FREDERIC C. TOWERS
2 REM RUN **PRICESEC  ==>  EXE **PRICEOBJ
50 DIM M(30,1),M$(50),A$(5),O$(12),E$(32),I$(25),J$(25),Y$(12),X$(8)
60 DIM A(17),B(17),B$(17),J(100,6)
100 OPEN 1,"CONTPORT",INPUT
110 GET X$(1),X$(2),X$(3),X$(4)
120 MAT GET M
130 GET D0,B0,N0,A$(1),A$(2),A$(3),A$(4)
140 GET D$(1),D$(2),D$(3),D$(4),D$(5),D$(6),D$(7),D$(8),D$(9),D$(10),D$(11),D$(12)
150 GET E$(1),E$(2),E$(3),E$(4),E$(5),E$(6),E$(7),E$(8),E$(9),E$(10),E$(11),E$(12),E$(13),E$(14),E$(15),E$(16)
160 GET E$(17),E$(18),E$(19),E$(20),E$(21),E$(22),E$(23),E$(24),E$(25),E$(26),E$(27),E$(28),E$(29),E$(30),E$(31),E$(32)
170 GET I$(1),J$(1),I$(2),J$(2),I$(3),J$(3),I$(4),J$(4),I$(5),J$(5),I$(6),J$(6),I$(7),J$(7),I$(8),J$(8),I$(9),J$(9),I$(10),J$(10),I$(11),J$(11),I$(12),J$(12),I$(13),J$(13)
180 GET I$(14),J$(14),I$(15),J$(15),I$(16),J$(16),I$(17),J$(17),I$(18),J$(18),I$(19),J$(19),I$(20),J$(20),I$(21),J$(21),I$(22),J$(22),I$(23),J$(23),I$(24),J$(24),I$(25),J$(25)
190 GET Y$(1),Y$(2),Y$(3),Y$(4),Y$(5),Y$(6)
200 GET M$(1),M$(2),M$(3),M$(4),M$(5),M$(6),M$(7),M$(8),M$(9),M$(10),M$(11),M$(12),M$(13),M$(14),M$(15),M$(16),M$(17),M$(18),M$(19),M$(20),M$(21),M$(22),M$(23),M$(24),M$(25)
210 GET M$(26),M$(27),M$(28),M$(29),M$(30),M$(31),M$(32),M$(33),M$(34),M$(35),M$(36),M$(37),M$(38),M$(39),M$(40),M$(41),M$(42),M$(43), M$(44),M$(45),M$(46),M$(47),M$(48),M$(49),M$(50)
220 GET Y$(7),Y$(8),Y$(9),Y$(10),Y$(11),Y$(12)
230 CLOSE 1
240 OPEN 1,"CATALOG1"INPUT
250 GET X$(5)
260 IF X$(5)="SBC1" GOTO 310
270 STOP
290     :######## (0:##)
310 OPEN 1,"***GFINFILE",INPUT
320 FOR N=1 TO 17
330 GET A(N),B(N),B$(N)
340 NEXT N
350 GET D5,D5,D5
360 D=D5
370 CLOSE 1
380 GOSUB 1540
390 M1=M5
400 D1=D5
410 Y1=Y5
420 D5=D0
```

```
430 GOSUB 1540
440 M2=M5
450 D2=D5
460 Y2=Y5
470 PRINT USING 480 ,"OLD",M2,D2,Y2
480     :### PRICEFILE AS OF ##/##/##
490 IF M1=M2 GOTO 510
500 B0=D0
510 PRINT USING 480 ,"NEW",M1,D1,Y1
520 D0=D
530 GOTO 680
540 REM 483 PRINT "VERIFY SBC FILES" 484 INPUT A$
550 IF A$="NO" GOTO 680
560 FOR F1=1 TO 17
570 OPEN 1,B$(F1),INPUT
580 PRINT B$(F1);
590 GET A,A$,B$,C$,D,E,F,G,H,I,J,K,L,M,N,O,P,Q,R,S,T,U,V,W,X,Y,Z
600 IF A=0 GOTO 640
610 X1=X1+1
620 X2=X2+1
630 GOTO 590
640 PRINT X1;"(";CPU;")"
650 X1=0
660 NEXT F1
670 PRINT"TOTAL";X2;"(";CPU;")"
680 PRINT
690 REM PRINT"CONTINUE WITH UPDATE";
700 REM INPUT A$
710 REM IF A$="YES" GOTO 740--?
720 REM STOP
730 OPEN 2,"EXCPLIST",OUTPUT
740 PUT M1,D1,Y1
750 FOR F1=11 TO 25
760 IF M(F1,1)=M(F1-1,1) GOTO 1400
770 L1=F1-1
780 J$=STR(M$(L1),3)
790 OPEN 3,J$,INPUT
800 M0=L1
810 J$=STR(M$(M0+25),3)
820 OPEN 4,J$,OUTPUT
830 GET 3:N1
840 PUT 4:N1
850 FOR R1=1 TO N1
```

```
 860 GET 3:S$,T$,U$,N3,C3,D3,E3,V3,W3,Y3,Z3
 870 REM NAME1,NAME2,SYM,SEC#,CODE,DIV/INT,EPS/MAT,PRICE,XDSTK/RAT,STK%/---
 880 GOSUB 1770
 890 IF L6.L5 GOTO 930 ≠
 900 IF V4=0 GOTO 960
 910 V4=0
 920 GOTO 990
 930 OPEN 1,B$(L5),INPUT
 940 L6=L5
 950 V4=0
 960 GET A,A$,B$,C$,B,C,D,E,P(1),P(2),H,I,J,P(3),P(4),M,N,O,P,Q,R,S,T,U,V,W,X,Y,Z
 962 D$=STR(C$,9)
 964 C$=STR(C$,1,7)
 970 REM SEC#,NAME1,NAME2,SYM,CUSIP,CLH#,OPEN,HI,LO,LAST,CLOSE,ADJCLOSE,HIYR,LOYR,BID,OFFER,PREVBID,EPSIND,QEPS,EPS,XDIND,
 980 REM DIVPDIND,STKDIVIND,QDIV,DIV,STKDIV%,XDCASH,XDSTK,VOL,ROUNDLOTIND
 990 IF A=0 GOTO 1020
1000 IF A<N3 GOTO 1090
1010 IF A=N3 GOTO 1120
1020 PUT S$,T$,U$,N3,"***"
1030      :############################# ##### ######## GONE
1040 IF M1=M2 GOTO 1060
1050 W3=V3
1060 V3=0
1070 V4=1
1080 GOTO 1290
1090 IF INT(A/1000000)=5 GOTO 960
1100 PUT A$,B$,C$,A,""
1110 GOTO 960
1120 IF U$=C$ GOTO 1150
1130 PUT S$,T$,U$,N3,C$
1140      :############################+################### ###### ######### NEW SYMBOL #####
1150 FOR P1=1 TO 4
1160 IF P(P1).0 GOTO 1180 ≠
1170 NEXT P1
1180 IF M1=M1 GOTO 1200
1190 W3=V3
1200 V3=P(P1)
1210 IF C3.5 GOTO 1280 ≦
1220 REM
1230 D3=U
1240 REM
1250 E3=P
1260 Y3=X
1270 Z3=V
```

```
1280 X3=X3+1
1290 PUT 4:S$,T$,U$,N3,C3,D3,E3,V3,W3,Y3,Z3
1300 NEXT R1
1310 CLOSE 3,4
1320 J$=M$(M0)
1330 M$(M0)=M$(M0+25)
1340 M$(M0+25)=J$
1350 GOSUB 1580
1360 X4=X4+1
1370 PRINT USING 1380 ,X4,X3,CPU
1380        :FILE ##:   #### ISSUES DONE    (0:##)
1390 CLOSE 3,4
1400 NEXT F1
1410 PUT "END**","END**","END**",D0,"END**"
1420 CLOSE 2
1430 OPEN 1,"METERA",INPUT
1440 GET $1,$2,$3,$4,$5,$6,$7,$8,$9,$0
1450 MAT GET J($0,6)
1460 CLOSE 1
1470 $7=$7+1
1480 OPEN 2,"METERA",OUTPUT
1490 PUT $1,$2,$3,$4,$5,$6,$7,$8,$9,$0
1500 MAT PUT J
1510 CLOSE 2
1520 PRINT"..**VALPORT FILES SUCCESSFULLY UPDATED.."
1522 PRINT"UPDATING **VALPORT INDEX SUPPLEMENT."
1530 COM 'EXE **SUPBNOBJ'
1540 Y5=INT(D5/10000)
1550 M5=INT((D5-Y5*10000)/100)
1560 D5=D5-Y5*10000-M5*100
1570 RETURN
1580 OPEN 4,"CONTPORT",OUTPUT
1590 GOSUB 1630
1600 OPEN 4,"CONTPOR1",OUTPUT
1610 GOSUB 1630
1620 RETURN
1630 PUT $: X$(1),X$(2),X$(3),X$(4)
1640 MAT PUT 4: M
1650 PUT 4: D0,B0,N0,A$(1),A$(2),A$(3),A$(4)
1660 PUT 4: D$(1),D$(2),D$(3),D$(4),D$(5),D$(6),D$(7),D$(8),D$(9),D$(10),D$(11),D$(12)
1670 PUT 4: E$(1),E$(2),E$(3),E$(4),E$(5),E$(6),E$(7),E$(8),E$(9),E$(10),E$(11),E$(12),E$(13),E$(14),E$(15),E$(16)
1680 PUT 4: E$(17),E$(18),E$(19),E$(20),E$(21),E$(22),E$(23),E$(24),E$(25),E$(26),E$(27),E$(28),E$(29),E$(30),E$(31),E$(32)
1690 PUT 4: I$(1),J$(1),I$(2),J$(2),I$(3),J$(3),I$(4),J$(4),I$(5),J$(5),I$(6),J$(6),I$(7),J$(7),I$(8),J$(8),I$(9),J$(9),I$(10),J$
(10),I$(11),J$(11),I$(12),J$(12),I$(13),J$(13)
```

```
1700 PUT 4: I$(14),J$(14),I$(15),J$(15),I$(16),J$(16),I$(17),J$(17),I$(18),J$(18),I$(19),J$(19),I$(20),J$(20),I$(21),J$(21),I$(22),
,J$(22),I$(23),J$(23),I$(24),J$(24),I$(25),J$(25)
1710 PUT 4: Y$(1),Y$(2),Y$(3),Y$(4),Y$(5),Y$(6)
1720 PUT 4: M$(1),M$(2),M$(3),M$(4),M$(5),M$(6),M$(7),M$(8),M$(9),M$(10),M$(11),M$(12),M$(13),M$(14),M$(15),M$(16),M$(17),M$(18),
M$(19),M$(20),M$(21),M$(22),M$(23),M$(24),M$(25)
1730 PUT 4: M$(26),M$(27),M$(28),M$(29),M$(30),M$(31),M$(32),M$(33),M$(34),M$(35),M$(36),M$(37),M$(38),M$(39),M$(40),M$(41),M$(42)
,M$(43),M$(44),M$(45),M$(46),M$(47),M$(48),M$(49),M$(50)
1740 PUT 4: Y$(7),Y$(8),Y$(9),Y$(10),Y$(11),Y$(12)
1750 CLOSE 4
1760 RETURN
1770 FOR L5=2 TO 17
1780 IF N3<B (L5) GOTO 1820
1790 NEXT L5
1800 L5=17
1810 RETURN
1820 L5=L5-1
1830 RETURN
10000 END

PROG....ZZW110..N72NEWS .............

1 REM COPYRIGHT 1969,1970,1971 FREDERIC C. TOWERS
2 REM RUN **NEWSEC ==> EXE **NEWSOBJ
50 DIM M$(50),M(30,1),A$(5),D$(12),E$(32),I$(25),J$(25),Y$(12),X$(8),P$(5),J(100,6),F$(20)
100 OPEN 1,"CATALOG1",INPUT
110 GET X$(5)
120 CLOSE 1
122 IF X$(5).."SBC1" GOTO 130 ≠
124 OPEN 1,"CONTPORT",INPUT
126 GOTO 140
130 OPEN 1,"*CONTPORT",INPUT
140 GET X$(1),X$(2),X$(3),X$(4)
150 MAT GET M
160 GET D0,B0,N0,A$(1),A$(2),A$(3),A$(4)
170 IF X$(5).."SBC1" GOTO 280 ≠
175 GET D$(1),D$(2),D$(3),D$(4),D$(5),D$(6),D$(7),D$(8),D$(9),D$(10),D$(11),D$(12)
180 GET E$(1),E$(2),E$(3),E$(4),E$(5),E$(6),E$(7),E($8),E$(9),E$(10),E$(11),E$(12),E$(13),E$(14),E$(15),E$(16)
190 GET E$(17),E$(18),E$(19),E$(20),E$(21),E$(22),E$(23),E$(24),E$(25),E$(26),E$(27),E$(28),E$(29),E$(30),E$(31),E$(32)
200 GET I$(1),I$(2),I$(3),I$(4),I$(5),I$(6),I$(7),I$(8),I$(9),I$(10),
I$(10),I$(11),I$(12),I$(13),I$(14),I$(15),I$(16),I$(17),I$(18),I$(19),I$(20),I$(21),I$(22),
210 GET I$(23),J$(14),I$(15),J$(15),I$(16),J$(16),I$(17),J$(17),I$(18),J$(18),I$(19),J$(19),I$(20),J$(20),I$(21),J$(21),I$(22),
J$(22),I$(23),J$(23),I$(24),J$(24),I$(25),J$(25)
220 GET Y$(1),Y$(2),Y$(3),Y$(4),Y$(5),Y$(6)
```

```
230 GET M$(1),M$(2),M$(3),M$(4),M$(5),M$(6),M$(7),M$(8),M$(9),M$(10),M$(11),M$(12),M$(13),M$(14),M$(15),M$(16),M$(17),M$(18),
    M$(19),M$(20),M$(21),M$(22),M$(23),M$(24),M$(25)
240 GET M$(26),M$(27),M$(28),M$(29),M$(30),M$(31),M$(32),M$(33),M$(34),M$(35),M$(36),M$(37),M$(38),M$(39),M$(40),M$(41),M$(42),
    M$(43),M$(44),M$(45),M$(46),M$(47),M$(48),M$(49),M$(50)
250 GET Y$(7),Y$(8),Y$(9),Y$(10),Y$(11),Y$(12)
260 CLOSE 1
270 GOTO 310
280 OPEN 1,"CONTROL1",INPUT
290 GET C0,P$(1),P$(2),P$(3),P$(4),P$(5),Y$(7),Y$(8),M$(26),M$(27),M$(28),M$(29),M$(30)
300 CLOSE 1
310 REM
320        :######## (0:##)
330 Q$="STD"
340 IF X$(5)."SBC1" GOTO 400≠
350 PRINT"INPUT(STD,QCK)";
360 INPUT Q$
370 IF Q$="STD" GOTO 400
380 IF Q$="QCK" GOTO 400
390 GOTO 350
400 PRINT"..";
410 PRINT"SYMBOL (0=END)";
420 Q8,R5,F9,V4,W4,C4,E4,U4,B1=0
430 INPUT A$
440 IF A$="0" GOTO 10000
450 IF X$(5)="SBC1" GOTO 490
460 IF STR(A$,1,1)="=" GOTO 520
470 PRINT"SYMBOL MUST BEGIN WITH ="
480 GOTO 410
490 IF STR(A$,1,1)."=" GOTO 520 ≠
500 PRINT"SYMBOL MUST NOT BEGIN WITH ="
510 GOTO 410
520 IF STR(A$,7,12)="" GOTO 550
530 PRINT"SYMBOL MUST CONTAIN 6 CHARACTERS OR LESS"
540 GOTO 410
550 Z$=A$
560 IF A$<"A" GOTO 720
562 STR(B$,1,6)="**SYM#"
564 STR(B$,7,1)=STR(Z$,1,1)
566 OPEN 1,B$,INPUT
568 GET B$,B1
569 B$=STR(B$,1,7)
570 IF B1=0 GOTO 590
572 IF B$<Z$ GOTO 568
574 IF B$>Z$ GOTO 590
```

```
576 F=B1
578 GOTO 720
590 PRINT"SEC # (0=FORGET IT)";
600 INPUT F
610 IF F=0 GOTO 410
620 IF F<1000000 GOTO 650
630 IF F.10000000 GOTO 650
640 GOTO 670
650 PRINT"SEC # MUST HAVE 7 DIGITS"
660 GOTO 590
670 PRINT USING 680,F
680         :I HAVE...  #######
690 PRINT"OK";
700 GOSUB 3970
710 IF Z9=0 GOTO 590
720 IF Q8=1 GOTO 770
730 PRINT".";
740 GOSUB 2920
750 PRINT".";
760 GOSUB 3040
770 GOSUB 2300
780 C8=0
790 A$=Z$
800 IF A$."A" GOTO 890
810 F8=1
820 IF X$(5)="SBC1" GOTO 860
830 C0=C0+10
840 F=C0
850 GOTO 900
860 N0=N0+100
870 F=N0
880 F8=0
890 F8=0
900 K1=F
920 GOSUB 2380
930 STR(K$,1,11)=STR(A$,1,11)
940 IF X$(5)."SBC1" GOTO 946
942 J$=STR(Y$(L),3)
944 GOTO 948
946 J$=Y$(L)
948 OPEN 1,J$,INPUT
950 Y0=L
960 IF X$(5)."SBC1" GOTO 1000
970 J$=STR(Y$(Y0+6),3)
```

```
980  OPEN 2,J$,OUTPUT
990  GOTO 1010
1000 OPEN 2,Y$(8),OUTPUT
1010 GET N1
1020 PUT N1+1
1030 IF N1>20 GOTO 1060
1040 R=-19
1050 GOTO 1120
1060 FOR R=1 TO N1-20 STEP 20
1070 GET F$(1),F$(2),F$(3),F$(4),F$(5),F$(6),F$(7),F$(8),F$(9),F$(10),F$(11),F$(12),F$(13),F$(14),F$(15),F$(16),F$(17),F$(18),F$(19),F$(20)
1080 IF F9=1 GOTO 1100
1090 IF A$.STR(F$(20),1,11) GOTO 1350 <=
1100 PUT F$(1),F$(2),F$(3),F$(4),F$(5),F$(6),F$(7),F$(8),F$(9),F$(10),F$(11),F$(12),F$(13),F$(14),F$(15),F$(16),F$(17),F$(18),F$(19),F$(20)
1110 NEXT R
1120 FOR R=R+20 TO N1
1130 R5=R5+1
1140 GET F$(R5)
1150 IF F9=1 GOTO 1200
1160 IF A$=STR(F$(R5),1,11) GOTO 1330
1170 IF A$>STR(F$(R5),1,11) GOTO 1200
1180 PUT K$
1190 F9=1
1200 PUT F$(R5)
1210 NEXT R
1220 IF F9=1 GOTO 1450
1230 PUT K$
1240 F9=1
1250 GOTO 1450
1260 GOSUB 2450
1270 F=K1
1280 PRINT A$;" IS ALREADY IN THE FILE."
1290 Q8=1
1300 GOTO 1470
1310 K$=STR(F$(R1),12,7)
1320 GOTO 1260
1330 K$=STR(F$(R5),12,7)
1340 GOTO 1260
1350 FOR R1=1 TO 20
1360 IF F9=1 GOTO 1390
1370 IF A$=STR(F$(R1),1,11) GOTO 1310
1380 IF A$<STR(F$(R1),1,11) GOTO 1420
1390 PUT F$(R1)
```

```
1400 NEXT R1
1410 GOTO 1110
1420 PUT K$
1430 F9=1
1440 GOTO 1390
1450 PRINT USING 1460 ,A$,CPU
1460      :XREF SYMBOL ####### (0:###)
1470 CLOSE 1,2
1480 FOR L=2 TO 30
1490 IF F<M(L,1) GOTO 1510
1500 NEXT L
1510 L=L-1
1520 IF X$(5)."SBC1" GOTO 1526 ≠
1522 J$=STR(M$(L),3)
1524 GOTO 1528
1526 J$=M$(L)
1528 OPEN 1,J$,INPUT
1530 IF Q8=1 GOTO 1600
1540 M0=L
1550 IF X$(5)."SBC1" GOTO 1590 ≠
1560 J$=STR(M$(M0+25),3)
1570 OPEN 2,J$,OUTPUT
1580 GOTO 1600
1590 OPEN 2,M$(30),OUTPUT
1600 GET N1
1610 IF Q8=1 GOTO 1630
1620 PUT N1+1
1630 FOR R=1 TO N1
1640 GET S$,T$,U$,N3,C3,D3,E3,V3,W3,Y3,Z3
1650 IF F9=2 GOTO 1690
1660 IF F=N3 GOTO 1750
1670 IF Q8=1 GOTO 1700
1680 IF F<N3 GOTO 1990
1690 PUT S$,T$,U$,N3,C3,D3,E3,V3,W3,Y3,Z3
1700 NEXT R
1710 IF Q8=1 GOTO 1960
1720 IF F9=2 GOTO 2020
1730 PUT S$(1),T$(1),U$(1),F,C4,D4,E4,V4,W4,Y4,Z4
1740 GOTO 2020
1750 IF Q8=0 GOTO 1930
1760 PRINT"IT REFERS TO ",S$,T$;" "
1770 PRINT"CORRECT SYMBOL (0=FORGET IT)";
1780 INPUT A$
1790 IF A$="0" GOTO 400
```

```
1800 IF X$(5)="SBC1" GOTO 1840
1810 IF STR(A$,1,1)="=" GOTO 1870
1820 PRINT"SYMBOL MUST BEGIN WITH  ="
1830 GOTO 1770
1840 IF STR(A$,1,1)."=" GOTO 1870 ≠
1850 PRINT"SYMBOL MUST NOT BEGIN WITH  ="
1860 GOTO 1770
1870 IF STR(A$,7,12)="" GOTO 1900
1880 PRINT"SYMBOL MUST CONTAIN 6 CHARACTERS OR LESS"
1890 GOTO 1770
1900 U$(1)=A$
1910 R5,F9=0
1920 GOTO 550
1930 PRINT"THERE IS SOME ERROR.  YOUR SYMBOL ";U$(1);" IS NEW, BUT SECURITY"
1940 PRINT"NUMBER";F;"IS ALREADY IN THE FILE.  IT REFERS TO:"
1950 GOTO 1970
1960 PRINT"SECURITY #";F;"IS NOT IN THE FILE."
1970 PRINT U$;" - ";S$,T$;".   POSSIBLE PROGRAM ERROR, CONTACT SBC IMMEDIATELY AND SAVE THIS PRINTOUT..."
1980 STOP
1900 PUT S$(1),T$(1),U$(1),F,C4,D4,E4,V4,W4,U4,Z4
2000 F9=2
2010 GOTO 1690
2020 CLOSE 1,2
2030 IF X$(5)="SBC1" GOTO 2110
2040 J$=M$(M0)
2050 M$(M0)=M$(30)
2060 M$(30)=J$
2070 J$=Y$(Y0)
2080 Y$(Y0)=Y$(8)
2090 Y$(8)=J$
2100 GOTO 2170
2110 J$=M$(M0)
2120 M$(M0)=M$(M0+25)
2130 M$(M0+25)=J$
2140 J$=Y$(Y0)
2150 Y$(Y0)=Y$(Y0+6)
2160 Y$(Y0+6)=J$
2170 GOSUB .2560
2180 PRINT"ADDED SEC:   ";S$(1),T$(1);
2182 PRINT
2185 PRINT USING 2190,CPU
2190     :(0:###)
2200 OPEN 1,"METERA",INPUT
2210 GET $1,$2,$3,$4,$5,$6,$7,$8,$9,$0
```

```
2220 MAT GET J($0,6)
2230 $3=$3+1
2240 CLOSE 1
2250 OPEN 2,"METERA",OUTPUT
2260 PUT $1,$2,$3,$4,$5,$6,$7,$8,$9,$0
2270 MAT PUT J
2280 CLOSE 2
2290 GOTO 400
2300 IF STR(Z$,1,1)="=" GOTO 2360
2310 FOR L=1 TO 11 STEP 2
2320 IF Z$<STR(A$(4),L,2) GOTO 2340
2330 NEXT L
2340 L=(L+1)/2
2350 GOTO 2370
2360 L=7
2370 RETURN
2380 FOR K9=1 TO 7
2390 K8=INT((K1-(K6*10↑(8-K9)))/10↑(7-K9))+1
2400 STR(K$,K9+1,1)=STR(A$(3),K8,1)
2410 K6=K6*10+K8-1
2420 NEXT K9
2430 K6=0
2440 RETURN
2450 FOR K9=1 TO 7
2460 FOR K8=1 TO 10
2470 IF STR(K$,K9,1)=STR(A$(3),K8,1) GOTO 2510
2480 NEXT K8
2490 PRINT"ERROR; ONE CHARACTER DOES NOT EQUAL DIGIT;  SEE FRED TOWERS"
2500 STOP
2510 K2=K2+(K8-1)*10↑(7-K9)
2520 NEXT K9
2530 K1=K2
2540 K2=0
2550 RETURN
2560 IF X$(5)="SBC1" GOTO 2660
2570 OPEN 3,"CONTROL1",OUTPUT
2580 OPEN 4,"CONTROL2",OUTPUT
2590 #=3
2600 GOSUB 2640
2610 #=4
2620 GOSUB 2640
2630 GOTO 2860
2640 PUT #: C0,P$(1),P$(2),P$(3),P$(4),P$(5),Y$(7),Y$(8),M$(26),M$(27),M$(28),M$(29),M$(30)
2645 CLOSE #
```

```
2650 RETURN
2660 OPEN 3,"CONTPORT",OUTPUT
2670 OPEN 4,"CONTPORI",OUTPUT
2680 #=3
2690 GOSUB 2730
2700 #=4
2710 GOSUB 2730
2720 GOTO 2860
2730 PUT #: X$(1),X$(2),X$(3),X$(4)
2740 MAT PUT #: M
2750 PUT #: D0,B0,N0,A$(1),A$(2),A$(3),A$(4)
2760 PUT #: D$(1),D$(2),D$(3),D$(4),D$(5),D$(6),D$(7),D$(8),D$(9),D$(10),D$(11),D$(12)
2770 PUT #: E$(1),E$(2),E($3),E$(4),E$(5),E$(6),E$(7),E$(8),E$(9),E$(10),E$(11),E$(12),E$(13),E$(14),E$(15),E$(16)
2780 PUT #: E$(17),E$(18),E$(19),E$(20),E$(21),E$(22),E$(23),E$(24),E$(25),E$(26),E$(27),E$(28),E$(29),E$(30),E$(31),E$(32)
2790 PUT #: I$(1),J$(1),I$(2),J$(2),I$(3),J$(3),I$(4),J$(4),I$(5),J$(5),I$(6),J$(6),I$(7),J$(7),I$(8),J$(8),I$(9),J$(9),I$(10),
     J$(10), I$(11),J$(11),I$(12),J$(12),I$(13),J$(13)
2800 PUT #: I$(14),J$(14),I$(15),J$(15),I$(16),J$(16),I$(17),J$(17),I$(18),J$(18),I$(19),J$(19),I$(20),J$(20),I$(21),J$(21),
     I$(22),J$(22),I$(23),J$(23),I$(24),J$(24),I$(25),J$(25)
2810 PUT #: Y$(1),Y$(2),Y$(3),Y$(4),Y$(5),Y$(6)
2820 PUT #: M$(1),M$(2),M$(3),M$(4),M$(5),M$(6),M$(7),M$(8),M$(9),M$(10),M$(11),M$(12),M$(13),M$(14),M$(15),M$(16),M$(17),M$(18),
     M$(19),M$(20),M$(21),M$(22),M$(23),M$(24),M$(25)
2830 PUT #: M$(26),M$(27),M$(28),M$(29),M$(30),M$(31),M$(32),M$(33),M$(34),M$(35),M$(36),M$(37),M$(38),M$(39),M$(40),M$(41),
     M$(42),M$(43),M$(44),M$(45),M$(46),M$(47),M$(48),M$(49),M$(50)
2840 PUT #: Y$(7),Y$(8),Y$(9),Y$(10),Y$(11),Y$(12)
2845 CLOSE #
2850 RETURN
2860 REM CLOSE 3,4
2870 RETURN
2880 Y5=INT(D5/10000)
2890 M5=INT((D5-Y5*10000)/100)
2900 D5=D5-Y5*10000-M5*100
2910 RETURN
2920 PRINT'                    "              ",               "
2930 PRINT"NAME";
2940 INPUT S$,T$
2950 PRINT
2960 PRINT"I HAVE.. ";S$,T$;
2970 PRINT
2980 PRINT"OK";
2990 GOSUB 3970
3000 IF Z9=1 GOTO 3030
3010 PRINT"36-LTR MAXIMUM. TRY AGAIN."
3020 GOTO 2920
3030 RETURN
```

```
3040 PRINT"CODE";
3050 INPUT C4
3051 IF C4<1 GOTO 3054
3052 IF C4>24 GOTO 3054
3053 GOTO 3060
3054 PRINT"CODE MUST BE BETWEEN 1 & 24.  CORRECT CODE";
3055 GOTO 3050
3060 IF Q$=QCK" GOTO 3150
3070 IF Z$."A" GOTO 3100 ⋩
3080 F8=1
3090 GOTO 3150
3100 D5=D0
3110 F8=0
3120 GOSUB 2880
3130 PRINT USING 3140 ,M5,D5,Y5,"PRICE,";
3140:##/##/## ######
3150 IF C4>5 GOTO 3250
3160 PRINT"INT,MAT(M,D,Y)";
3170 IF Q$="QCK" GOTO 3180
3175 IF F8=0 GOTO 3200
3180 INPUT D4,M6,D6,Y6
3190 GOTO 3210
3200 INPUT V4,D4,M6,D6,Y6
3210 IF Y6<2000 GOTO 3230
3220 Y6=Y6-2000
3230 E4=Y6*10000+M6*100+D6
3235 IF Q$="QCK" GOTO 3920
3240 GOTO 3320
3250 IF Q$="QCK" GOTO 3920
3260 PRINT"DIV,EPS";
3270 IF F8=1 GOTO 3300
3280 INPUT V4,D4,E4
3290 GOTO 3310
3300 INPUT D4,E4
3310 U4=0
3320 PRINT".";
3322 PRINT"VERIFY";
3324 GOSUB 3970
3326 IF Z9=0 GOTO 3920
3328 PRINT".";
3330 PRINT"I HAVE..  ";Z$;"  -  ";S$,T$;
3340 PRINT
3350 IF C4>5 GOTO 3390
3360 PRINT USING 3370 ,C4,V4,D4,M6,D6,Y6
```

```
3370      :CODE ##    PRICE ###.###    INT ##.###    MAT ##/##/##
3380 GOTO 3410
3390 PRINT USING 3400 ,C4,V4,D4,E4
3400      :CODE ##    PRICE ###.###    DIV ##.###    EPS ##.###
3410 PRINT".";
3420 PRINT"OK";
3430 GOSUB 3970
3440 IF Z9=1 GOTO 3920
3450 PRINT"ERROR(SYMBOL,NAME,CODE,PRICE,";
3460 IF C4>5 GOTO 3490
3470 PRINT"INT,MAT,END)";
3480 GOTO 3500
3490 PRINT"DIV,EPS,END)";
3500 INPUT A$
3510 IF A$="END" GOTO 3320
3520 PRINT"CORRECT";A$
3530 IF A$="SYMBOL" GOTO 3800
3540 IF A$="NAME" GOTO 3780
3550 IF A$="CODE" GOTO 3760
3560 IF A$="PRICE" GOTO 3740
3570 IF A$="INT" GOTO 3650
3580 IF A$="MAT" GOTO 3690
3590 IF A$="RAT" GOTO 3670
3600 IF A$="DIV" GOTO 3650
3610 IF A$="EPS" GOTO 3630
3620 GOTO 3450
3630 INPUT E4
3640 GOTO 3450
3650 INPUT D4
3660 GOTO 3450
3670 INPUT U4
3680 GOTO 3450
3690 INPUT M6,D6,Y6
3700 IF Y6<2000 GOTO 3720
3710 Y6=Y6-2000
3720 E4=Y6*10000+M6*100+D6
3730 GOTO 3450
3740 INPUT V4
3750 GOTO 3450
3760 INPUT C4
3761 IF C4<1 GOTO 3764
3762 IF C4>24 GOTO 3764
3763 GOTO 3450
3764 PRINT"CODE MUST BE BETWEEN 1 & 24.  CORRECT CODE";
```

```
3765 GOTO 3760
3780 GOSUB 2940
3790 GOTO 3450
3800 INPUT Z$
3810 IF Z$="A" GOTO 3840 ≥
3820 F8=1
3830 GOTO 3450
3840 PRINT"IS SECURITY #";F;"OK";
3850 F8=0
3860 GOSUB 3970
3870 IF Z9=1 GOTO 3450
3880 PRINT"CORRECT SECURITY #";
3890 INPUT F
3900 PRINT"I HAVE..   ";F;"OK";
3910 GOTO 3860
3920 S$(1)=S$
3930 T$(1)=T$
3940 U$(1)=Z$
3950 PRINT
3960 RETURN
3970 INPUT A$
3980 IF A$="YES" GOTO 4020
3990 IF A$="NO" GOTO 4040
4000 PRINT'PLEASE ANSWER "YES" OR "NO"'
4010 GOTO 3970
4020 Z9=1
4030 RETURN
4040 Z9=0
4050 RETURN
10000 END

PROG....ZZW110..N72MOVE ...............

1 REM COPYRIGHT 1968,1969,1970,1971,1972 FREDERIC C. TOWERS
2 REM RUN **MOVESEC ==> EXE **MOVEOBJ
50 DIM M(30,1),M$(50),A$(5),D$(12),E$(32),I$(25),J$(25),Y$(12),F$(20),J(100,6)
100 OPEN 1,"CATALOG1",INPUT
110 GET X$(5)
120 CLOSE 1
130 IF X$(5)."SBC1" GOTO 160 ≠
140 OPEN 1, "CONTPORT", INPUT
150 GOTO 170
160 OPEN 1,"**CONTPORT",INPUT
170 GET X$(1),X$(2),X$(3),X$(4)
```

```
180 MAT GET M
190 GET D0,B0,N0,A$(1),A$(2),A$(3),A$(4)
200 GET D$(1),D$(2),D$(3),D$(4),D$(5),D$(6),D$(7),D$(8),D$(9),D$(10),D$(11),D$(12)
210 GET E$(1),E$(2),E$(3),E$(4),E$(5),E$(6),E$(7),E$(8),E$(9),E$(10),E$(11),E$(12),E$(13),E$(14),E$(15),E$(16),
    E$(17),E$(18),E$(19),E$(20),E$(21),E$(22),E$(23),E$(24),E$(25),E$(26),E$(27),E$(28),E$(29),E$(30),
    E$(31),E$(32)
230 GET I$(1),J$(1),I$(2),J$(2),I$(3),J$(3),I$(4),J$(4),I$(5),J$(5),I$(6),J$(6),I$(7),J$(7),I$(8),J$(8),
    I$(9),J$(9),I$(10),J$(10),I$(11),J$(11),I$(12),J$(12),I$(13),J$(13)
240 GET I$(14),J$(14),I$(15),J$(15),I$(16),J$(16),I$(17),J$(17),I$(18),J$(18),I$(19),J$(19),I$(20),J$(20),
    I$(21)J$(21),I$(22)J$(22),I$(23),J$(23),I$(24),J$(24),I$(25),J$(25)
250 GET Y$(1),Y$(2),Y$(3),Y$(4),Y$(5),Y$(6)
260 GET M$(1),M$(2),M$(3),M$(4),M$(5),M$(6),M$(7),M$(8),M$(9),M$(10),M$(11),M$(12),M$(13),M$(14),M$(15),M$(16),
    M$(17),M$(18),M$(19),M$(20),M$(21),M$(22),M$(23),M$(24),M$(25)
270 IF X$(5)."SBC1" GOTO 310 ≠
280 GET M$(26),M$(27),M$(28),M$(29),M$(30),M$(31),M$(32),M$(33),M$(34),M$(35),M$(36),M$(37),M$(38),M$(39),
    M$(40),M$(41),M$(42),M$(43),M$(44),M$(45),M$(46),M$(47),M$(48),M$(49),M$(50)
290 GET Y$(7),Y$(8),Y$(9),Y$(10),Y$(11),Y$(12)
300 GOTO 330
310 OPEN 1,"CONTROL1",INPUT
320 GET C0,P$(1),P$(2),P$(3),P$(4),P$(5),Y$(7),Y$(8),M$(26),M$(27),M$(28),M$(29),M$(30)
330 CLOSE 1
340   :########  (0:##)
350 PRINT"..";
360 REM**
370 PRINT"OLD SYMBOL (0=END)";
380 INPUT Z$
390 IF Z$="0" GOTO 10000
400 IF X$(5) ="SBC1" GOTO 440
410 IF STR(Z$,1,1)="=" GOTO 470
420 PRINT"OLD SYMBOL MUST BEGIN WITH  ="
430 GOTO 370
440 IF STR(Z$,1,1). "=" GOTO 470 ≠
450 PRINT"OLD SYMBOL CANNOT BEGIN WITH  ="
460 GOTO 370
470 GOSUB 3030
480 A$=Z$
490 IF X$(5)."SBC1" GOTO 520 ≠
500 J$=STR(Y$(L),3)
510 GOTO 530
520 J$=Y$(L)
530 OPEN 1,J$,INPUT
540 Y0=L
550 IF X$(5)="SBC1" GOTO 580
560 OPEN 2,Y$(8),OUTPUT
```

```
570 GOTO 600
580 J$=STR(Y$(Y0+6),3)
590 OPEN 2,J$,OUTPUT
600 GET N1
610 PUT N1-1
620 IF N1>20 GOTO 650
630 R=-19
640 GOTO 710
650 FOR R=1 TO N1-20 STEP 20
660 GET F$(1),F$(2),F$(3),F$(4),F$(5),F$(6),F$(7),F$(8),F$(9),F$(10),F$(11),F$(12),F$(13),F$(14),F$(15),
F$(16),F$(17),F$(18),F$(19),F$(20)
670 IF F0=1 GOTO 690
680 IF A$.STR(F$(20),1,11) GOTO 920 ≤
690 PUT F$(1),F$(2),F$(3),F$(4),F$(5),F$(6),F$(7),F$(8),F$(9),F$(10),F$(11),F$(12),F$(13),F$(14),F$(15),F$(16),
F$(17),F$(18),F$(19),F$(20)
700 NEXT R
710 FOR R=R+20  TO N1
720 R5=R5+1
730 GET F$(R5)
740 IF F9=1 GOTO 760
750 IF A$=STR (F$(R5),1,11) GOTO 860
760 PUT F$(R5)
770 NEXT R
780 IF F9=1 GOTO 1030
790 PRINT A$;" IS NOT IN THE FILES."
800 PRINT"OLD SEC # (0=FORGET IT)";
810 INPUT F
820 IF F=0 GOTO 3010
830 Y0=8
840 F$=A$
850 GOTO 1030
860 K$=STR(F$(R5),12,7)
870 GOSUB 3110
880 F=K1
890 F$=A$
900 F9=1
910 GOTO 770
920 FOR R1=1 TO 20
930 IF A$=STR(F$(R1),1,11) GOTO 970
940 PUT F$(R1)
950  NEXT R1
960 GOTO 700
970 K$=STR(F$(R1),12,7)
980 GOSUB 3110
```

```
990  F=K1
1000 F$=A$
1010 F9=1
1020 GOTO 950
1030 CLOSE 1,2
1040 PRINT"NEW SYMBOL";
1050 INPUT Z$
1060 IF Z$=F$ GOTO 1450
1070 IF STR(Z$,7,12)="" GOTO 1100
1080 PRINT"SYMBOL MUST CONTAIN 6 CHARACTERS OR LESS"
1090 GOTO 1040
1100 GOSUB 3030
1110 R5,F9,G1=0
1120 IF X$(5)."SBC1" GOTO 1150 ≠
1130 J$=STR(Y$(L),3)
1140 GOTO 1160
1150 J$=Y$(L)
1160 OPEN 1,J$,INPUT
1170 GET N1
1180 IF N1>20 GOTO 1210
1190  R=-19
1200 GOTO 1250
1210 FOR R=1 TO N1-20 STEP 20
1220 GET F$(1),F$(2),F$(3),F$(4),F$(5),F$(6),F$(7),F$(8),F$(9),F$(10),F$(11),F$(12),F$(13),F$(14),F$(15),F$(16),F$(17),F$(18),F$(19),F$(20)
1230 IF Z$.STR(F$20),1,11) GOTO 1390 ≦
1240  NEXT R
1250 FOR R=R + 20 TO N1
1260 R5=R5 + 1
1270 GET F$(R5)
1280 IF Z$=STR(F$(R5),1,11) GOTO 1330
1290 NEXT R
1300 IF Y0.8 GOTO 1450 ≠
1310 PRINT"YOU CANNOT USE    **MOVESEC WHEN NEITHER.......    OLD NOR NEW SYMBOL IS IN FILE."
1320 STOP
1330 K$=STR(F$(R5),12,7)
1340 GOSUB 3110
1350 G1=1
1360 G=K1
1370 G$=Z$
1380 GOTO 1860
1390 FOR R1=1 TO 20
1400 IF Z$=STR (F$(R1),1,11) GOTO 1430
1410 NEXT R1
```

```
1420 GOTO 1300
1430 K$=STR(F$(R1),12,7)
1440 GOTO 1340
1450 IF Z$."A" GOTO 1600≥
1460 IF STR(Z$,1,1)="" GOTO 1510
1470 IF X$(5)."SBC1" GOTO 1610 ≠
1480 IF F.1000000 GOTO 1570≥
1490 G=F
1500 GOTO 1850
1510 IF X$(5)."SBC1" GOTO 1540 ≠
1520 PRINT"SYMBOL CANNOT BEGIN WITH ="
1530 GOTO 1040
1540 CO=CO+10
1550 G=CO
1560 GOTO 1850
1570 NO=NO+100
1580 G=NO
1590 GOTO 1850
1600 IF X$(5)="SBC1" GOTO 1630
1610 PRINT Z$;" IS NOT YET IN **VALPORT FILE"
1620 GOTO 1040
1630 STR(B$,1,6)="**SYM#"
1640 STR(B$,7,1)=STR(Z$,1,1)
1650 OPEN 3,B$,INPUT
1660 GET 3:B$,B1
1670 B$=STR(B$,1,7)
1680 IF B1=0 GOTO 1750
1690 IF B$<Z$ GOTO 1660
1700 IF B$>Z$ GOTO 1750
1710 G=B1
1720 PRINT"NEW SEC#:";G;" OK";
1730 GOSUB 4560
1740 IF Z9=1 GOTO 1820
1750 PRINT"NEW SEC#";
1760 INPUT G
1770 IF G.10000000 GOTO 1800 ≥
1780 IF G<1000000 GOTO 1800
1790 GOTO 1820
1800 PRINT"SEC# MUST HAVE 7 DIGITS"
1810 GOTO 1750
1820 IF G=F GOTO 1850
1830 PRINT"NEW PRICE FOR ";Z$;
1840 INPUT V4
1850 G$=Z$
```

```
1860 CLOSE 1,3
1870 IF G=F GOTO 1930
1880 PRINT"SHS ";G$;" RECD FOR 1 ";F$;
1890 INPUT GO
1900 IF GO > 0 GOTO 1930
1910 PRINT"RATE MUST BE > 0"
1920 GOTO 1880
1930 IF Y0=8 GOTO 2590
1940 FOR L=2 TO 30
1950 IF F< M(L,1) GOTO 1970
1960 NEXT L
1970 L=L-1
1980 M0=L
1990 IF X$(5)."SBC1" GOTO 2050 ≠
2000 J$=STR(M$(L),3)
2010 OPEN 1,J$,INPUT
2020 J$=STR(M$(L+25),3)
2030 OPEN 2,J$,OUTPUT
2040 GOTO 2070
2050 OPEN 1,M$(L),INPUT
2060 OPEN 2,M$(30),OUTPUT
2070 GET N1
2080 PUT N1-1
2090 FOR R=1 TO N1
2100 GET S$,T$,U$,N3,C3,D3,E3,V3,W3,Y3,Z3
2110 IF F=N3 GOTO 2170
2120 PUT S$,T$,U$,N3,C3,D3,E3,V3,W3,Y3,Z3
2130 NEXT R
2140 IF F9=2 GOTO 2310
2150 PRINT"ERROR.   # DOESN'T MATCH."
2160 STOP
2170 F9=2
2180 V$=S$
2190 W$=T$
2200 C4=C3
2210 D4=D3
2220 E4=E3
2230 IF V4 > 8 GOTO 2250
2240 V4=V3
2250 W4=W3
2260 IF Z$."A" GOTO 2280 ≥
2270 V4,W4=0
2280 Y4=Y3
2290 Z4=Z3
```

```
2300 GOTO 2130
2310 CLOSE 1,2
2320 GOSUB 2340
2330 GOTO 2490
2340 IF X$(5)="SBC1" GOTO 2420
2350 J$=M$(M0)
2360 M$(M0)=M$(30)
2370 M$(30)=J$
2380 J$=Y$(Y0)
2390 Y$(Y0)=Y$(8)
2400 Y$(8)=J$
2410 GOTO 2480
2420 J$=M$(M0)
2430 M$(M0)=M$(M0+25)
2440 M$(M0+25)=J$
2450 J$=Y$(Y0)
2460 Y$(Y0)=Y$(Y0+6)
2470 Y$(Y0+6)=J$
2480 RETURN
2490 GOSUB 3290
2500 OPEN 1,"METERA",INPUT
2510 GET  $1,$2,$3,$4,$5,$6,$7,$8,$9,$0
2520 MAT GET J($0,6)
2530 CLOSE 1
2540  $6=$6+1
2550 OPEN 2,"METERA",OUTPUT
2560 PUT $1,$2,$3,$4,$5,$6,$7,$8,$9,$0
2570 MAT PUT J
2580 CLOSE 2
2590 IF Y0 = 8 GOTO 2620
2600 PRINT F$;" <";V$,W$;" >    DELETED FROM MASTER LIST"
2610 PRINT
2620  IF G1=1 GOTO 2650
2630 GOSUB 3610
2640 REM ADD BACK ISSUE
2650 IF G=F GOTO 2980
2660 OPEN 1,"OLDNEW#1",INPUT
2670 OPEN 2,"OLDNEW#2",OUTPUT
2680 GET #0
2690 PUT #0+1
2700 FOR #1=1 TO #0
2710 GET #2,#3,#4
2720 IF #6=1 GOTO 2750
2730 IF F=#2 GOTO 2890
```

```
2740 IF F < #2 GOTO 2930
2750 PUT #2,#3,#4
2760 NEXT #1
2762 IF #6=1 GOTO 2770
2764 PUT F,G,G0
2766 #6=1
2770 CLOSE 1,2
2780 OPEN 1,"OLDNEW#2",INPUT
2790 OPEN 2,"OLDNEW#1",OUTPUT
2800 GET #0
2810 IF #5=0 GOTO 2830
2820 #0=#0-1
2830 PUT #0
2840 FOR #1=1 TO #0
2850 GET #2,#3,#4
2860 PUT #2,#3,#4
2870 NEXT #1
2880 GOTO 2960
2890 #3=G
2900 #4=G0
2910 #5,#6=1
2920 GOTO 2750
2930 PUT F,G,G0
2940 #6=1
2950 GOTO 2750
2960 #5,#6=0
2970 PRINT"UPDATED XREF"
2980 IF X$(5)."SBC1" GOTO 3010 ≠
2981 IF F$=G$ GOTO 3010
2982 OPEN 1,"SYMX1",INPUT
2983 OPEN 2,"SYMX2",OUTPUT
2984 GET A$
2985 IF A$="END**" GOTO 3007
2986 IF #5=1 GOTO 2990
2987 H$=STR(A$,1,7)
2988 IF F$ < H$ GOTO 3003
2989 IF F$=H$ GOTO 3000
2990 PUT A$
2991 IF A$."END**" GOTO 2984 ≠
2992 CLOSE 1,2
2993 OPEN 1,"SYMX2",INPUT
2994 OPEN 2,"SYMX1",OUTPUT
2995 GET A$
2996 PUT A$
2997 IF A$."END**" GOTO 2995 ≠
```

```
2998 CLOSE 1,2
2999 GOTO 3009
3000 STR(A$,12,7)=G$
3001 PUT A$
3002 GOTO 2984
3003 STR (H$,1,7)=F$
3004 STR(H$,12,7)=G$
3005 PUT H$
3006 GOTO 3001
3007 IF #5=1 GOTO 2990
3008 GOTO 3003
3009 PRINT"UPDATED SYMXREF"
3010 PRINT USING 3011,CPU
3011     :CPU (0:###)
3012 PRINT
3013 G1,F9,R5,V4,#5=0
3020 GOTO 350
3030 IF STR(Z$,1,1)="=" GOTO 3090
3040 FOR L=1 TO 11 STEP 2
3050 IF Z$<STR(A(4),L,2) GOTO 3070
3060 NEXT L
3070 L=(L+1)/2
3080 GOTO 3100
3090 L=7
3100 RETURN
3110 FOR K9=1 TO 7
3120 FOR K8=1 TO 10
3130 IF STR(K$,K9,1)=STR(A$(3),K8,1) GOTO 3170
3140 NEXT K8
3150 PRINT"ERROR;ONE CHARACTER DOES NOT EQUAL DIGIT; SEE FRED TOWERS"
3160 STOP
3170 K2=K2+(K8-1)*10↑(7-K9)
3180 NEXT K9
3190 K1=K2
3200 K2=0
3210 RETURN
3220 FOR K9=1 TO 7
3230 K8=INT((K1-(K6*10↑(8-K9)))/10↑(7-K9))+1
3240 STR(K$,K9+11,1)=STR(A$(3),K8,1)
3250 K6=K6*10+K8-1
3260 NEXT K9
3270 K6=0
3280 RETURN
```

```
3290 IF X$(5)="SBC1" GOTO 3400
3300 OPEN 3,"CONTROL1",OUTPUT
3310 OPEN 4,"CONTROL2",OUTPUT
3320 #=3
3330 GOSUB 3370
3340 #=4
3350 GOSUB 3370
3360 RETURN
3370 PUT #:CO,P$(1),P$(2),P$(3),P$(4),P$(5),Y$(7),Y$(8),M$(26),M$(27),M$(28),M$(29),M$(30)
3380 CLOSE #
3390 RETURN
3400 OPEN 3,"CONTPORT",OUTPUT
3410 OPEN 4,"CONTPOR1",OUTPUT
3420 #=3
3430 GOSUB 3470
3440 #=4
3450 GOSUB 3470
3460 RETURN
3470 PUT #: X$(1),X$(2),X$(3),X$(4)
3480 MAT PUT #: M
3490 PUT #: DO,BO,NO,A$(1),A$(2),A$(3),A$(4)
3500 PUT #: D$(1),D$(2),D$(3),D$(4),D$(5),D$(6),D$(7),D$(8),D$(9),D$(10),D$(11),D$(12)
3510 PUT #: E$(1),E$(2),E$(3),E$(4),E$(5),E$(6),E$(7),E$(8),E$(9),E$(10),E$(11),E$(12),E$(13),E$(14),E$(15),E$(16)
3520 PUT #: E$(17),E$(18),E$(19),E$(20),E$(21),E$(22),E$(23),E$(24),E$(25),E$(26),E$(27),E$(28),E$(29),E$(30),E$(31),E$(32)
3530 PUT #: I$(1),J$(1),I$(2),J$(2),I$(3),J$(3),I$(4),J$(4),I$(5),J$(5),I$(6),J$(6),I$(7),J$(7),I$(8),J$(8),I$(9),J$(9),I$(10),
J$(10),I$(11),J$(11),I$(12),J$(12),I$(13),J$(13)
3540 PUT #: I$(14),J$(14),I$(15),J$(15),I$(16),J$(16),I$(17),J$(17),I$(18),J$(18),I$(19),J$(19),I$(20),J$(20),I$(21),J$(21),
I$(22),J$(22),I$(23),J$(23),I$(24),J$(24),I$(25),J$(25)
3550 PUT #: Y$(1),Y$(2),Y$(3),Y$(4),Y$(5),Y$(6)
3560 PUT #: M$(1),M$(2),M$(3),M$(4),M$(5),M$(6),M$(7),M$(8),M$(9),M$(10),M$(11),M$(12),M$(13),M$(14),M$(15),M$(16),M$(17),
M$(18),M$(19),M$(20),M$(21),M$(22),M$(23),M$(24),M$(25)
3570 PUT #: M$(26),M$(27),M$(28),M$(29),M$(30),M$(31),M$(32),M$(33),M$(34),M$(35),M$(36),M$(37),M$(38),M$(39),M$(40),M$(41),
M$(42),M$(43),M$(44),M$(45),M$(46),M$(47),M$(48),M$(49),M$(50)
3580 PUT #: Y$(7),Y$(8),Y$(9),Y$(10),Y$(11),Y$(12)
3590 CLOSE #
3600 RETURN
3610 Z$=G$
3620 R5,F9,Q8=0
3630 GOSUB 3030
3640 A$=Z$
3650 YO=L
3660 IF X$(5)."SBC1" GOTO 3720
3670 J$=STR(Y$(L),3)
3680 OPEN 1,J$,INPUT
```

```
3690 J$=STR(Y$(L+6),3)
3700 OPEN 2,J$,OUTPUT
3710 GOTO 3740
3720 OPEN 1,Y$(L),INPUT
3730 OPEN 2,Y$(8),OUTPUT
3740 GET N1
3750 PUT N1+1
3760 IF N1 > 20 GOTO 3790
3770 R=-19
3780 GOTO 3850
3790 FOR R=1 TO N1-20 STEP 20
3800 GET F$(1),F$(2),F$(3),F$(4),F$(5),F$(6),F$(7),F$(8),F$(9),F$(10),F$(11),F$(12),F$(13),F$(14),F$(15),F$(16),
     F$(17),F$(18),F$(19),F$(20)
3810 IF F9=1 GOTO 3830
3820 IF A$.STR(F$(20),1,11) GOTO 4070 ≤
3830 PUT F$(1),F$(2),F$(3),F$(4),F$(5),F$(6),F$(7),F$(8),F$(9),F$(10),F$(11),F$(12),F$(13),F$(14),F$(15),
     F$(16),F$(17),F$(18),F$(19),F$(20)
3840 NEXT R
3850 FOR R=R+20 TO N1
3860  R5=R5+1
3870 GET F$(R5)
3880 IF F9=1 GOTO 3960
3890 IF A$=STR(F$(R5),1,11) GOTO 4050
3900 IF A$ > STR(F$(R5),1,11) GOTO 3960
3910 K1=G
3920 GOSUB 3220
3930 STR(K$,1,11)=G$
3940 PUT K$
3950 F9=1
3960 PUT F$(R5)
3970 NEXT R
3980 IF F9=1 GOTO 4200
3990 K1=G
4000 GOSUB 3220
4010 STR(K$,1,11)=G$
4020 PUT K$
4030 F9=1
4040 GOTO 4200
4050 PRINT"ERROR #3190.SEE FRED TOWERS."
4060 STOP
4070 FOR R1=1 TO 20
4080 IF F9=1 4110
4090 IF A$=STR(F(R1),1,11) GOTO 4050
4100 IF A$ < STR(F$(R1),1,11) GOTO 4140
```

```
4110 PUT F$(R1)
4120 NEXT R1
4130 GOTO 3840
4140 K1=G
4150 GOSUB 3220
4160 STR(K$,1,11)=G$
4170 PUT K$
4180 F9=1
4190 GOTO 4110
4200 CLOSE 1,2
4210 FOR L=2 TO 50
4220 IF G<M(L,1) GOTO 4240
4230 NEXT L
4240 L=L-1
4250 MO=L
4260 IF X$(5)."SBC1" GOTO 4320  ≠
4270 J$=STR(M$(L),3)
4280 OPEN 1,J$,INPUT
4290 J$=STR(M$(L+25),3)
4300 OPEN 2,J$,OUTPUT
4310 GOTO 4340
4320 OPEN 1,M$(L),INPUT
4330 OPEN 2,M$(30),OUTPUT
4340 GET N1
4350 PUT N1+1
4360 FOR R=1 TO N1
4370 GET   S$,T$,U$,N3,C3,D3,E3,V3,W3,Y3,Z3
4380 IF F9=2 GOTO 4410
4390 IF G=N3 GOTO 4050
4400 IF G<N3 GOTO 4460
4410 PUT S$,T$,U$,N3,C3,D3,E3,V3,W3,Y3,Z3
4420 NEXT R
4430 IF F9=2 GOTO 4490
4440 PUT V$,W$,G$,G,C4,D4,E4,V4,W4,Y4,Z4
4450 GOTO 4490
4460 PUT V$,W$,G$,G,C4,D4,E4,V4,W4,Y4,Z4
4470 F9=2
4480 GOTO 4410
4490 CLOSE 1,2
4500 REM FLIPFLOP
4510 GOSUB 2340
4520 GOSUB 3290
4530 PRINT G$;" ADDED TO MASTER LIST"
4540 PRINT
```

```
4560 INPUT A$
4570 IF A$="YES" GOTO 4610
4580 IF A$="NO" GOTO 4630
4590 PRINT"PLEASE ANSWER YES OR NO"
4600 GOTO 4560
4610 Z9=1
4620 RETURN
4630 Z9=0
4640 RETURN
10000 END
```

```
STATUS
PROGRAM..VALSEC
       767 CHARS
        28 LINES
         1 UNITS
         BASIC
         WIDTH 90
LINE 284
ID: SBC994
SESSION:
         1 MIN
         0 PROC UNITS
```

LIST

VALSEC      14:09                    07/05/72   WEDNESDAY   102

```
100 PRINT"TYPE";
110 INPUT T$
120 IF T$="CARD" GOTO 520
130 IF T$="CATSUPP" GOTO 530
132 IF T$="COUNT" GOTO 530
134 IF T$="=SUPP" GOTO 532
140 IF T$="DEL" GOTO 540
150 IF T$="EDIT" GOTO 550
160 IF T$="FIND" GOTO 560
170 IF T$="MOVE" GOTO 570
180 IF T$="NEW" GOTO 580
190 IF T$="EDITPRI" GOTO 590
200 IF T$="DATA" GOTO 600
202 IF T$="FORM" GOTO 610
300 PRINT"TYPE (NEW,EDIT,EDITPRI,DEL,MOVE,FIND,CARD,CATSUPP,=SUPP,COUNT,FORM)";
```

```
310 GOTO 110
520 COM 'EXE' '**CARDSOBJ'
530 COM 'EXE' '**CATSOBJ' WITH T$
532 COM 'RUN' '**SUPPSEC'
540 COM 'EXE' '**DELSOBJ'
550 COM 'EXE' '**EDITSOBJ'
560 COM 'EXE' '**FINDSOBJ'
570 COM 'EXE' '**MOVEOBJ'
580 COM 'EXE' '**NEWSOBJ'
590 COM 'EXE' '**EPRIOBJ'
600 COM 'EXE' '**DATASOBJ'
610 COM 'RUN' '**FORMPORT' WITH 'SEC'
1000 END
```

BASIC STATEMENTS

The Basic language in which these programs are written and an appropriate explanatory manual are discussed in Section G supra. Here are displayed a few statements in the particular context, which should further describe the program listings.

| Statement | Description |
|---|---|
| Q$ | Simple alphameric variable (up to 18 characters) |
| A, B5, S0 | Simple numeric variable |
| Input Q$ | Terminal prints "?". User then types alphameric variable |
| DIM R$(100) | Reserve space for an alphameric array of 100 (of 18 characters each) |
| OPEN 1, "**VALPUSER", INPUT | Accesses previously identified file **VALPUSER for reference as file 1. Only 4 files may be accessed simultaneously. |
| **NAME | File or program with system-wide accessibility |
| *NAME | File or program with user-wide accessibility |
| NAME | File or program with library accessibility |
| GET A$ | Get an alphameric data item from a previously opened file |
| X$(5) | An alphameric array variable in array X$, position 5. |
| X1 = X1+1 | Increase the value of X1 by 1 |
| RESET 1 | Reset pointer to first data item in a file |
| Print "..." | Print 3 unrepresentable characters in High Speed Printer, i.e. Tab, $\leq$, $\geq$, $\neq$, index, backspace, exponent |
| If S0.100 | If variable S0 is $\geq$, $\leq$, or $\neq$ (unrepresentable) 100 |
| R$(1)="" | Set alphameric array variable to 18 blanks |
| Put X$(5) | Place array variable in next field of opened output file |
| DATA "P01" | Literal data for later use |
| READ P$(1) | Assigns next data item, e.g., "P01" to the variable, e.g., "P$(1)" |
| MAT GET M | Read numeric data into array |
| IF STR(Z$,1,1)="=" | If the first character of String Z$ is equal to =; i.e., is a user supplied supplemental security |
| CPU | Elapsed computer processing units (approximately ¼ sec.) since program began |
| CLK | Time in seconds since midnite |
| PRINT | Skip down one line |
| FNA(X) = INT (X + ½) | Rounds X to nearest integer, i.e., x = 1.4, 1.5 FNA(X) = 1,2 |
| Pick L$ | Read alpha variable passed from linked program |

I claim:

1. The method of operating a general purpose digital computer having a plurality of data files, to allow a plurality of users to simultaneously retrieve information, while allowing the computer operator to update the information in said data files, comprising:
   (a) providing each of said data files with a keyword through which said file is accessed,
   (b) ordering said data in said data files in a sorted sequence, each data file having a separate sorted segment of data,
   (c) providing an index file with a sequential string of correspondence fields containing, for each segment of sorted data, an associated keyword in a particularly sequence identifying a data file,
   (d) providing a spare data file for editing the data on said files, (e) immediately after said editing routine, exchanging the keywords in the fields of the index files corresponding to said unedited and edited data files, (f) accessing said data files to retrieve a particular record by a comparison to determine said segment of data containing said record, (g) searching said index file to determine the data file containing the segment of data including said record, (h) reading the correspondence field of said segment of data to retrieve the keyword of the data file having the most recently edited version of said data segment, (i) accessing said data file and retrieving said data record.

2. The method of operating a general purpose digital computer having data files simultaneously accessible by a plurality of users to produce reports of current valuations of securities portfolios, said portfolios having data information, comprising:

(a) providing data files containing unique values identifying said securities, hereinafter termed security numbers and reserved fields for current pricing and other financial data;

(b) segregating said data files into a first group of files containing those securities in which daily pricing information is available in electronically encoded form;

(c) processing said daily pricing information against said files to produce an edited updated file;

(d) producing an error file of these securities on said daily pricing file, for which there is no corresponding security in said data file, those in the data file for which there is no daily pricing data, and those in the data file for which there is a change;

(e) producing a further edit file based on said error report for processing against said data files;

(f) providing a second group of files containing widely held securities without associated pricing information;

(g) providing for each user an additional file containing all other securities in the portfolios of said user;

(i) providing a cross-reference file containing a field having a value corresponding to an outdated security number, a field having a value corresponding to the new security number, and a field having a value corresponding to the exchange rate between said securities, (j) providing a data file for storing sorted uniquely identified portfolios containing data about each security including fields having values corresponding to the security number and the amount of the security holding;

(k) retrieving from the portfolio file for each security the security number and amount;

(l) retrieving from the data file the current pricing information for that security;

(m) for each unpriced security transferring program control to the user terminal to supply the current price information;

(n) for each security not found in the search of the data files accessing and searching the cross-reference file to determine the new security number and new amount of holding;

(o) displaying in ordered form at the security portfolio and valuation.

3. The method of claim 2, including for each security a second key, herein called a ticker symbol and providng a cross-reference file between said ticker symbols and said security numbers, whereby said user may identify his portfolio securities by ticker symbol.

4. The method of claim 2, in which each security record has fields reserved for stock dividend amounts and dates-said portfolios have fields reserved for latest valuation and said retrieval routines adjust said holdings where applicable.

5. A stored program data processing system including a digital computer having memory and logic means for storing and retrieving and displaying information about investment securities, the combination including (a) a plurality of input/output terminals operatively connected to said system;

(b) a memory providing a plurality of data storage areas for data;

(c) a first data storage area for system data, comprising records of data hereinafter termed priced securities;

(d) a second data storage area for system data comprising records of data hereinafter termed unpriced securities;

(e) a third data storage area comprising records of data hereinafter termed a user file;

(f) each user file including an area reserved for the date of entry of the data, the numeric address indicative of each security and the amount of each security holding;

(g) a first set of numeric address means for each of said priced security records;

(h) a second set of numeric address means for each of said unpriced security records, said second set of numeric addresses differing from said first set;

(i) means to access and edit each of said priced security records utilizing said first set of numeric addresses;

(j) means to access and edit each of said unpriced security records utilizing said second set of numeric addresses;

(k) a second alphameric key for each of said priced and unpriced security records;

(l) a plurality of conversion means for translation of a signal for one key into a signal for another key;

(m) a first conversion means for translating an alphameric key into a numeric address for a priced or unpriced security record;

(n) a second conversion means for translating a numeric key representing a prior memory address of a priced or unpriced security to a current memory address;

(o) a third conversion means for translating an alphameric key representing a prior security identification into a current alphameric key representative of said security;

(p) a fourth conversion means for converting the data in the amount field in a user file, based on its date of entry to data corresponding to the current amount of said holding;

(q) means to retrieve a selected user file;

(r) means to retrieve corresponding data from said priced and unpriced security file;

(s) means to compute and display the current value of said selected portfolio of securities.

* * * * *